US012804210B2

(12) United States Patent
Zhang et al.

(10) Patent No.: US 12,804,210 B2
(45) Date of Patent: Nov. 17, 2026

(54) VIDEO PLAYING METHOD AND APPARATUS

(71) Applicant: HUAWEI TECHNOLOGIES CO., LTD., Shenzhen (CN)

(72) Inventors: Xuelian Zhang, Shenzhen (CN); Yan Zhuang, Hangzhou (CN); Jia Cai, Shanghai (CN); Shaohua Tang, Hangzhou (CN); Xiaolong Wang, Hangzhou (CN); He Wei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 3 days.

(21) Appl. No.: 18/521,881

(22) Filed: Nov. 28, 2023

(65) Prior Publication Data

US 2024/0107092 A1 Mar. 28, 2024

Related U.S. Application Data

(63) Continuation of application No. PCT/CN2022/094784, filed on May 24, 2022.

(30) Foreign Application Priority Data

May 31, 2021 (CN) ......................... 202110604488.9

(51) Int. Cl.
*H04N 21/2387* (2011.01)

(52) U.S. Cl.
CPC ............................... *H04N 21/2387* (2013.01)

(58) Field of Classification Search
CPC ......... H04N 21/2387; H04N 21/47217; H04N 21/84; H04N 21/4532; H04N 21/462; G11B 27/005
(Continued)

(56) References Cited

U.S. PATENT DOCUMENTS 6,236,395 B1 * 5/2001 Sezan .............. H04N 21/44008 715/723
6,760,536 B1 * 7/2004 Amir .................... G11B 27/005 386/346
(Continued)

FOREIGN PATENT DOCUMENTS

CN 104869430 B 12/2017
CN 109040793 A 12/2018
(Continued)

OTHER PUBLICATIONS

Ramos et al., "Personalizing Fast-Forward Videos Based on Visual and Textual Features from Social Network," 2020 IEEE Winter Conference on Applications of Computer Vision (WACV), total 10 pages, Institute of Electrical and Electronics Engineers, New York, New York (May 14, 2020).
(Continued)

*Primary Examiner* — Nasser M Goodarzi

(57) ABSTRACT

A video playing method and apparatus are described that implement an adaptively varied playing speed, and meet a playing setting of a user, thereby improving viewing experience of the user in a video played at an adaptively varied speed. The method includes obtaining a first playing speed and obtaining first information. The first information includes image information of a video and/or voice information of the video. The method further includes playing the video at a second playing speed that is obtained based on the first playing speed and the first information.

16 Claims, 24 Drawing Sheets

(58) Field of Classification Search
USPC ........................................................ 725/87
See application file for complete search history.

(56) References Cited

U.S. PATENT DOCUMENTS

| | | | | |
|---|---|---|---|---|
| 8,472,778 | B2 * | 6/2013 | Kimura | H04N 21/4722 386/343 |
| 8,799,757 | B2 * | 8/2014 | Jewsbury | G06F 16/40 715/201 |
| 9,363,561 | B1 * | 6/2016 | Harmon | H04N 21/26258 |
| 9,514,784 | B2 * | 12/2016 | Kim | G11B 19/02 |
| 10,063,911 | B1 * | 8/2018 | Obara | H04N 21/4223 |
| 10,250,925 | B2 * | 4/2019 | Agrawal | H04N 21/84 |
| 10,298,643 | B1 * | 5/2019 | Toal | H04N 21/8456 |
| 10,418,065 | B1 * | 9/2019 | Guckenberger | G11B 27/105 |
| 10,728,624 | B2 * | 7/2020 | Singh | H04N 21/4667 |
| 11,350,157 | B2 * | 5/2022 | Golyshko | H04N 21/4882 |
| 11,470,392 | B1 * | 10/2022 | VanBlon | H04N 21/440236 |
| 11,924,513 | B2 * | 3/2024 | Wang | H04N 21/4826 |
| 2002/0144262 | A1 * | 10/2002 | Plotnick | H04N 21/458 348/E7.071 |
| 2006/0117357 | A1 * | 6/2006 | Surline | H04N 19/61 386/E5.052 |
| 2008/0253737 | A1 * | 10/2008 | Kimura | H04N 21/4402 348/E7.071 |
| 2011/0164860 | A1 * | 7/2011 | Nakagawa | H04N 5/772 386/343 |
| 2012/0240174 | A1 * | 9/2012 | Rhyu | H04L 65/611 725/109 |
| 2013/0031266 | A1 * | 1/2013 | Gilson | H04N 21/2387 709/232 |
| 2013/0294755 | A1 * | 11/2013 | Arme | G11B 27/28 386/E5.041 |
| 2014/0029916 | A1 * | 1/2014 | Dhawan | H04N 9/8205 386/248 |
| 2014/0123195 | A1 | 5/2014 | Han et al. | |
| 2014/0186006 | A1 * | 7/2014 | Jin | H04N 5/783 386/230 |
| 2014/0245367 | A1 * | 8/2014 | Sasaki | H04N 21/2343 725/109 |
| 2017/0245009 | A1 * | 8/2017 | Nielsen | H04N 21/4394 |
| 2017/0270965 | A1 * | 9/2017 | Bao | G06F 40/30 |
| 2018/0090170 | A1 * | 3/2018 | Weksler | G11B 27/034 |
| 2018/0322905 | A1 * | 11/2018 | Cheng | H04N 21/47202 |
| 2018/0332360 | A1 * | 11/2018 | Acharya | G06Q 30/0269 |
| 2019/0014378 | A1 * | 1/2019 | Shah | H04N 21/47217 |
| 2019/0132639 | A1 * | 5/2019 | Panchaksharaiah | H04N 21/47217 |
| 2019/0166412 | A1 * | 5/2019 | Panchaksharaiah | H04N 21/26258 |
| 2019/0208282 | A1 * | 7/2019 | Singh | H04N 21/4667 |
| 2020/0043511 | A1 * | 2/2020 | Raikar | G10L 21/043 |
| 2020/0053401 | A1 * | 2/2020 | Obara | H04N 21/23418 |
| 2020/0068274 | A1 * | 2/2020 | Aher | H04N 21/4825 |
| 2020/0145701 | A1 * | 5/2020 | Liu | H04N 21/8456 |
| 2020/0304844 | A1 * | 9/2020 | Kumar | H04N 21/84 |
| 2021/0044777 | A1 * | 2/2021 | Zheng | G09G 5/12 |
| 2022/0072433 | A1 * | 3/2022 | Wang | H04N 21/4854 |
| 2022/0167056 | A1 * | 5/2022 | Yamada | H04N 5/765 |
| 2022/0182710 | A1 * | 6/2022 | Gupta | H04N 21/4331 |
| 2022/0321946 | A1 * | 10/2022 | Panje | G11B 27/005 |
| 2023/0030502 | A1 * | 2/2023 | Huang | H04N 21/440281 |
| 2023/0046479 | A1 * | 2/2023 | Gattis | H04N 21/4394 |
| 2024/0305860 | A1 * | 9/2024 | Bao | H04N 19/188 |

FOREIGN PATENT DOCUMENTS

| | | | |
|---|---|---|---|
| CN | 109361955 | A | 2/2019 |
| CN | 110177298 | A | 8/2019 |
| CN | 111327967 | A | 6/2020 |
| CN | 112291620 | A | 1/2021 |
| CN | 112822546 | A | 5/2021 |

OTHER PUBLICATIONS

Ramos et al., "Straight to the Point: Fast-forwarding Videos via Reinforcement Learning Using Textual Data," Computer Vision and Pattern Recognition, total 10 pages (Mar. 31, 2020).

Silva et al., "A Sparse Sampling-Based Framework for Semantic Fast-Forward of First-Person Videos," arXiv:2009.11063v1 [cs. CV], In IEEE Transactions on Pattern Analysis and Machine Intelligence (TPAMI), total 12 pages, Institute of Electrical and Electronics Engineers, New York, New York (Sep. 21, 2020).

Ramos et al., "Fast-Forward Video Based on Semantic Extraction," 2016 IEEE International Conference on Image Processing (ICIP), total 5 pages, Institute of Electrical and Electronics Engineers, New York, New York (Sep. 2016).

Benaim et al., "SpeedNet: Learning the Speediness in Videos," 2020 IEEE/CVF Conference on Computer Vision and Pattern Recognition (CVPR), total 10 pages, Institute of Electrical and Electronics Engineers, New York, New York (Jun. 2020).

Furlan et al., "Fast forwarding Egocentric Videos by Listening and Watching," arXiv:1806.04620v1 [cs.CV], total 4 pages (Jun. 12, 2018).

* cited by examiner

Do you use a variable-speed function when watching a program/drama on a video platform?

(a)

(b)

(a)

(b)

VIDEO PLAYING METHOD AND APPARATUS

CROSS-REFERENCE TO RELATED APPLICATIONS

This application is a continuation of International Application No. PCT/CN2022/094784, filed on May 24, 2022, which claims priority to Chinese Patent Application No. 202110604488.9, filed on May 31, 2021. The disclosures of the aforementioned applications are hereby incorporated by reference in their entireties.

TECHNICAL FIELD

Embodiments of this application relate to the field of video processing, and in particular, to a video playing method and apparatus.

BACKGROUND

With widespread application of electronic devices, watching a video (e.g., a video of a movie or a television series, or an online teaching video) on an electronic device has become indispensable in people's daily lives. Currently, video variable-speed playing has become a habit of many young users. According to a survey result obtained through investigation and shown in FIG. 1, about 70% of users use a variable-speed function.

At present, a constant-speed function is generally launched on video playing platforms at home and abroad. A user selects the constant-speed function on a playing interface and selects an expected playing speed, and an electronic device plays a video based on the playing speed selected by the user. However, for a fast-paced video segment, the constant-speed function may cause a picture to become dizzy and voice to become sharp; and for a slow-paced video segment, the constant-speed function may fail to meet a watching speed requirement of the user. In this case, the user needs to frequently and manually switch between playing speeds to meet requirements of the user.

Due to disadvantages of the constant-speed function, the industry proposes many video adaptive speed change solutions, for example, a video adaptive speed change solution based on big data statistics, picture content, a voice speed, or voice and picture quality. A video variable-speed solution based on big data statistics requires a large amount of historical user data. For a newly launched video, adaptive speed changing in a cold start mode is not available. In a video variable-speed playing solution based on image content, a voice speed, or picture content and a voice speed of a video as reference information, a final video playing speed is determined only based on the reference information, and the final playing speed is absolutely affected by the reference information, without considering a personalized requirement of the user.

Therefore, a current video adaptive speed change solution still needs to be improved, to meet a personalized requirement of a user as well.

SUMMARY

According to a video playing method provided in this application, an adaptively varied playing speed is implemented, and a playing setting of a user is considered, thereby improving viewing experience of the user in a video played at an adaptively varied speed.

To achieve the foregoing objectives, this application uses the following technical solutions:

According to a first aspect, a video playing method is provided, and is applied to an electronic device. The method may include: obtaining a first playing speed; obtaining first information, where the first information includes image information of a video and/or voice information of the video; and playing the video at a second playing speed, where the second playing speed is obtained based on the first playing speed and the first information.

According to the video playing method provided in this application, the second playing speed for finally playing the video is determined based on the first playing speed related to a personalized requirement of a user and the first information. In this way, adaptive speed changing is implemented by considering both video content and the user requirement. When overall playing duration of the video is close to the user requirement, adaptive speed changing is implemented based on information such as picture content and a voice speed of the video, thereby improving viewing experience of the user.

In a possible implementation, the first playing speed is related to a playing setting of the user, to meet the personalized requirement of the user.

A playing speed of a video may indicate a playing rate or playing duration of each frame of image in the video, or may indicate a ratio of duration required to play the entire video at the speed to duration required to play the video at a 1× speed. When a video is played at the second playing speed, the second playing speed may indicate a speed sequence, to correspond to a playing speed of each frame in the video. Playing speeds of different frames may be the same or different.

In a possible implementation, first duration of playing the video by using the first playing speed is different from second duration of playing the video by using the second playing speed. The first playing speed may be a speed of playing the video at a fixed speed that is set by the user, and reflects a time in which the user expects to watch the video. When the video is played by using the second playing speed, because the information such as the picture content and the voice speed of the video is considered, the playing speed may vary according to the video content. Therefore, the second duration of playing the entire video is different from the first duration.

In a possible implementation, a difference between the second duration and duration of playing the video by using a playing speed $R_0$ specified by the user is less than or equal to a threshold, so that adaptive speed changing meets a requirement of the user for overall playing duration, thereby improving user experience.

In a possible implementation, the obtaining a first playing speed may be specifically implemented as: displaying a first interface based on obtained first operation information, where the first interface includes at least two options, and one option indicates one playing speed; obtaining second operation information; and determining the first playing speed based on the second operation information and the at least two options. In this implementation, a playing speed indicated by an option selected by the user on the first interface by using the second operation information is determined as the first playing speed, so that the first playing speed is a playing speed selected by the user.

The first operation information may be operation information that triggers displaying of the first interface, or the first operation information may be operation information that triggers selection of a playing speed. The first interface displays at least two options indicating different playing speeds, so that the user can select a playing speed on the interface.

In another possible implementation, the obtaining a first playing speed may be specifically implemented as: displaying a first interface based on obtained first operation information, where the first interface includes a first speed; displaying a second interface based on obtained second operation information, where the second interface includes a second speed; and determining the first playing speed based on the second speed. In this implementation, the second speed on the second interface triggered by the user by using the second operation information is determined as the first playing speed, so that the first playing speed is a playing speed selected by the user.

The first operation information in this implementation may be operation information for invoking a menu, and the first interface is an interface that presents the current first speed on a current playing interface of the video. The second operation information is operation information for adjusting a playing speed, and the second operation information may be selecting the second speed from a plurality of options, or the second operation information may be determining the second speed step by step.

In another possible implementation, the obtaining a first playing speed may be specifically implemented as: stopping playing a previous video of the video based on obtained first operation information, and starting to play the video; and determining the first playing speed based on a playing speed of the previous video. In this implementation, when the user triggers, by using the first operation information, switching to play a target video, a playing speed of an originally played video is determined as the first playing speed, so that the first playing speed is a habitual playing speed of the user.

The playing speed of the originally played video may be a first playing speed of the original video, or may be a second playing speed of the original video.

In another possible implementation, that the second playing speed is obtained based on the first playing speed and the first information includes: determining a corresponding third playing speed based on each type of information in the first information; and determining the second playing speed based on the first playing speed and all third playing speeds. The third playing speed corresponding to each type of information in a plurality of types of first information is separately determined, and then the second playing speed is determined based on the third playing speed and the first playing speed, so that the determined second playing speed meets both a user setting and a feature of each piece of first information of the to-be-played video, and viewing experience of the user may be greatly improved.

In another possible implementation, that the second playing speed is obtained based on the first playing speed and the first information includes: determining a corresponding third playing speed based on each type of information in the first information; and determining the second playing speed based on the first playing speed and some third playing speeds. The third playing speed corresponding to each type of information in a plurality of types of first information is separately determined, and then the second playing speed is determined based on some third playing speeds obtained through filtering and the first playing speed, so that the determined second playing speed meets both a user setting and a feature of each piece of first information of the to-be-played video, and viewing experience of the user may be greatly improved. Through the filtering, a third playing speed that does not meet a condition may be filtered out, so that efficiency of determining the second playing speed may be improved.

In another possible implementation, a third playing speed corresponding to one piece of first information may include a theoretical playing rate value or a maximum allowed playing rate value that is of each frame in the to-be-played video and that is determined by the first information. A playing rate of a frame in the second playing speed is less than or equal to a playing rate of the same frame in any third playing speed that includes a maximum allowed playing rate value. Third playing speeds are determined by using a plurality of pieces of first information, and a plurality of third playing speeds are fused, so that the second playing speed finally obtained through fusion may reflect a requirement of each piece of first information in a playing rate, and a playing rate determined by a piece of first information may also be controlled to be not too high, to avoid reducing viewing experience of other first information, thereby providing viewing experience with complete information and comfortable voice and pictures for the user.

In another possible implementation, each piece of first information corresponds to one third playing speed, and the third playing speeds for determining the second playing speed are referred to as candidate third playing speeds (all third playing speeds or some third playing speeds). Determining the second playing speed based on the candidate third playing speeds and the first playing speed may be specifically implemented as: performing a fusion operation on all candidate third playing speeds, or performing a fusion operation on candidate third playing speeds that include theoretical playing rate values, to obtain a fourth playing speed; performing a fusion operation on candidate third playing speeds that include maximum allowed playing rate values, to obtain a fifth playing speed; and performing numerical optimization on the fourth playing speed and the fifth playing speed based on the first playing speed $R_0$, to obtain the second playing speed. In this implementation, a specific method for obtaining the second playing speed is provided. First, the third playing speeds are fused by using a fusion operation, to improve accuracy and effectiveness of the theoretical playing rate values and the maximum allowed playing rate values in the playing speeds. Then, numerical optimization is performed based on the first playing speed $R_0$ related to the user setting, so that the finally obtained second playing speed not only can meet an expected speed change rate of the user, but also has high accuracy and effectiveness.

In another possible implementation, the performing numerical optimization on the fourth playing speed and the fifth playing speed based on the first playing speed $R_0$, to obtain the second playing speed may be specifically implemented as: inputting the fourth playing speed, the fifth playing speed, and $R_0$ into an objective function to perform numerical optimization, and using, as the second playing speed, a playing speed that minimizes the objective function. The objective function is used to describe a degree to which a playing speed obtained based on the fourth playing speed and the fifth playing speed meets $R_0$. A smaller value of the objective function indicates that the playing speed obtained based on the fourth playing speed and the fifth playing speed is closer to $R_0$. Numerical optimization is implemented by using the objective function, to improve feasibility and accuracy of the solution, thereby ensuring that the determined second playing speed is optimal.

Different playing speeds may be obtained based on the fourth playing speed and the fifth playing speed by adjusting a preset parameter of the objective function.

In another possible implementation, third playing speeds corresponding to the image information of the video include third playing speeds that are corresponding to the image information of the video at a plurality of different playing speeds and that include theoretical playing rate values. Obtaining the second playing speed based on the candidate third playing speeds and the first playing speed may be specifically implemented as: separately performing a fusion operation on third playing speeds corresponding to the image information of the video at a plurality of different playing speeds and third playing speeds corresponding to other first information, or separately performing a fusion operation on third playing speeds corresponding to the image information of the video at a plurality of different playing speeds and third playing speeds that are corresponding to other first information and that include theoretical playing rate values, to obtain a plurality of fourth playing speeds; performing a fusion operation on all third playing speeds that include maximum allowed playing rate values, to obtain a fifth playing speed; and inputting each of the fourth playing speeds, the fifth playing speed, and the first playing speed $R_0$ into the objective function, and using, as the second playing speed, a playing speed that minimizes the objective function. The objective function is used to describe a degree to which a playing speed obtained based on the fourth playing speed and the fifth playing speed meets $R_0$. A smaller value of the objective function indicates that the playing speed obtained based on the fourth playing speed and the fifth playing speed is closer to $R_0$. In this implementation, a specific method for obtaining the second playing speed is provided. A plurality of different playing speeds are preconfigured to obtain a plurality of third playing speeds corresponding to the image information of the video, a plurality of fourth playing speeds are further obtained through fusion, and then the final second playing speed is obtained by substituting the plurality of fourth playing speeds into the objective function. This solution is simple and efficient in implementation, and improves processing efficiency and a processing speed.

In another possible implementation, the objective function may meet the following expression: $\mathrm{argmin}_s E_{speed}(S,V)+\beta E_{rate}(S,R_0)+\alpha E_{smooth}(S',n)+\delta E_A(S,A)$.

$\mathrm{argmin}_s$ indicates that a second playing speed S is selected to minimize a function value, and α, β, and δ are preset parameters.

$E_{speed}(S,V)$ is used to control a low acceleration segment to be close to a minimum playing rate $R_{min}$ specified by the user, and $$E_{speed}(S, V) = \sum_t \left(1 - \hat{V}(t)\right)(S(t) - R_{min})^2 + \gamma \sum_t \hat{V}(t)(S(t) - R_0)^2,$$

where $\hat{V}(t)$ is a normalized playing rate of a $t^{th}$ frame in the fourth playing speed, S(t) is a playing rate of the $t^{th}$ frame in the second playing speed, and γ is a preset parameter.

$E_{rate}(S, R_0)$ is used to control an overall speed change rate to be close to $R_0$, and $$E_{rate}(S, R_0) = \left(\frac{1}{T}\sum S(t) - R_0\right)^2,$$

where T is a total quantity of picture frames in the to-be-played video.

$E_{smooth}(S', n)$ is used to control smoothness of the second playing speed, and $$E_{smooth}(S', n) = \sum_t (S(t) - S(t+n))^2,$$

where $^n$ is a smooth width of the objective function.

$E_A(S,A)$ is used to control the second playing speed not to exceed a playing rate of a same frame in the fifth playing speed, and $$E_A(S, A) = \sum_t (S(t) - A(t))^2,$$

if A(t)>0 and S(t)>A(t), where A(t) is a playing rate of the $t^{th}$ frame in the fifth playing speed.

In another possible implementation, the fusion operation includes selecting a playing rate between a largest playing rate and a smallest playing rate of a same frame in different third playing speeds, to fuse a plurality of third playing speeds into one playing speed.

In another possible implementation, the third playing speeds participating in the fusion operation include maximum allowed playing rate values, and the fusion operation includes: if a smallest playing rate of a same frame in different third playing speeds is a maximum allowed playing rate value, selecting a smallest maximum allowed playing rate value of the frame in the third playing speeds participating in fusion; or if a smallest playing rate of a same frame in different third playing speeds is a theoretical playing rate value, selecting a calculated value of a smallest maximum allowed playing rate value of the frame and the smallest playing rate value of the frame in the third playing speeds participating in fusion, where the calculated value may be an average value, a largest value, a smallest value, or the like.

In another possible implementation, the third playing speeds participating in the fusion operation do not include a maximum allowed playing rate value, and the fusion operation is selecting a calculated value of a largest theoretical playing rate value and a smallest theoretical playing rate value of a same frame in different third playing speeds, where the calculated value may be an average value, a largest value, a smallest value, or the like.

In another possible implementation, the first information may further include content that the user is interested in. The content that the user is interested in includes at least one of the following information: character description information of the video, content description information of the video, and content structure information of the video. Correspondingly, a third playing speed corresponding to the content that the user is interested in may include a theoretical playing rate value of each frame in the to-be-played video.

The character description information of the video is used to indicate information about a character that is in the video and that the user is interested in, and the character may be an actor, a played role, or the like. The content description information of the video is used to indicate information about a plot or content that is in the video and that the user is interested in. The content structure information of the video is used to indicate information about a chapter or a position that is in the video and that the user is interested in.

In another possible implementation, a speed at which a frame that is in the video and that is related to the content that the user is interested in is played at the second playing speed is not greater than a speed at which the frame is played at the first playing speed, so that the content that the user is interested in is slowly played, thereby improving viewing experience of the user.

In another possible implementation, the first information may further include first playing mode information of the to-be-played video, and the first playing mode information is associated with playing size information corresponding to the video. The playing size information corresponding to the video may be used to indicate a display scale or a display size of the video, for example, full-screen display or small-window display. Correspondingly, the first playing mode information is used to determine a theoretical value of a playing speed of the video. When a playing size is large, a relatively high playing speed may be used; and when the playing size is small, a relatively low playing speed may be used, so that the user can clearly watch the video content.

In another possible implementation, the first information may further include second playing mode information of the to-be-played video, and the second playing mode information is associated with definition information of the video. The definition information of the video may be used to indicate video playing resolution, for example, a high-definition mode, a Blu-ray mode, or a low-traffic mode. Correspondingly, the second playing mode information is used to determine a theoretical value of a playing speed of the video. When definition of the video is high, a relatively high playing speed may be used; and when the definition of the video is low, a relatively low playing speed may be used, so that the user can clearly watch the video content.

In another possible implementation, the first information may further include motion status information of the electronic device. The motion status information may be used to indicate a moving speed of the electronic device, a pose relative to the user, or the like. Correspondingly, the motion status information is used to determine a theoretical value of a playing speed of the video. When the moving speed of the electronic device is high or the electronic device is at an angle that is inconvenient for the user to watch, a relatively low playing speed may be used; and when the moving speed of the electronic device is low or the electronic device is at an angle that is convenient for the user to watch, a relatively high playing speed may be used, so that the user can clearly watch the video content.

In another possible implementation, the first information may further include noise intensity information of the electronic device. The noise intensity information of the electronic device may be used to indicate an environmental interference degree of the electronic device. Correspondingly, the noise intensity information of the electronic device is used to determine a theoretical value of a playing speed of the video. When noise intensity of the electronic device is high, a relatively low playing speed may be used; and when the noise intensity of the electronic device is low, a relatively high playing speed may be used, so that the user can clearly hear voice in the video.

In another possible implementation, the first information may further include user viewpoint information. The user viewpoint information may be used to indicate a point at which a line of sight of the user falls when the user watches the video, and reflect an interest of the user. Correspondingly, the user viewpoint information is used to determine a theoretical value of a playing speed of the video. When the user viewpoint information indicates that the user watches the video for a long time, a relatively low playing speed may be used; and when the user viewpoint information indicates that the user does not watch the video, a relatively high playing speed may be used, so that the playing speed of the video meets the user viewpoint information.

In another possible implementation, the first information may further include connection status information of an audio playing device. The audio playing device may be a headset or a sound box. The connection status information of the audio playing device is used to indicate whether the audio playing device is connected. When the audio playing device is connected, the user is highly sensitive to video voice and is not likely to be interfered with by an external environment; and when the audio playing device is not connected, the user is less sensitive to the video voice and is likely to be interfered with by the external environment. Correspondingly, the connection status information of the audio playing device is used to determine a theoretical value of a playing speed of the video. When the connection status information of the audio playing device is connected, a relatively high playing speed may be used; and when the connection status information of the audio playing device is unconnected, a relatively low playing speed may be used, so that the user can clearly hear voice in the video.

In another possible implementation, the first information may further include network status information. The network status information is used to indicate quality or a type of a network accessed by the electronic device. When the electronic device accesses a high-quality network, video playing is smooth; or otherwise, video playing is frozen. Correspondingly, the network status information is used to determine a theoretical value of a playing speed of the video. When the network status information indicates that the electronic device is connected to a high-quality network, a relatively high playing speed may be used; and when the network status information indicates that the electronic device is connected to a low-quality network, a relatively low playing speed may be used, to avoid a situation in which frame freezing occurs when the user watches the video.

In another possible implementation, the first information may further include environment information, and the environment information may include internal status information of a device that plays the to-be-played video or external environment information of a device that plays the to-be-played video. A third playing speed corresponding to the external environment information includes a maximum allowed playing rate value that is of each frame in the to-be-played video and that is determined by the external environment information; and a third playing speed corresponding to the internal status information includes a maximum allowed playing rate value that is of each frame in the to-be-played video and that is determined by the internal status information.

In another possible implementation, a third playing speed corresponding to the image information of the video includes a theoretical playing rate value that is of each frame in the video and that is determined by a motion speed of a target in a picture. A third playing speed corresponding to the voice information of the video includes a maximum allowed playing rate value that is of each frame in the to-be-played video and that is determined by the voice speed.

In another possible implementation, the theoretical playing rate value may include: different theoretical playing rate values corresponding to different degrees to which the content that the user is interested in is met, or different theoretical playing rate values corresponding to different ranges of a moving speed of a target. A higher degree to which the content that the user is interested in is met corresponds to a smaller theoretical playing rate value, and a higher moving speed of the target corresponds to a smaller theoretical playing rate value, to ensure that the determined playing speed meets the interest of the user, or ensure that the determined second playing speed can ensure visual perception of the user.

In another possible implementation, the video playing method provided in this application may further include: storing the second playing speed and the to-be-played video in a correspondence, so that another device obtains the to-be-played video and the second playing speed, and plays the to-be-played video by using the second playing speed.

According to a second aspect, a video playing apparatus is provided. The apparatus may include a first obtaining unit, a second obtaining unit, and a playing unit.

The first obtaining unit is configured to obtain a first playing speed. Optionally, the first playing speed is related to a playing setting of a user.

The second obtaining unit is configured to obtain first information, where the first information includes image information of a video and/or voice information of the video.

The playing unit is configured to play the video at a second playing speed, where the second playing speed is obtained based on the first playing speed and the first information.

According to the video playing apparatus provided in this application, the second playing speed for finally playing the video is determined based on the first playing speed related to a personalized setting of the user and the first information. In this way, both a requirement of the user for overall playing duration of the video and playing perception of content such as a picture and the voice speed of the video are considered, so that user experience during video watching is improved.

It should be noted that specific implementations of the units in the second aspect are the same as the descriptions of the method in the first aspect. Details are not described herein.

According to a third aspect, this application provides an electronic device. The electronic device may implement a function in the method example described in the first aspect. The function may be implemented by hardware, or may be implemented by hardware executing corresponding software. The hardware or the software includes one or more modules corresponding to the function. The electronic device may exist in a product form of a chip.

In a possible implementation, a structure of the electronic device includes a processor and a transceiver. The processor is configured to support the electronic device in performing a corresponding function in the method. The transceiver is configured to support communication between the electronic device and another device. The electronic device may further include a memory. The memory is configured to be coupled to the processor, and the memory stores program instructions and data that are necessary for the electronic device.

According to a fourth aspect, a computer-readable storage medium is provided, including instructions. When the instructions are run on a computer, the computer is enabled to perform the video playing method provided in any one of the first aspect or the possible implementations of the first aspect.

According to a fifth aspect, a computer program product including instructions is provided. When the computer program product is run on a computer, the computer is enabled to perform the video playing method provided in any one of the first aspect or the possible implementations of the first aspect.

According to a sixth aspect, this application provides a chip system. The chip system includes a processor, may further include a memory, and is configured to implement a corresponding function in the method. The chip system may include a chip, or may include a chip and another discrete component.

According to a seventh aspect, this application provides a video playing system. The system includes a first device, the first device may be the electronic device described in the third aspect, and the electronic device has a function in any one of the first aspect or the possible implementations of the first aspect.

In a possible implementation, the video playing system may further include a second device, and the second device is configured to obtain a second playing speed of a to-be-played video from the first device, and play the to-be-played video by using the second playing speed.

It should be noted that various possible implementations in any one of the foregoing aspects may be combined on a premise that the solutions are not contradictory.

DESCRIPTION OF EMBODIMENTS

Figure 1:
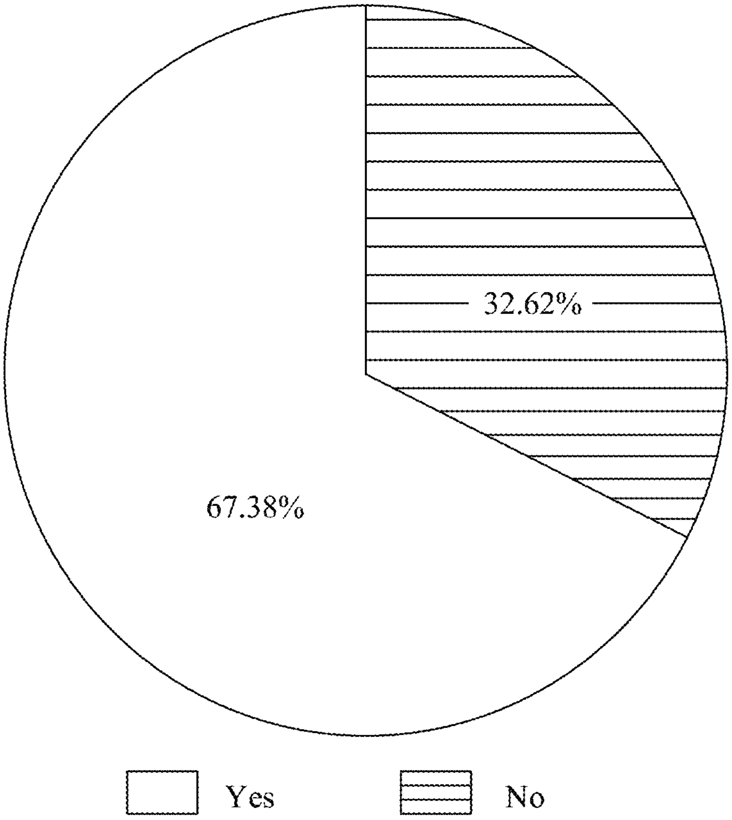
FIG. 1 is a schematic diagram of a survey result.

In embodiments of this application, to clearly describe technical solutions in embodiments of this application, words such as “first” and “second” are used to distinguish between same items or similar items whose functions or purposes are basically the same. A person skilled in the art may understand that the words such as “first” and “second” do not limit a quantity or an execution sequence, and the words such as “first” and “second” do not indicate a definite difference. There is no chronological order or no size order between technical features described by “first” and “second”.

In embodiments of this application, the word “example” or “for example” is used to represent giving an example, an illustration, or a description. Any embodiment or design scheme described as an “example” or “for example” in embodiments of this application should not be explained as being more preferred or having more advantages than another embodiment or design scheme. Exactly, use of the word such as “example” or “for example” is intended to present a relative concept in a specific manner for ease of understanding.

In embodiments of this application, “at least one” may also be described as “one or more”, and “a plurality of” may be “two, three, four, or more”. This is not limited in this application.

In addition, a network architecture and a scenario described in embodiments of this application are intended to describe the technical solutions in embodiments of this application more clearly, and do not constitute a limitation on the technical solutions provided in embodiments of this application. A person of ordinary skill in the art may learn that with evolution of the network architecture and emergence of new service scenarios, the technical solutions provided in embodiments of this application are also applicable to similar technical problems.

Before embodiments of this application are described, nouns in this application are explained and described herein in a centralized manner. Details are not described below.

Video: refers to a dynamic sequence of continuous images and a voice sequence corresponding to the images.

Image information of a video: refers to a sequence of images (also referred to as pictures) included in the video. The image information of the video is a set of static pictures.

Voice information of a video: refers to a voice sequence included in the video. A voice segment corresponding to each frame of image in the video is used as a voice frame, and all voice frames in the video constitute the voice information of the video. Voice frames one-to-one correspond to image frames. When an image frame is played, a voice frame corresponding to the image frame is synchronously played.

Playing speed of an image frame: may indicate a quantity (frame rate) of frames played in a unit time when a video is played, or may indicate duration of playing one frame. When a video is played at a playing speed, duration of playing each frame of image in the video may be the same or different. An original playing frame rate of the video may be obtained based on a capability of human eyes to perceive a flicker of light. The original playing frame rate of the video is an attribute parameter of the video. The video may be played at the original playing frame rate by default.

Video playing speed: refers to a playing speed sequence including playing speeds (or frame rates) of all frames (image frames and voice frames) in a video, and may be constant or variable.

For clear and brief description of the following embodiments, a related technology is briefly described first.

In recent years, functions of an electronic device (e.g., a terminal) become increasingly richer, bringing better use experience to a user. For example, the electronic device may be used to watch an online video, for example, a movie or television program video, an online education video, or a surveillance video, and provide a variable-speed function for the user in a watching process, so that the user increases or decreases a video playing speed based on a personal preference, and changes video playing duration.

The electronic device may be a smartphone, a tablet computer, a wearable device, an augmented reality (AR)/virtual reality (VR) device, or the like. A specific form of the electronic device is not limited in this application. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn by the user or integrated into clothes or an accessory of the user. The wearable device is not only a hardware device, but also implements a powerful function through software support, data exchange, and cloud interaction. In a broad sense, wearable intelligent devices include full-featured and large-sized devices that can implement all or some functions without depending on smartphones, for example, smartwatches or smart glasses, and include devices that focus on only one type of application function and need to collaboratively work with other devices such as smartphones, for example, various smart bands or smart jewelry for monitoring physical signs.

Figure 2:
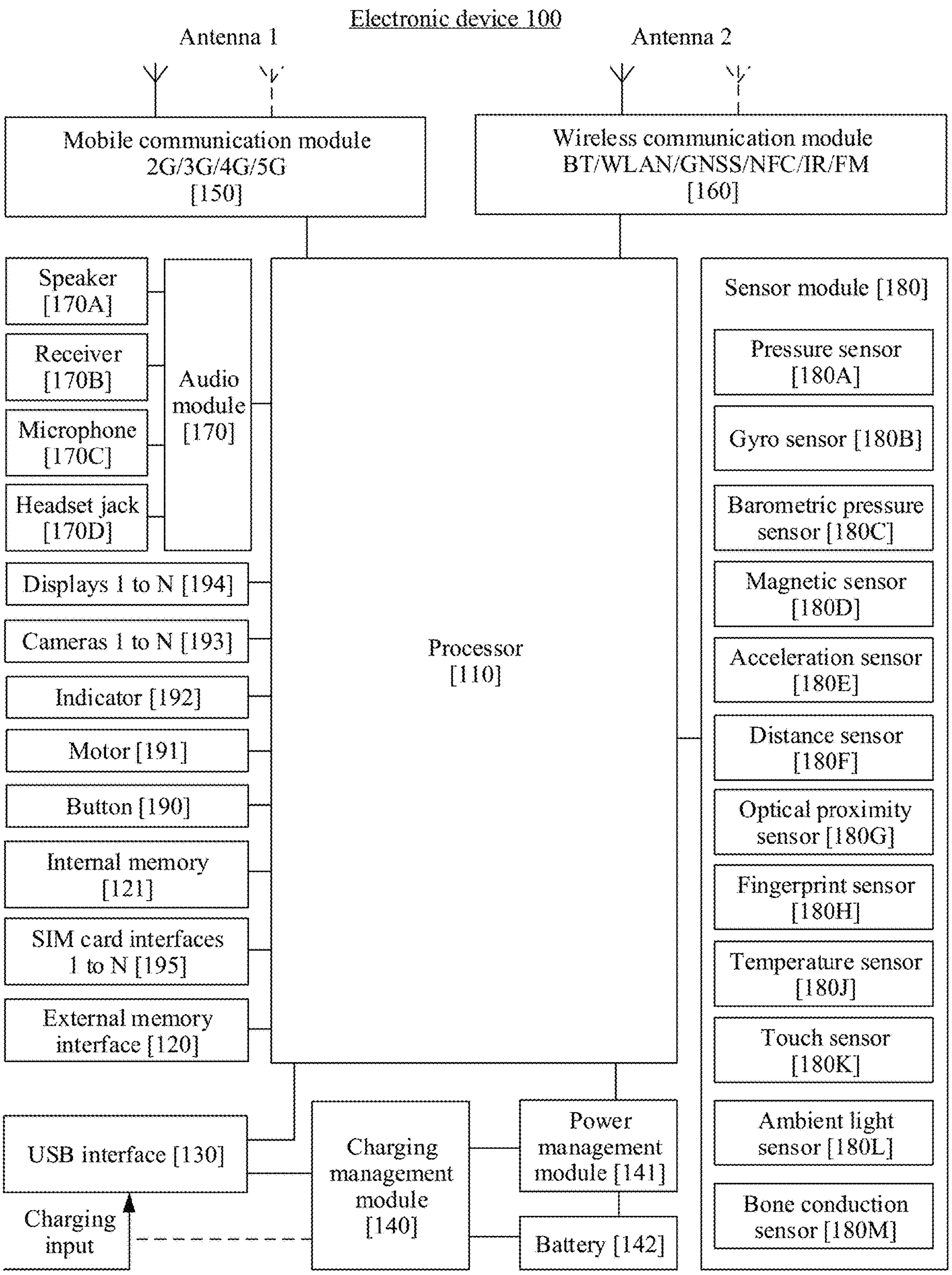
FIG. 2 is a schematic diagram of a structure of an electronic device according to an embodiment of this application.

In this application, a structure of an electronic device may be shown in FIG. 2. As shown in FIG. 2, the electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors. For example, in this application, the processor 110 may obtain a first playing speed, where optionally, the first playing speed is related to a playing setting of a user; obtain first information, where the first information includes image information of a video and/or voice information of the video; and obtain a second playing speed based on the first playing speed and the first information.

The controller may be a nerve center and a command center of the electronic device 100. The controller may generate an operation control signal based on an instruction operation code and a time sequence signal, to complete control of instruction fetching and instruction executing.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or the data again, the processor 110 may directly invoke the instructions or the data from the memory. This avoids repeated access, reduces a waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may be further configured to connect to another electronic device such as an AR device.

It may be understood that an interface connection relationship between the modules illustrated in this embodiment is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The power management module 141 is configured to connect to the battery 142, the charging management module 140, and the processor 110. The power management module 141 receives input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communication module 150, the wireless communication module 160, the modem processor, the baseband processor, and the like.

The electronic device 100 implements a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

A series of graphical user interfaces (GUIs) may be displayed on the display 194 of the electronic device 100, and all these GUIs are of a home screen of the electronic device 100. Generally, a size of the display 194 of the electronic device 100 is fixed, and only limited controls can be displayed on the display 194 of the electronic device 100. The control is a GUI element, and is a software component, which is included in an application and controls all data processed by the application and interaction operations related to the data. A user may interact with the control through direct manipulation (direct manipulation), to read or edit related information of the application. Generally, controls may include visual interface elements such as an icon, a button, a menu, a tab, a text box, a dialog box, a status bar, a navigation bar, and a widget.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into an image visible to naked eyes. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various functional applications and data processing of the electronic device 100. For example, in this embodiment, the processor 110 may execute the instructions stored in the internal memory 121 to perform a video playing method provided in this application, to obtain a playing speed of a video played by the electronic device 100. The internal memory 121 may include a program storage area and a data storage area. The program storage area may store an operating system, an application required by at least one function (e.g., a voice playing function or an image playing function), and the like. The data storage area may store data (e.g., audio data and an address book) created during use of the electronic device 100, and the like. In addition, the internal memory 121 may include a high-speed random access memory, and may further include a nonvolatile memory, for example, at least one magnetic disk storage device, a flash memory, or a universal flash storage (UFS). The processor 110 runs the instructions stored in the internal memory 121 and/or the instructions stored in the memory disposed in the processor, to perform various functional applications and data processing of the electronic device 100.

The electronic device 100 may implement an audio function, for example, voice playing, music playing, and recording in a video, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a hands-free call through the speaker 170A.

The receiver 170B, also referred to as an "earpiece", is configured to convert an audio electrical signal into a sound signal. When a call is answered or voice information is received through the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100 to collect a sound signal, implement noise reduction, and identify a sound source, to implement a directional recording function and the like.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface, or the like.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The electronic device 100 determines pressure intensity based on the change in the capacitance. When a touch operation is performed on the display 194, the electronic device 100 detects intensity of the touch operation based on the pressure sensor 180A. The electronic device 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is executed.

The gyro sensor 180B may be configured to determine a motion posture of the electronic device 100. In some embodiments, angular velocities of the electronic device 100 around three axes (namely, axes x, y, and z) may be determined through the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a somatic game scenario. The gyro sensor 180B may further determine whether the electronic device 100 is in a moving state.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall effect sensor. The electronic device 100 may detect opening and closing of a flip cover or a leather case by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking upon opening of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer. The acceleration sensor 180E may be further configured to determine whether the electronic device 100 is in a moving state.

The distance sensor 180F is configured to measure a distance. The electronic device 100 may measure a distance in an infrared manner or a laser manner. In some embodiments, in a photographing scenario, the electronic device 100 may measure a distance through the distance sensor 180F to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light emitting diode. The electronic device 100 detects infrared reflected light from a nearby object by using the photodiode. When abundant reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically perform screen-off for power saving. The optical proximity sensor 180G may also be used in a leather case mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown caused by a low temperature.

The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of a touch event. Visual output related to the touch operation may be provided through the display 194. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive button input, and generate button signal input related to a user setting and function control of the electronic device 100.

The motor 191 may generate a vibration prompt. The motor 191 may be configured to provide an incoming call vibration prompt and a touch vibration feedback. For example, touch operations performed on different applications (e.g., photographing and audio playing) may correspond to different vibration feedback effects. The motor 191 may also correspond to different vibration feedback effects for touch operations performed on different areas of the display 194. Different application scenarios (e.g., a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

In addition, an operating system runs above the foregoing components, for example, an iOS operating system developed by Apple, an Android open-source operating system developed by Google, or a Windows operating system developed by Microsoft. An application may be installed and run on the operating system.

An operating system of the electronic device 100 may use a layered architecture, an event-driven architecture, a microkernel architecture, a microservice architecture, a cloud architecture, or another architecture. In an embodiment of this application, an Android system with a layered architecture is used as an example to describe a software structure of the electronic device 100.

Figure 3:
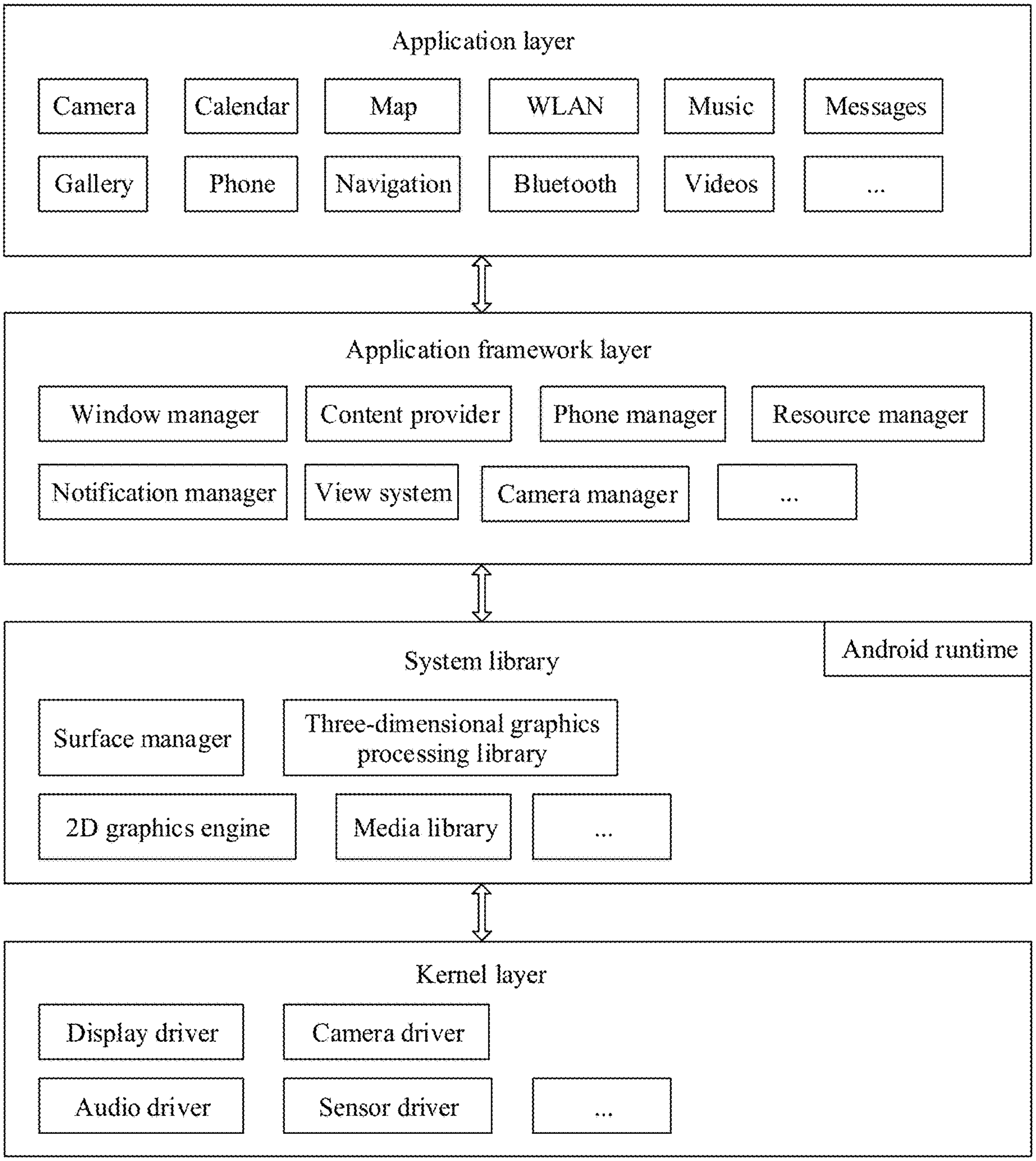
FIG. 3 is a schematic diagram of a software structure of an electronic device according to an embodiment of this application.

FIG. 3 is a block diagram of a software structure of an electronic device 100 according to an embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages. As shown in FIG. 3, the application packages may include applications such as Camera, Gallery, Calendar, Phone, Map, Navigation, WLAN, Bluetooth, Music, Videos, and Messages. For example, during photographing, the camera application may access a camera interface management service provided by the application framework layer.

The application framework layer provides an application programming interface (API) and a programming framework for an application at the application layer. The application framework layer includes some predefined functions. As shown in FIG. 3, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, capture a screenshot, and the like.

The content provider is configured to: store and obtain data, and enable the data to be accessed by an application. The data may include a video, an image, audio, calls made and answered, browsing history and a bookmark, an address book, and the like.

The view system includes visual controls such as a control for displaying a text and a control for displaying a picture. The view system may be configured to construct an application. A display interface may include one or more views. For example, a display interface including an SMS message notification icon may include a text display view and a picture display view.

The phone manager is configured to provide a communication function for the electronic device 100, for example, management of a call status (including answering, declining, or the like).

The resource manager provides various resources such as a localized character string, an icon, a picture, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, provide a message notification, and the like. The notification manager may alternatively be a notification that appears in a top status bar of the system in a form of a graph or a scroll bar text, for example, a notification of an application that is run on a background, or may be a notification that appears on a screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (e.g., OpenGL ES), and a 2D graphics engine (e.g., SGL).

The surface manager is configured to manage a display subsystem and provide fusion of 2D and 3D layers for a plurality of applications.

The media library supports playing and recording in a plurality of commonly used audio and video formats, static image files, and the like. The media library may support a plurality of audio and video encoding formats, for example, moving picture experts group (MPEG)-4, H.264, MP3, advanced audio coding (AAC), adaptive multi-rate (AMR), joint photographic experts group (JPEG), and portable network graphics format (PNG).

The three-dimensional graphics processing library is configured to implement three-dimensional graphics drawing, image rendering, composition, layer processing, and the like.

The two-dimensional (2D) graphics engine is a drawing engine for 2D drawing.

The kernel layer is a layer between hardware and software. The kernel layer includes at least a display driver, a camera driver, an audio driver, and a sensor driver.

It should be noted that, although this embodiment of this application is described by using the Android® system as an example, a basic principle in this embodiment is also applicable to an electronic device that is based on an operating system such as iOS® or Windows®.

The following describes technical solutions of this application with reference to accompanying drawings.

The video playing method provided in embodiments of this application may be applied to a scenario in which a user plays a video by using an electronic device. Alternatively, the video playing method provided in embodiments of this application may be further applied to a scenario in which a video server preprocesses a video. The video server may configure an adaptive playing speed for a video provided by the video server, and provide the configured adaptive playing speed when another device obtains the video, so that the another device may choose to play the obtained video based on the adaptive playing speed.

The following describes an example of a working procedure of software and hardware of the electronic device 100 with reference to FIG. 2 and a scenario in which a user plays a video by using the electronic device.

For example, on a video playing interface of the electronic device 100, the touch sensor 180K of the electronic device 100 receives a touch operation performed by the user on a playing speed "2.0×", and reports the touch operation to the processor 110, so that the processor 110 displays, on the display 194 in response to the touch operation, a video currently played by the electronic device 100, at a frame rate twice an original playing frame rate. In this example, the touch operation is used to select a fixed double frame rate to play the video, that is, the foregoing constant speed. For a fast-paced video segment, the constant-speed function may cause a picture to become dizzy and voice to become sharp; and for a slow-paced video segment, the constant-speed function may fail to meet a watching speed requirement of the user. In this case, the user needs to frequently and manually switch between speeds to meet requirements of the user. Therefore, many video adaptive speed change solutions emerge.

There is a video adaptive speed change solution based on big data statistics, picture content, a voice speed, or voice and picture quality. A video variable-speed solution based on big data statistics requires a large amount of historical user data. For a newly launched video, adaptive speed changing in a cold start mode is not available.

A video variable-speed playing solution based on picture content has some application value in specific scenarios (such as security protection and sports scenarios) that focus on picture information, but has low application value in audiovisual scenarios (having information ingestion and perception requirements for both a picture and voice).

In a video variable-speed playing solution based on a voice speed, a speed change rate of a video is adaptively adjusted only based on a fastest speaking speed that can be understood by people, and viewing experience of a picture in the video cannot be considered.

In a video variable-speed playing solution based on a voice speed and picture quality, a video segment with too much noise and a video segment with large picture shaking are considered as secondary segments and can be quickly accelerated, and other segments are slowly accelerated. However, although this solution considers both voice information and picture information, voice and pictures that are skipped by fast acceleration have almost no information, and an application scenario is limited. For most movie and television works, both voice quality and picture quality are high, and this solution cannot effectively implement speed changing.

In addition, in the foregoing adaptive video variable-speed playing solutions, a final playing speed is absolutely affected by reference information (image content, a voice speed, or picture content and a voice speed of a video), and a playing speed related to a playing setting of a user is not considered. Therefore, viewing experience of the user needs to be improved.

Based on this, this application provides a video playing method, specifically including: determining a second playing speed for playing a video, based on a first playing speed related to a playing setting of a user and image and/or voice information of the video. In this way, adaptive speed changing is implemented by considering both video content and a user requirement, thereby improving viewing experience of the user in a video played at an adaptively varied speed.

The following describes the method provided in this application from a model training side and a model application side.

The video playing method provided in embodiments of this application relates to video processing. Specifically, data processing methods such as data training, machine learning, and deep learning may be applied to perform symbolic and formalized intelligent information modeling, extraction, preprocessing, training, and the like on training data (e.g., first information in a video), to finally obtain a trained video understanding network. In addition, the foregoing trained video understanding network (a video image understanding network and a video voice understanding network) may be used in the video playing method provided in embodiments of this application, and input data (e.g., the to-be-played video in this application) is input into the trained video understanding network, to obtain output data (a third playing speed corresponding to the first information). It should be noted that a training method of the video image understanding network or the video voice understanding network and the video playing method that are provided in embodiments of this application are inventions generated based on a same concept, and may also be understood as two parts of a system, or two phases of an entire procedure, for example, a model training phase and a model application phase.

Embodiments of this application relate to massive application of a neural network. Therefore, for ease of understanding, the following first describes terms and concepts related to the neural network in embodiments of this application.

(1) Neural Network (NN)

A neural network is a machine learning model, and is a machine learning technology that can implement quasi-artificial intelligence by simulating a neural network of a human brain. Input and output of the neural network may be configured based on an actual requirement, and the neural network may be trained by using sample data, so that an error between output of the neural network and real output corresponding to the sample data is minimized. The neural network may include a neural unit. The neural unit may be an arithmetic logic unit that uses $x_s$ and an intercept of 1 as input. Output of the arithmetic logic unit may be:

$$h_{W,b}(x) = f\left(W^T x\right) = f\left(\sum_{s=1}^{n} W_s x_s + b\right) \quad \text{(Formula 1)}$$

Herein, s=1, 2, . . . , or n, n is a natural number greater than 1, $W_s$ is a weight of $x_s$, and b is bias of the neural unit. $f$ is an activation function (activation function) of the neural unit, which is used to introduce a nonlinear characteristic into the neural network, to convert an input signal in the neural unit into an output signal. An output signal of the activation function may be used as input of a next convolutional layer. The activation function may be a sigmoid function. The neural network is a network formed by connecting a plurality of single neural units together. To be specific, output of one neural unit may be input of another neural unit. Input of each neural unit may be connected to a local receptive field of a previous layer, to extract a feature of the local receptive field. The local receptive field may be an area including several neural units.

(2) Deep Neural Network

The deep neural network (DNN) is also referred to as a multi-layer neural network, and may be understood as a neural network having a plurality of hidden layers. There is no special metric for "a plurality of" herein. The DNN is divided based on positions of different layers, and a neural network in the DNN may be divided into three types: an input layer, a hidden layer, and an output layer. Generally, a first layer is the input layer, a last layer is the output layer, and a middle layer is the hidden layer. Layers are fully connected. To be specific, any neuron at an $i^{th}$ layer is necessarily connected to any neuron at an $(i+1)^{th}$ layer. Although the DNN seems complex, the DNN is actually not complex in terms of work at each layer. Simply speaking, the DNN is the following linear relationship expression: $\vec{y}=\alpha(W\vec{x}+b)$, where $\vec{x}$ is an input vector, $\vec{y}$ is an output vector, b is an offset vector, W is a weight matrix (also referred to as a coefficient), and $\alpha(\ )$ is an activation function. At each layer, the output vector $\vec{y}$ is obtained only by performing such a simple operation on the input vector $\vec{x}$. Because the DNN has the plurality of layers, there are also a plurality of coefficients W and offset vectors b. Definitions of these parameters in the DNN are as follows: The coefficient W is used as an example. It is assumed that in a DNN having three layers, a linear coefficient from a fourth neuron at a second layer to a second neuron at a third layer is defined as $$W_{24}^{3}.$$

A superscript 3 represents a layer at which the coefficient W is located, and a subscript corresponds to an output third-layer index 2 and an input second-layer index 4. It is concluded that a coefficient from a $k^{th}$ neuron at an $(L-1)^{th}$ layer to a $j^{th}$ neuron at an $L^{th}$ layer is defined as $$W_{jk}^{L}.$$

It should be noted that there is no parameter W at the input layer. In the deep neural network, more hidden layers make the network more capable of describing a complex case in the real world. Theoretically, a model with more parameters has higher complexity and a larger "capacity". It indicates that the model can complete a more complex learning task. Training the deep neural network is a process of learning a weight matrix, and a final objective of the training is to obtain a weight matrix of all layers of a trained deep neural network (a weight matrix formed by vectors W at a plurality of layers).

(3) Convolutional Neural Network

The CNN is a deep neural network with a convolutional structure. The convolutional neural network includes a feature extractor including a convolutional layer and a sub-sampling layer. The feature extractor may be considered as a filter. A convolution process may be considered as performing convolution by using a trainable filter and an input image or a convolution feature plane (feature map). The convolutional layer is a neuron layer that is in the convolutional neural network and at which convolution processing is performed on an input signal. At the convolutional layer of the convolutional neural network, one neuron may be connected only to some adjacent-layer neurons. One convolutional layer usually includes several feature planes, and each feature plane may include some neural units that are in a rectangular arrangement. Neural units at a same feature plane share a weight, and the weight shared herein is a convolution kernel. Weight sharing may be understood as that an image information extraction manner is irrelevant to a position. A principle implied herein is that statistics of a part of an image are the same as statistics of other parts. This means that image information learned in a part can also be used in another part. Therefore, the same image information obtained through learning can be used for all positions on the image. At a same convolutional layer, a plurality of convolution kernels may be used to extract different image information. Usually, a larger quantity of convolution kernels indicates richer image information reflected in a convolution operation.

The convolution kernel may be initialized in a form of a matrix of a random size. In a training process of the convolutional neural network, the convolution kernel may obtain a proper weight through learning. In addition, benefits directly brought by weight sharing are that connections among layers of the convolutional neural network are reduced, and an overfitting risk is reduced.

(4) A Recurrent Neural Network (RNN) is Used for Processing Sequence Data

A conventional neural network model starts from an input layer to a hidden layer and then to an output layer, and the layers are fully connected, but nodes in each layer are unconnected. This ordinary neural network resolves many problems, but is still incompetent to resolve many problems. For example, if a word in a sentence is to be predicted, a previous word usually needs to be used, because adjacent words in the sentence are related. A reason why the RNN is referred to as the recurrent neural network is that current output of a sequence is also related to previous output of the sequence. A specific representation form is that the network memorizes previous information and applies the previous information to calculation of the current output. To be specific, nodes at the hidden layer are no longer unconnected, but are connected, and input of the hidden layer not only includes output of the input layer, but also includes output of the hidden layer at a previous moment. Theoretically, the RNN can process sequence data of any length. Training for the RNN is the same as training for a conventional CNN or DNN. An error backpropagation learning algorithm is also used, but there is a difference: If the RNN is expanded, a parameter such as W of the RNN is shared. This is different from the conventional neural network described in the foregoing example. In addition, during use of a gradient descent algorithm, output in each step depends not only on a network in a current step, but also on a network status in several previous steps. The learning algorithm is referred to as a backpropagation through time (BPTT) algorithm.

Why is the recurrent neural network still required when the convolutional neural network is available? A reason is simple. In the convolutional neural network, there is a premise that elements are independent of each other, and input and output are also independent, such as a cat and a dog. However, in the real world, a plurality of elements are interconnected. For example, the stock changes with time. For another example, a person says "I like traveling, and the most favorite place is Yunnan. In the future, when there is a chance, I will go to (_)". Herein, people should know that the person will go to "Yunnan", because people perform inference from the context. However, how can a machine do this? Then, the RNN emerges. The RNN is intended to make the machine capable of memorizing like a human. Therefore, output of the RNN needs to depend on current input information and historical memorized information.

(6) Loss Function

In a process of training a deep neural network, because it is expected that output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, the difference between the predicted value and the target value" needs to be predefined. This is the loss function (loss function) or an objective function (objective function). The loss function and the objective function are important equations used to measure the difference between the predicted value and the target value. The loss function is used as an example. A higher output value (loss) of the loss function indicates a larger difference. Therefore, training of the deep neural network is a process of minimizing the loss as much as possible.

The following describes a system architecture provided in embodiments of this application.

Figure 4:
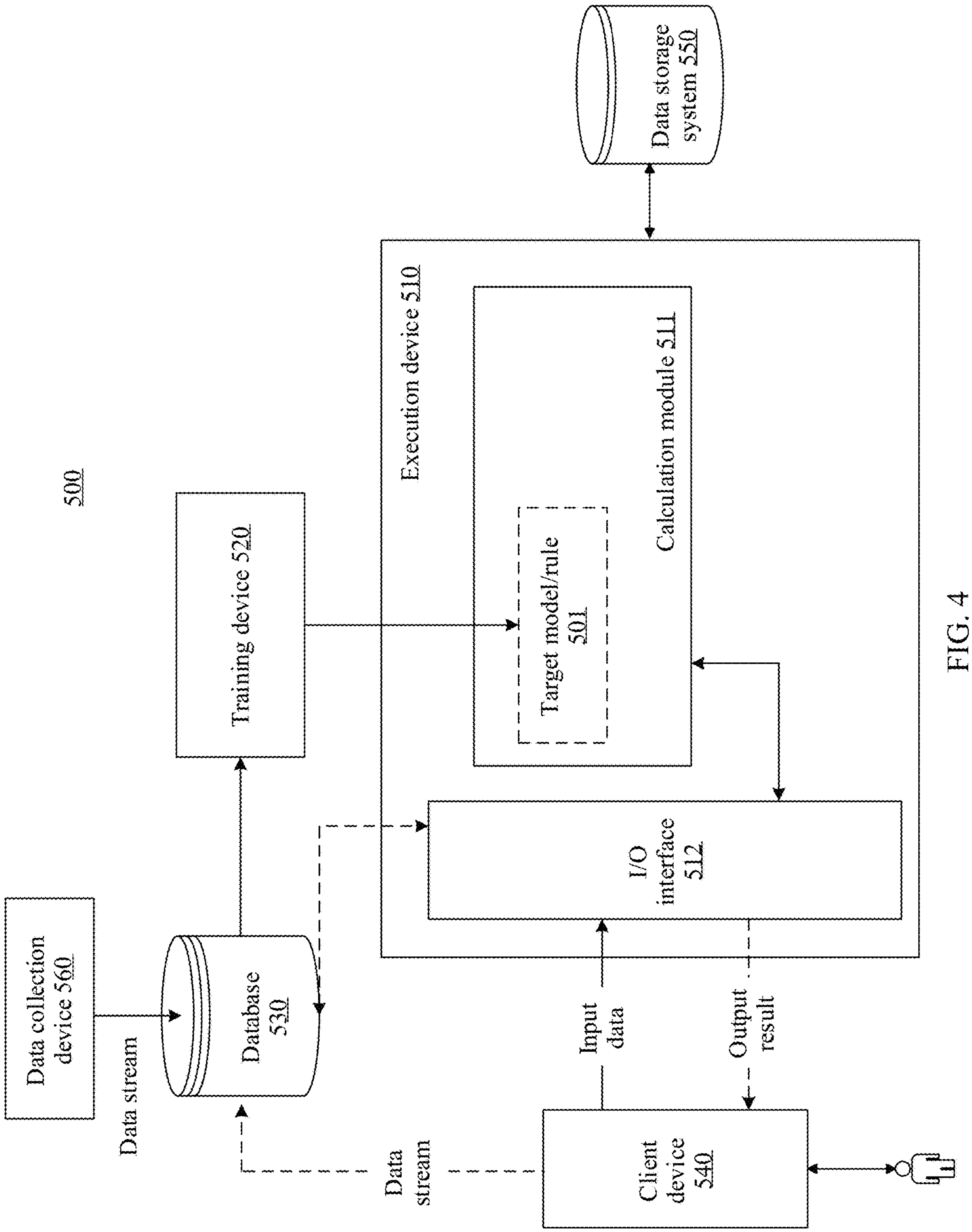
FIG. 4 is a schematic diagram of a system architecture according to an embodiment of this application.

Refer to FIG. 4. An embodiment of the present disclosure provides a system architecture 500. As shown in the system architecture 500, a data collection device 560 is configured to collect training data. In this embodiment of this application, the training data includes first information of a video (the first information includes image information of the video and/or voice information of the video). The training data is stored in a database 530. A training device 520 performs training based on the training data maintained in the database 530, to obtain a target model/rule 501. The target model/rule 501 may be the video understanding network described in embodiments of this application. That is, the to-be-played video may be input into the target model/rule 501, to obtain a third playing speed corresponding to the first information of the to-be-played video, where the third playing speed is used to describe a playing rate of each frame in the to-be-played video. In embodiments provided in this application, the video understanding network is obtained through training. It should be noted that, during actual application, the training data maintained in the database 530 is not necessarily all collected by the data collection device 560, and may be received from another device. It should further be noted that the training device 520 may not necessarily train the target model/rule 501 completely based on the training data maintained in the database 530, or may obtain training data from a cloud or another place to perform model training. The foregoing descriptions should not be construed as a limitation on embodiments of this application.

The target model/rule 501 obtained through training performed by the training device 520 may be applied to different systems or devices, for example, applied to an execution device 510 shown in FIG. 4. The execution device 510 may be an electronic device, for example, a mobile phone terminal, a tablet computer, a notebook computer, AR/VR, or an in-vehicle terminal; or may be a server, a cloud, or the like. In FIG. 4, an I/O interface 512 is configured for the execution device 510, to exchange data with an external device. A user may input data into the I/O interface 512 through a client device 540. In this embodiment of this application, the input data may include the to-be-played video.

When a calculation module 511 of the execution device 510 performs calculation or other related processing, the execution device 510 may invoke data, code, and the like in a data storage system 550 for corresponding processing, and may store, in the data storage system 550, data, instructions, and the like that are obtained through corresponding processing.

Finally, the I/O interface 512 returns a processing result, for example, an obtained second playing speed of the to-be-played video, to the client device 540, and the client device 540 plays the to-be-played video based on the second playing speed, to provide viewing experience with complete information and comfortable voice and pictures for the user.

It should be noted that the training device 520 may generate corresponding target models/rules 501 for different first information of a video based on different training data. The corresponding target models/rules 501 may be used to obtain third playing speeds corresponding to different first information.

In a case shown in FIG. 4, the user may manually input data, and the user may manually input the data on an interface provided by the I/O interface 512. In another case, the client device 540 may automatically send input data to the I/O interface 512. If it is required that the client device 540 needs to obtain authorization from the user to automatically send the input data, the user may set corresponding permission on the client device 540. The client device 540 may also serve as a data collector to collect, as new sample data, input data that is input into the I/O interface 512 and an output result that is output from the I/O interface 512 that are shown in FIG. 4, and store the new sample data into the database 530. Certainly, the client device 540 may alternatively not perform collection, but the I/O interface 512 directly stores, as new sample data into the database 530, input data that is input into the I/O interface 512 and an output result that is output from the I/O interface 512 that are shown in FIG. 4.

It should be noted that FIG. 4 is merely a schematic diagram of a system architecture according to an embodiment of the present disclosure. A position relationship between devices, components, modules, and the like shown in the figure does not constitute any limitation. For example, in FIG. 4, the data storage system 550 is an external memory relative to the execution device 510, and in another case, the data storage system 550 may alternatively be disposed in the execution device 510. In some embodiments, the execution device 510 and the client device 540 may be deployed as one device in an integrated manner.

The method and an apparatus that are provided in embodiments of this application may be further used to expand a training database. As shown in FIG. 4, the I/O interface 512 of the execution device 510 may send, as a training data pair, a video processed by the execution device 510 and a processing result to the database 530, so that the database 530 maintains richer training data, thereby providing richer training data for training work of the training device 520.

As shown in FIG. 4, the target model/rule 501 is obtained through training based on the training device 520. In this embodiment of this application, the target model/rule 501 may be the video understanding network. Each video understanding network provided in embodiments of this application may be a convolutional neural network, a recurrent neural network, or the like.

For example, when the target model/rule 501 is a video image understanding network, a function of the video image understanding network is to determine, for image information of a video, whether an image meets a condition. The video image understanding network predicts whether each frame of image meets a condition, configures a relatively small theoretical playing rate value for an image that meets the condition, configures a relatively large theoretical playing rate value for an image that does not meet the condition, and outputs a playing rate of each frame of image as a third playing speed corresponding to the image of the to-be-played video.

It should be noted that, for the third playing speed corresponding to the image information of the video, specific playing rate values configured based on whether the condition is met may be configured based on an actual requirement. This is not limited in this embodiment of this application.

For example, when the target model/rule 501 is a video image understanding network, a function of the video image understanding network is to determine, for image information of a video, a degree to which an image meets a condition. The video image understanding network predicts a degree to which each frame of image meets a condition, configures a relatively small playing rate for an image that fully meets the condition, configures a relatively large playing rate for an image that does not meet the condition at all, configures a medium playing rate for an image that partially meets the condition, and outputs a playing rate of each frame of image as a third playing speed corresponding to the image information of the to-be-played video.

It should be noted that, for the third playing speed corresponding to the image information of the video, specific playing rate values configured based on different degrees to which the condition is met may be configured based on an actual requirement. This is not limited in this embodiment of this application.

For example, when the target model/rule 501 is a video image understanding network, and a condition is that a motion speed of a target in an image is greater than a threshold, a function of the video image understanding network is to predict, for image information, a motion speed of a target in an image. The video image understanding network predicts a motion speed of a target in each frame of image, configures a relatively small playing rate for an image in which a target quickly moves, configures a relatively large playing rate for an image in which a target slowly moves, and outputs a playing rate of each frame of image as a third playing speed corresponding to the image information of the to-be-played video.

It should be noted that, for the third playing speed corresponding to the image information, specific playing rate values configured based on different motion speeds of the target in the image may be configured based on an actual requirement. This is not limited in this embodiment of this application.

It should further be noted that the third playing speed corresponding to the image information may be a relative suggestion on playing rate values of image frames, and does not restrict a final speed change rate.

The target in the image may be a target that moves fastest in the image, or the target in the image may be a target in a central area of the image. The target in the image is not limited in this embodiment of this application. The central area of the image may be configured based on an actual requirement. This is not limited in this embodiment of this application either.

For example, when the target model/rule 501 is a video voice understanding network, a function of the video voice understanding network is to predict a voice speed for voice information of a video. The video voice understanding network predicts a voice speed in a voice frame corresponding to each image frame, calculates, based on a maximum comfortable voice speed tolerance value of human beings obtained through statistics collection, a maximum playable rate corresponding to each frame, and outputs a maximum playing rate of each frame of voice as a third playing speed corresponding to the voice information of the to-be-played video.

It should be noted that the third playing speed corresponding to the voice information may be an absolute limitation on a playing rate, and indicates a maximum suggested value of a final playing speed. If the playing rate is exceeded, perception of the video is not good.

As described in the foregoing basic concepts, the convolutional neural network is a deep neural network with a convolutional structure, and is a deep learning (deep learning) architecture. In the deep learning architecture, multi-layer learning is performed at different abstract levels by using a machine learning algorithm. As a deep learning architecture, the CNN is a feed-forward (feed-forward) artificial neural network. Neurons in the feed-forward artificial neural network may respond to an input image.

Figure 5:
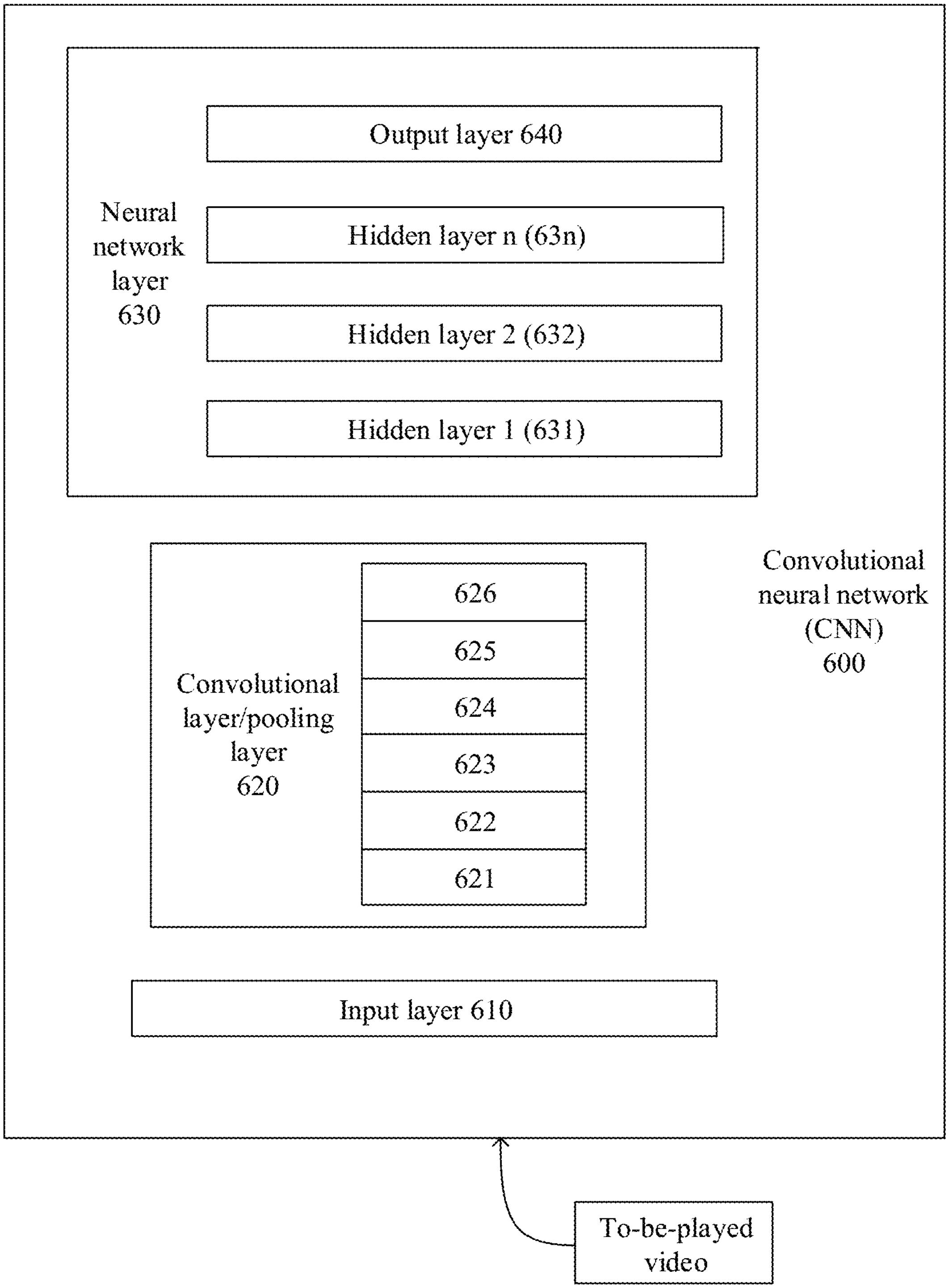
FIG. 5 is a schematic diagram of a structure of a convolutional neural network (CNN) according to an embodiment of this application.

As shown in FIG. 5, a convolutional neural network (CNN) 600 may include an input layer 610, a convolutional layer/pooling layer 620 (the pooling layer is optional), and a neural network layer 630.

Convolutional Layer/Pooling Layer 620:

Convolutional Layer:

As shown in FIG. 5, the convolutional layer/pooling layer 620 may include, for example, layers 621 to 626. For example, in an implementation, the layer 621 is a convolutional layer, the layer 622 is a pooling layer, the layer 623 is a convolutional layer, the layer 624 is a pooling layer, the layer 625 is a convolutional layer, and the layer 626 is a pooling layer. In another implementation, 621 and 622 are convolutional layers, 623 is a pooling layer, 624 and 625 are convolutional layers, and 626 is a pooling layer. That is, output of a convolutional layer may be used as input of a subsequent pooling layer, or may be used as input of another convolutional layer to continue a convolution operation.

The following uses the convolutional layer 621 as an example to describe an internal working principle of one convolutional layer.

The convolutional layer 621 may include a plurality of convolution operators. The convolution operator is also referred to as a kernel. In image processing, the convolution operator functions as a filter that extracts specific information from an input image matrix. The convolution operator may be essentially a weight matrix, and the weight matrix is usually predefined. In a process of performing a convolution operation on an image, the weight matrix is usually used to process pixels at a granularity level of one pixel (or two pixels, . . . , depending on a value of a stride (stride)) in a horizontal direction on the input image, to extract a specific feature from the image. A size of the weight matrix should be related to a size of the image. It should be noted that a depth dimension (depth dimension) of the weight matrix is the same as a depth dimension of the input image. During a convolution operation, the weight matrix extends to an entire depth of the input image. Therefore, convolutional output of a single depth dimension is generated through convolution with a single weight matrix. However, in most cases, a single weight matrix is not used, but a plurality of weight matrices with a same size (rows×columns), namely, a plurality of same-type matrices, are applied. Output of the weight matrices is stacked to form a depth dimension of a convolutional image. The dimension herein may be understood as being determined based on the foregoing "plurality". Different weight matrices may be used to extract different features from the image. For example, one weight matrix is used to extract edge information of the image, another weight matrix is used to extract a specific color of the image, and still another weight matrix is used to blur unnecessary noise in the image. The plurality of weight matrices have the same size (rows×columns), and feature maps extracted from the plurality of weight matrices with the same size have a same size. Then, the plurality of extracted feature maps with the same size are combined to form output of the convolution operation.

During actual application, weight values in these weight matrices need to be obtained through a lot of training. Each weight matrix formed by using the weight values obtained through training may be used to extract information from an input image, to enable the convolutional neural network 600 to perform correct prediction.

When the convolutional neural network 600 includes a plurality of convolutional layers, a larger quantity of general features are usually extracted at an initial convolutional layer (e.g., 621). The general features may be also referred to as low-level features. As a depth of the convolutional neural network 600 increases, a feature extracted at a more subsequent convolutional layer (e.g., 626) is more complex, for example, a higher-level semantic feature. A feature with higher semantics is more applicable to a to-be-resolved problem.

Pooling Layer:

Because a quantity of training parameters usually needs to be reduced, a pooling layer usually needs to be periodically introduced after a convolutional layer. For the layers 621 to 626 illustrated in 620 in FIG. 5, one convolutional layer may be followed by one pooling layer, or a plurality of convolutional layers may be followed by one or more pooling layers. During image processing, the pooling layer is only used to reduce a space size of an image. The pooling layer may include an average pooling operator and/or a maximum pooling operator, to perform sampling on an input image to obtain an image with a relatively small size. The average pooling operator may be used to calculate pixel values in the image in a specific range, to generate an average value. The average value is used as a result of average pooling. The maximum pooling operator may be used to select a pixel with a largest value in a specific range as a result of maximum pooling. In addition, similar to that the size of the weight matrix at the convolutional layer should be related to the size of the image, an operator at the pooling layer should also be related to the size of the image. A size of a processed image output from the pooling layer may be less than a size of an image input to the pooling layer. Each pixel in the image output from the pooling layer represents an average value or a maximum value of a corresponding sub-area of the image input to the pooling layer.

Neural Network Layer 630

After processing is performed by the convolutional layer/pooling layer 620, the convolutional neural network 600 still cannot output required output information, because as described above, at the convolutional layer/pooling layer 620, only a feature is extracted, and parameters resulting from an input image are reduced. However, to generate final output information (required class information or other related information), the convolutional neural network 600 needs to use the neural network layer 630 to generate output of one required class or a group of required classes. Therefore, the neural network layer 630 may include a plurality of hidden layers (631, 632, . . . , and 63*n* shown in FIG. 5) and an output layer 640. Parameters included in the plurality of hidden layers may be obtained through pre-training based on related training data of a specific task type. For example, the task type may include image recognition, image classification, super-resolution image reconstruction, and the like.

At the neural network layer 630, the plurality of hidden layers are followed by the output layer 640, namely, the last layer of the entire convolutional neural network 600. The output layer 640 has a loss function similar to a categorical cross entropy, and the loss function is specifically used to calculate a prediction error. Once forward propagation (e.g., propagation in a direction from 610 to 640 in FIG. 5) of the entire convolutional neural network 600 is completed, back propagation (e.g., propagation in a direction from 640 to 610 in FIG. 5) is started to update a weight value and a deviation of each layer mentioned above, to reduce a loss of the convolutional neural network 600 and an error between a result output by the convolutional neural network 600 by using the output layer and an ideal result.

It should be noted that the convolutional neural network 600 shown in FIG. 5 is used only as an example of a convolutional neural network. In specific application, the convolutional neural network may alternatively exist in a form of another network model.

The following describes a hardware structure of a chip provided in an embodiment of this application.

Figure 6:
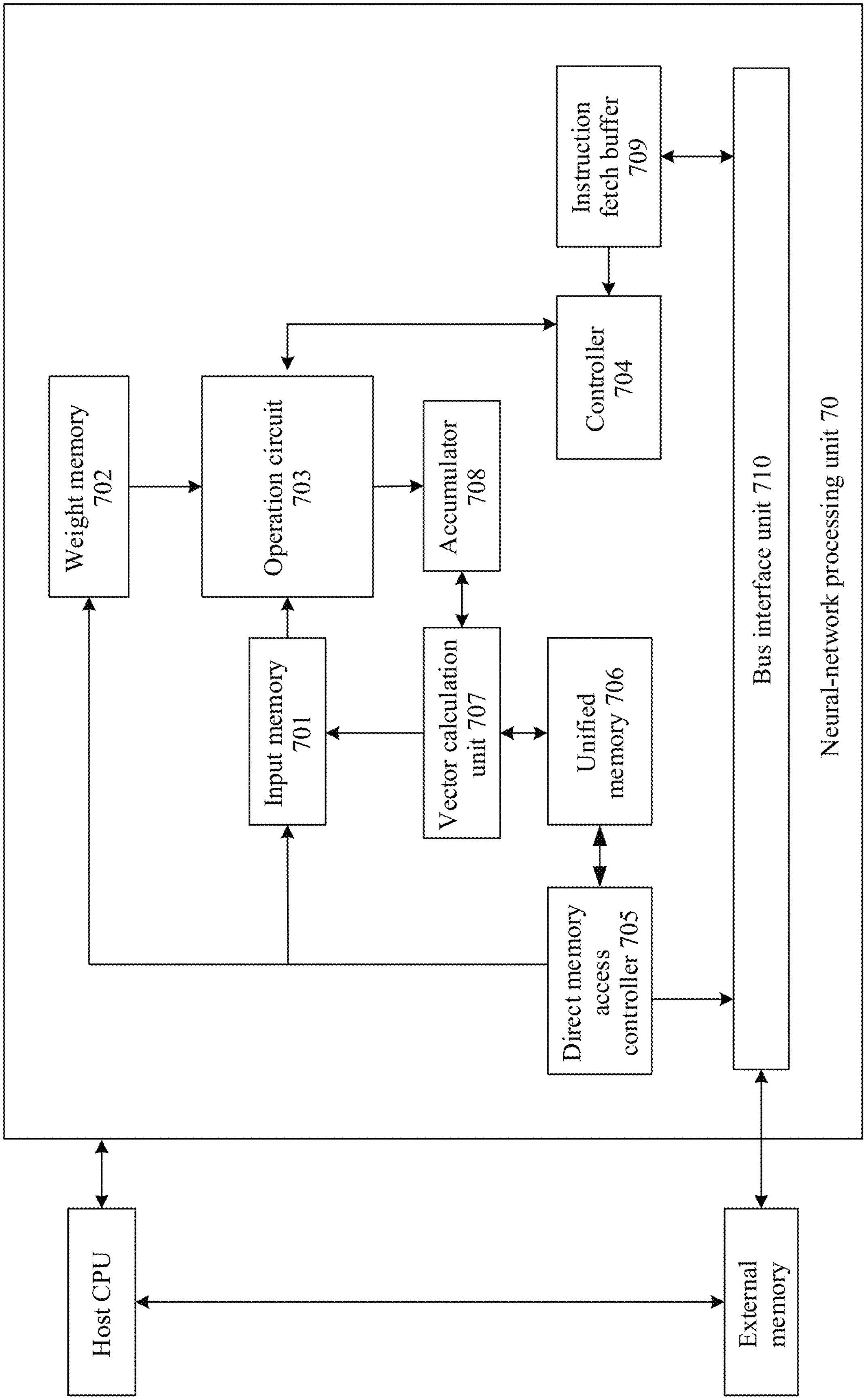
FIG. 6 is a schematic diagram of a hardware structure of a chip according to an embodiment of this application.

FIG. 6 shows a hardware structure of a chip according to an embodiment of the present disclosure. The chip includes a neural-network processing unit (NPU) 70. The chip may be disposed in the execution device 510 shown in FIG. 4, and is configured to complete calculation work of the calculation module 511. The chip may alternatively be disposed in the training device 520 shown in FIG. 4, and is configured to complete training work of the training device 520 and output the target module/rule 501. Algorithms at all layers of the convolutional neural network shown in FIG. 5 may be implemented in the chip shown in FIG. 6.

As shown in FIG. 6, the NPU 70 is mounted to a host central processing unit (CPU) (Host CPU) as a coprocessor, and the host CPU allocates a task to the NPU 70. A core part of the NPU is an operation circuit 703, and a controller 704 controls the operation circuit 703 to extract data in a memory (a weight memory or an input memory) and perform an operation.

In some implementations, the operation circuit 703 includes a plurality of processing engines (PEs). In some implementations, the operation circuit 703 is a two-dimensional systolic array. The operation circuit 703 may alternatively be a one-dimensional systolic array, or another electronic circuit capable of performing mathematical operations such as multiplication and addition. In some implementations, the operation circuit 703 is a general-purpose matrix processor.

For example, it is assumed that there is an input matrix A, a weight matrix B, and an output matrix C. The operation circuit 703 fetches, from a weight memory 702, data corresponding to the matrix B, and buffers the data on each PE in the operation circuit. The operation circuit 703 stores, into an accumulator (accumulator) 708, some matrix results or a final matrix result obtained by performing a matrix operation on data of the matrix A fetched from an input memory 701 and the matrix B.

A vector calculation unit 707 may perform further processing such as vector multiplication, vector addition, an exponent operation, a logarithm operation, or value comparison on output of the operation circuit 703. For example, the vector calculation unit 707 may be configured to perform network calculation, such as pooling (Pooling), batch normalization (Batch Normalization), or local response normalization (Local Response Normalization), at a non-convolutional/non-fully connected layer (fully connected layer, FC) in a neural network.

In some implementations, the vector calculation unit 707 can store a processed output vector in a unified memory 706. For example, the vector calculation unit 707 may apply a non-linear function to the output of the operation circuit 703, for example, a vector of an accumulated value, to generate an activation value. In some implementations, the vector calculation unit 707 generates a normalized value, a combined value, or both. In some implementations, the processed output vector can be used as activation input to the operation circuit 703. For example, the processed output vector can be used at a subsequent layer in the neural network.

For example, algorithms at all layers of the convolutional neural network shown in FIG. 5 may be executed by 703 or 707. Algorithms of the calculation module 511 and the training device 520 in FIG. 4 may be executed by 703 or 707.

The unified memory 706 is configured to store input data and output data.

For weight data, a direct memory access controller (DMAC) 705 transfers input data in an external memory to the input memory 701 and/or the unified memory 706, stores weight data in the external memory into the weight memory 702, and stores data in the unified memory 706 into the external memory.

A bus interface unit (BIU) 710 is configured to implement interaction between the host CPU, the DMAC, and an instruction fetch buffer 709 through a bus.

The instruction fetch buffer (instruction fetch buffer) 709 connected to the controller 704 is configured to store instructions to be used by the controller 704.

The controller 704 is configured to invoke the instructions buffered in the instruction fetch buffer 709, to control a working process of an operation accelerator.

For example, the data herein may be description data, and may be input or output data of each layer in the convolutional neural network shown in FIG. 5, or may be input or output data of the calculation module 511 and the training device 520 in FIG. 4.

Generally, the unified memory 706, the input memory 701, the weight memory 702, and the instruction fetch buffer 709 each are an on-chip (On-Chip) memory. The external memory is a memory outside the NPU. The external memory may be a double data rate synchronous dynamic random access memory (DDR SDRAM), a high bandwidth memory (HBM), or another readable and writable memory.

Optionally, program algorithms in FIG. 4 and FIG. 5 are jointly completed by the host CPU and the NPU.

An embodiment of this application provides a video playing method, applied to a process in which a user plays a video by using an electronic device or a process in which a video server preprocesses a video.

In a possible implementation, the video playing method may be performed by the execution device 510 (e.g., a server that provides a video) in FIG. 4. The calculation module 511 in the execution device 510 may be configured to perform the following S1001 and S1002. The client device 540 plays a to-be-played video based on a second playing speed obtained in S1002.

In another possible implementation, the video playing method may be performed by the client device 540 (e.g., an electronic device) in FIG. 4.

It should be noted that an execution body of the video playing method is not limited in this embodiment of this application. In the following embodiment, the video playing method is performed by an electronic device. Units in the electronic device may be deployed on one device, or may be separately deployed on a plurality of devices. This is not limited in this embodiment of this application.

Specifically, the video playing solution provided in this application is referred to as adaptive acceleration or AI acceleration. The electronic device may provide, in a plurality of manners, a user with a manner of enabling an adaptive acceleration function.

In a possible implementation, in video playing software of the electronic device, the user may enable the adaptive acceleration function through a setting. When the user enables the function, the solution provided in this application is performed on all videos, to perform adaptive acceleration.

Figure 7:
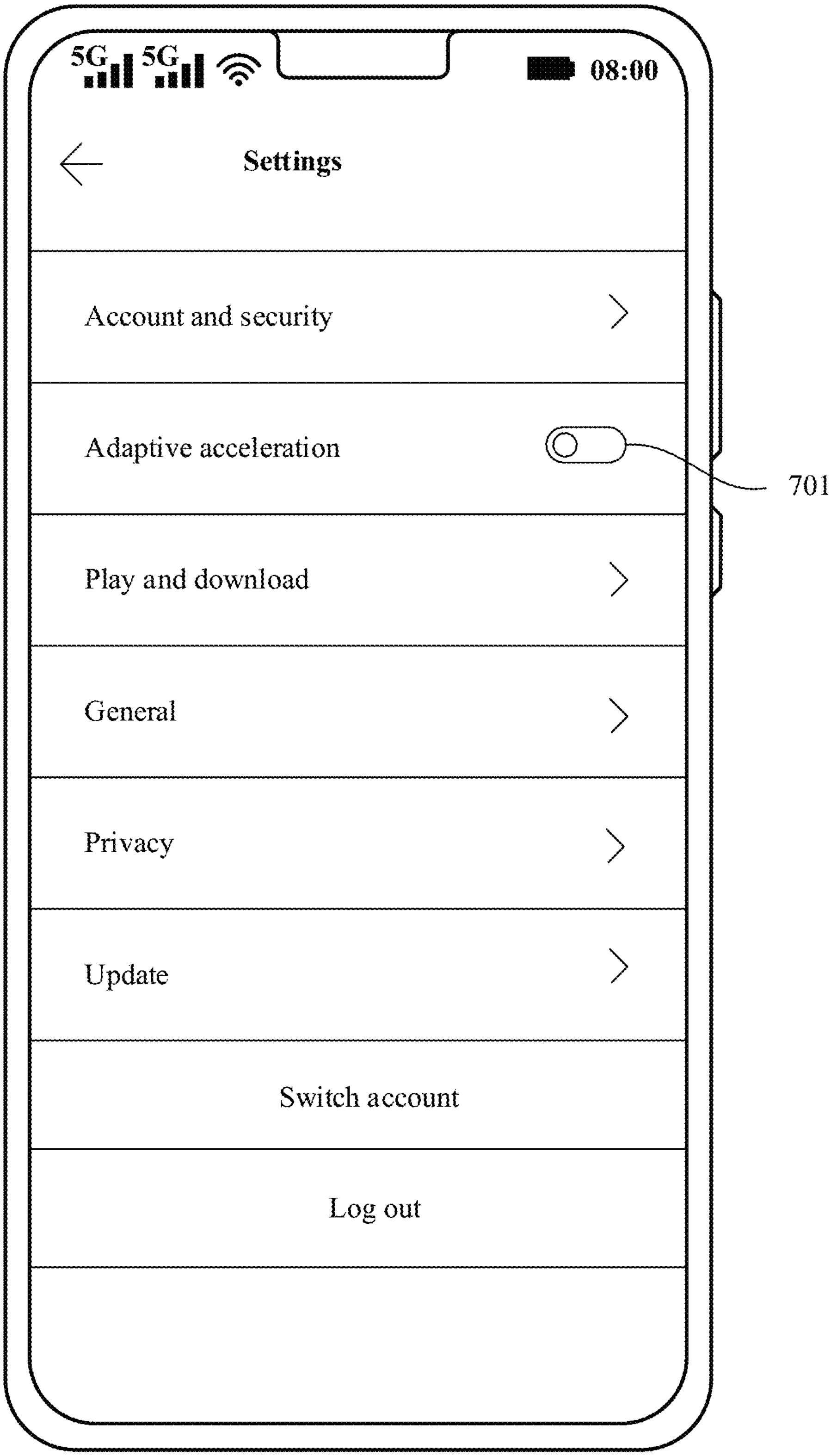
FIG. 7 is a schematic diagram of a setting interface of an electronic device according to an embodiment of this application.

For example, on a user setting interface of a piece of software shown in FIG. 7, an icon 701 for setting the adaptive acceleration function is used to enable or disable adaptive acceleration based on user selection. When the adaptive acceleration function is enabled, the user can enjoy an acceleration effect obtained after the adaptive acceleration function is combined with a playing rate selected by the user, with no need to separately choose to enable the function for each to-be-played video.

In a possible implementation, in the video playing software of the electronic device, the adaptive acceleration function may be enabled by default, and the user may disable the adaptive acceleration function on the setting interface shown in FIG. 7.

In another possible implementation, in the video playing software of the electronic device, the adaptive acceleration function may be disabled by default, and the user may enable the adaptive acceleration function on the setting interface shown in FIG. 7.

In another possible implementation, in the video playing software of the electronic device, the user may perform an operation on a video playing interface to enable or disable the adaptive acceleration function for a currently played video. When the user enables the function, the solution provided in this application is performed on the currently played video, to perform adaptive acceleration.

Figure 8:
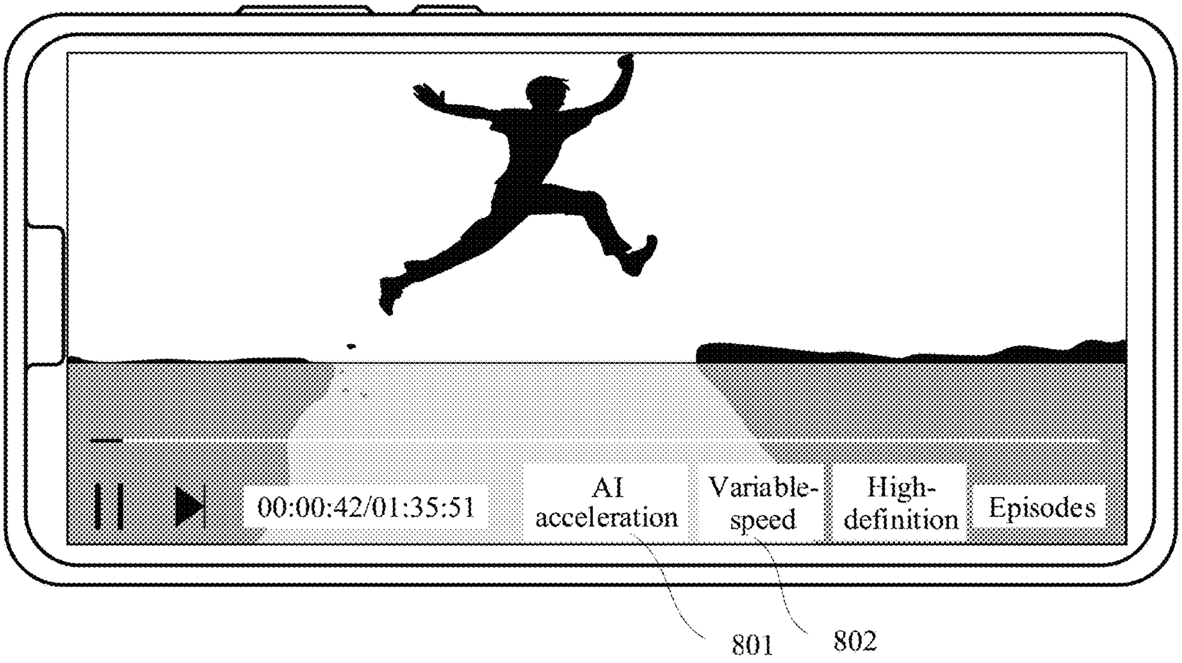
FIG. 8 is a schematic diagram of a playing interface according to an embodiment of this application.

For example, on an interface that is of the electronic device and that is shown in FIG. 8, a video A is to be played or is being played based on an operation of the user. The interface in FIG. 8 provides an adaptive intelligent (AI) acceleration icon 801, and the icon 801 indicates, by using different colors (or fonts, symbols, background colors, or the like), enabling and disabling of the adaptive acceleration function. For example, when colors are used to distinguish between enabling and disabling of the adaptive acceleration function, the user taps the icon 801 that indicates disabling of the adaptive acceleration function, and in response to the tap, the electronic device enables the adaptive acceleration function and displays the icon 801 in a color that indicates enabling of the adaptive acceleration function, for example, red. The user taps the icon 801 that indicates enabling of the adaptive acceleration function, and in response to the tap, the electronic device disables the adaptive acceleration function and displays the icon 801 in a color that indicates disabling of the adaptive acceleration function, for example, white. How to display enabling and disabling of the adaptive acceleration function is not limited in this application. Before or after the user chooses to enable the adaptive acceleration function, the user may tap a variable-speed icon 802 on the interface to select an expected playing rate, and the electronic device uses the solution provided in this application to perform adaptive acceleration on the video based on the playing rate selected by the user and in combination with a characteristic of video content, and play the video.

Figure 9:
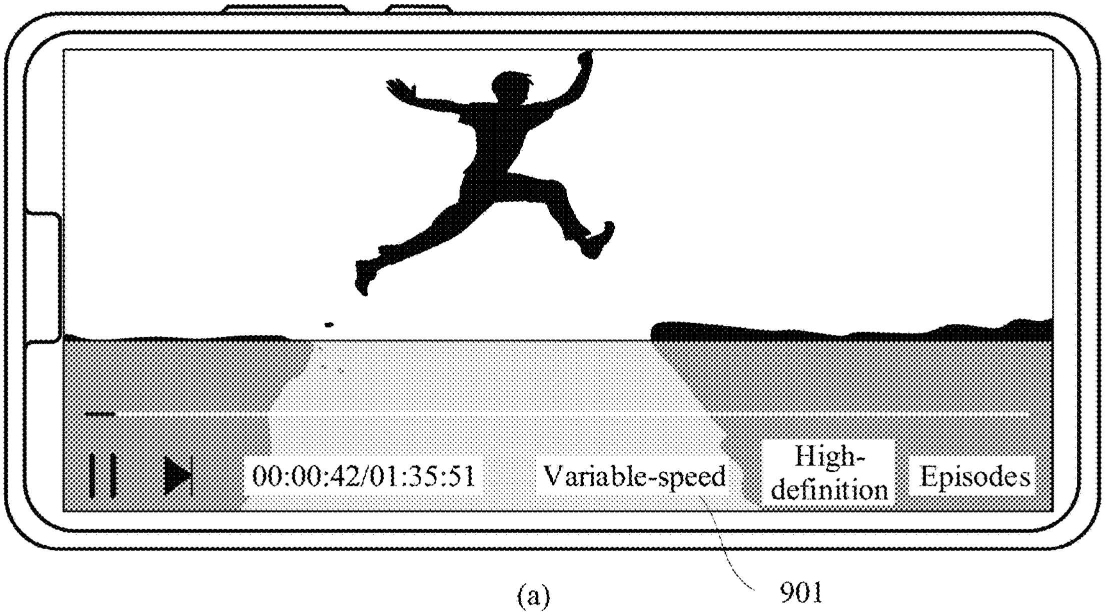
FIG. 9 is a schematic diagram of a playing interface according to an embodiment of this application.
Figure 9:

For example, on an interface that is of the electronic device and that is shown in (a) in FIG. 9, a video A is to be played or is being played based on an operation of the user. When the user expects to perform adaptive acceleration on the video A, the user taps a variable-speed icon 901 on the interface in (a) in FIG. 9, and in response to the tap, the electronic device displays an interface shown in (b) in FIG. 9. The interface includes a plurality of options, and one option indicates one playing speed. On the interface shown in (b) in FIG. 9, an option with only a playing speed (e.g., 2.0× and 1.0×, which may further include another option that is not shown in FIG. 9, for example, 0.5×, 0.75×, 1.25×, 1.5×, 1.75×, 2.25×, 2.5×, 2.75×, or 3.0×, and this is not limited in this application) is used to select a constant rate without adaptive acceleration. On the interface shown in (b) in FIG. 9, an option with a playing speed and an AI indication (e.g., 2.0+AI and 1.0+AI, which may further include another option that is not shown in FIG. 9, for example, 0.5+AI, 0.75+AI, 1.25+AI, 1.5+AI, 1.75+AI, 2.25+AI, 2.5+AI, 2.75+AI, or 3.0+AI, and this is not limited in this application) is used to select a constant rate and perform adaptive acceleration based on the constant rate. The user taps the option "2.0+AI" on the interface in (b) in FIG. 9, to select a playing speed of 2.0× and perform adaptive acceleration. When the user taps the variable-speed icon 901 on the interface in (a) in FIG. 9, in response to the tap, the electronic device may alternatively display only an option that is in (b) in FIG. 9 and that indicates a playing speed and AI acceleration, and does not display an option that indicates only constant acceleration. How to display an option used to indicate the adaptive acceleration function provided in this application is not limited in this application.

After the user performs an operation to enable the adaptive acceleration function, the electronic device executes the solution provided in this application, and a final playing speed of the video is determined based on a first playing speed selected by the user and first information.

In another possible implementation, the solutions in FIG. 7 and FIG. 8 (or FIG. 9) may be combined to enable or disable the adaptive acceleration function. For example, the user enables the adaptive acceleration function on an overall setting interface of the software, and then may disable the adaptive acceleration function on the interface when a specific video is played, to disable the adaptive acceleration function for the specific video, and still use the adaptive acceleration function for other videos.

Figure 10:
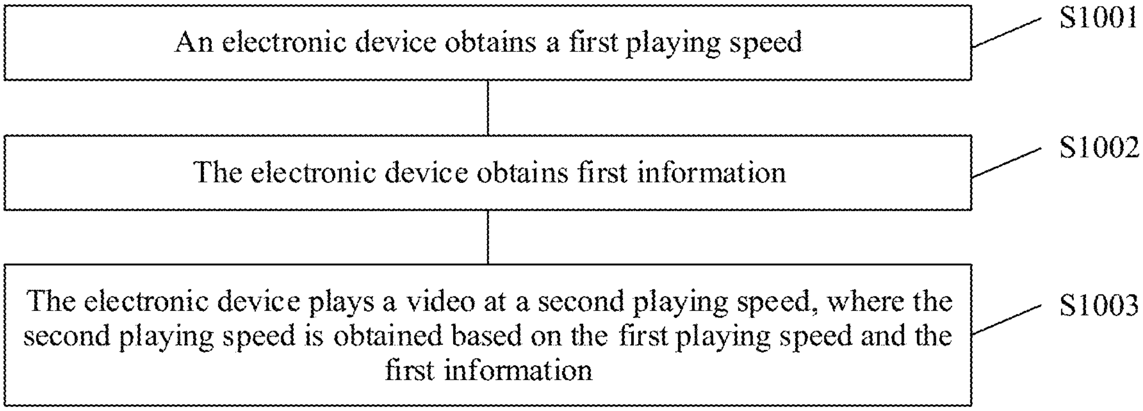
FIG. 10 is a schematic flowchart of a video playing method according to an embodiment of this application.

As shown in FIG. 10, a video playing method provided in an embodiment of this application may include the following steps.

S1001: An electronic device obtains a first playing speed.

Specifically, in S1001, the electronic device obtains the first playing speed of a to-be-played video. In a possible implementation, the to-be-played video is a video that is selected by a user on the electronic device and that is expected to be played. For example, the user selects to play a movie video in online audio and video playing software on the electronic device, and the movie video is the to-be-played video.

In another possible implementation, the to-be-played video is any video provided by a video server.

The first playing speed is related to a playing setting of the user.

In a possible implementation, the first playing speed may be an expected playing speed selected by the user, a habitual playing speed of the user, a default playing speed of the user, or the like. A manner of obtaining the first playing speed is not specifically limited in this embodiment of this application.

In a possible implementation, the obtaining a first playing speed may be specifically implemented as: displaying a first interface based on obtained first operation information, where the first interface includes at least two options, and one option indicates one playing speed; obtaining second operation information; and determining the first playing speed based on the second operation information and the at least two options. In this implementation, a playing speed indicated by an option selected by the user on the first interface by using the second operation information is determined as the first playing speed.

The first operation information may be operation information that triggers displaying of the first interface, or the first operation information may be operation information that triggers selection of a playing speed. The first interface is an interface for selecting a playing speed.

Figure 11:
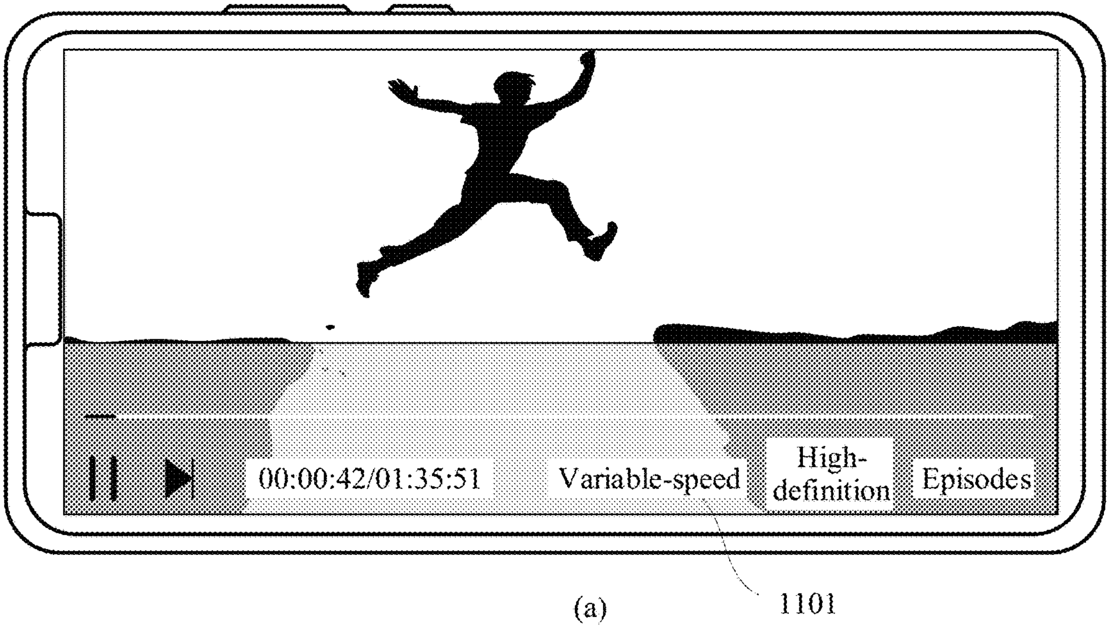
FIG. 11 is a schematic diagram of a playing interface according to an embodiment of this application.
Figure 11:
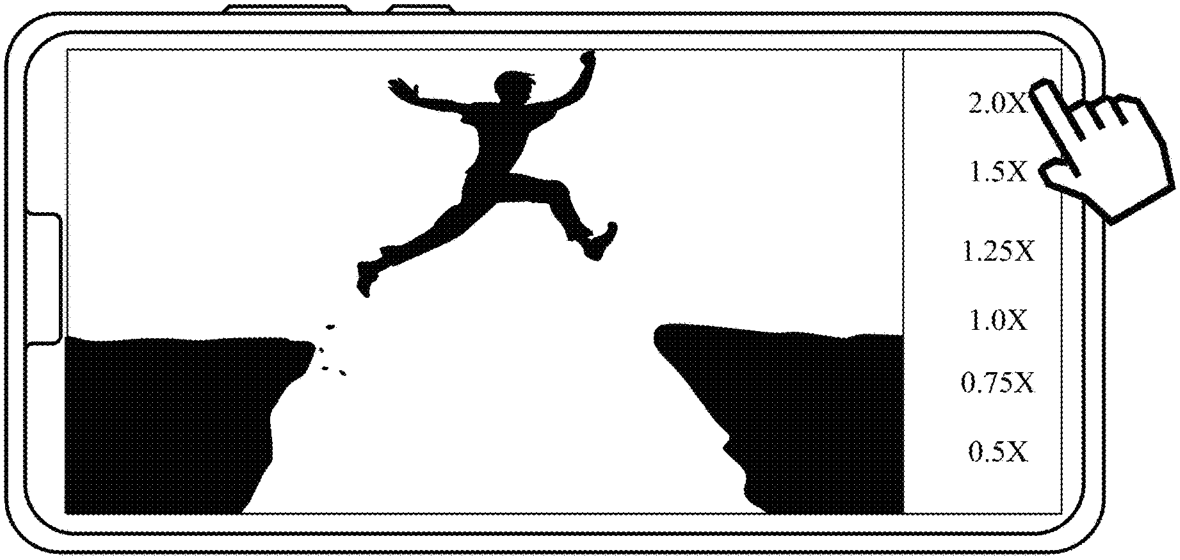
Figure 12A:
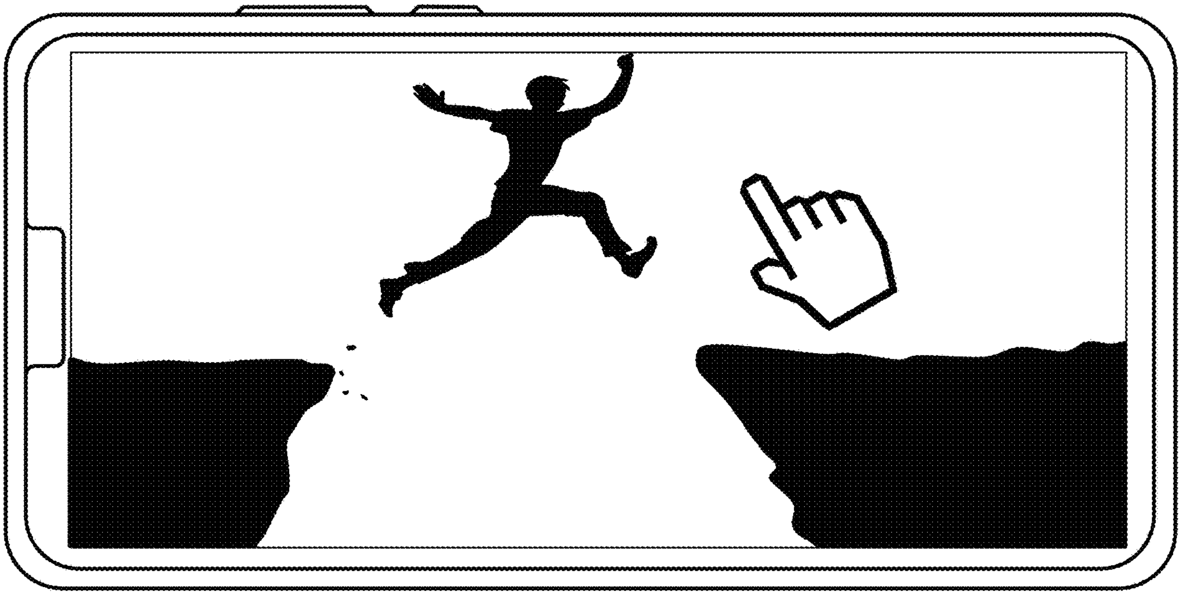
FIG. 12(*a*) to FIG. 12(*e*) are schematic diagrams of a playing interface according to an embodiment of this application.
Figure 12B:
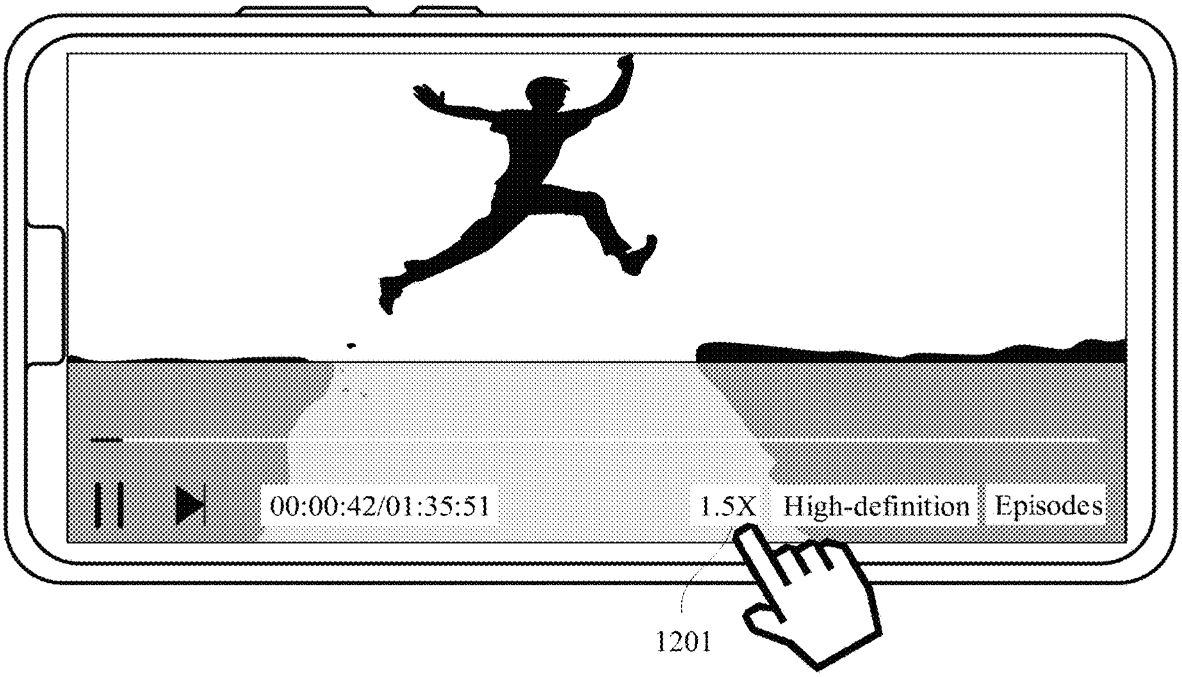
Figure 12C:
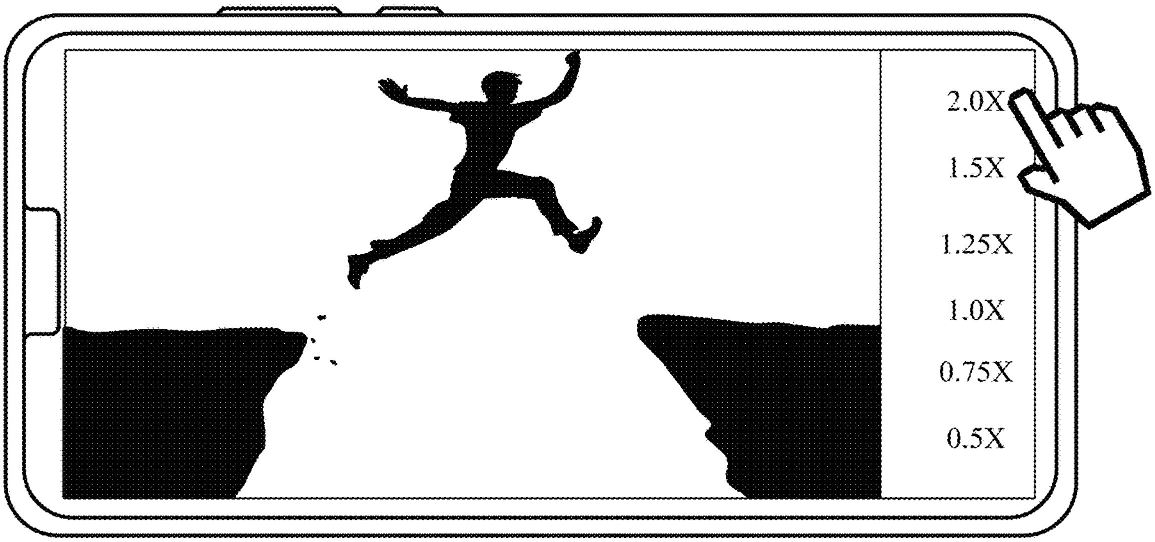
Figure 12D:
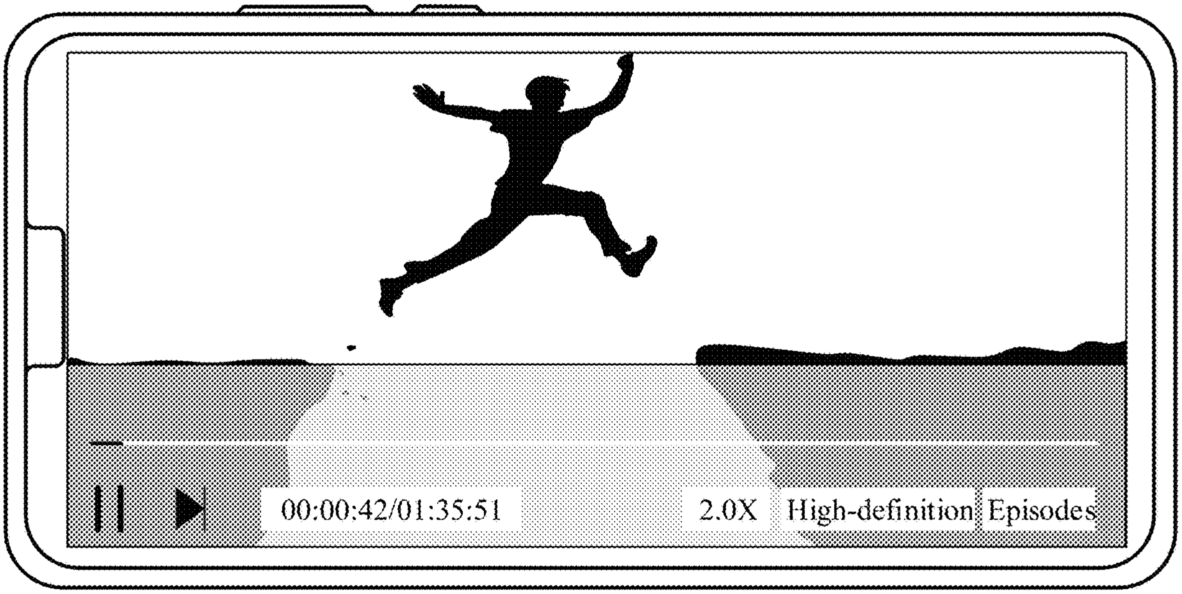
Figure 12E:
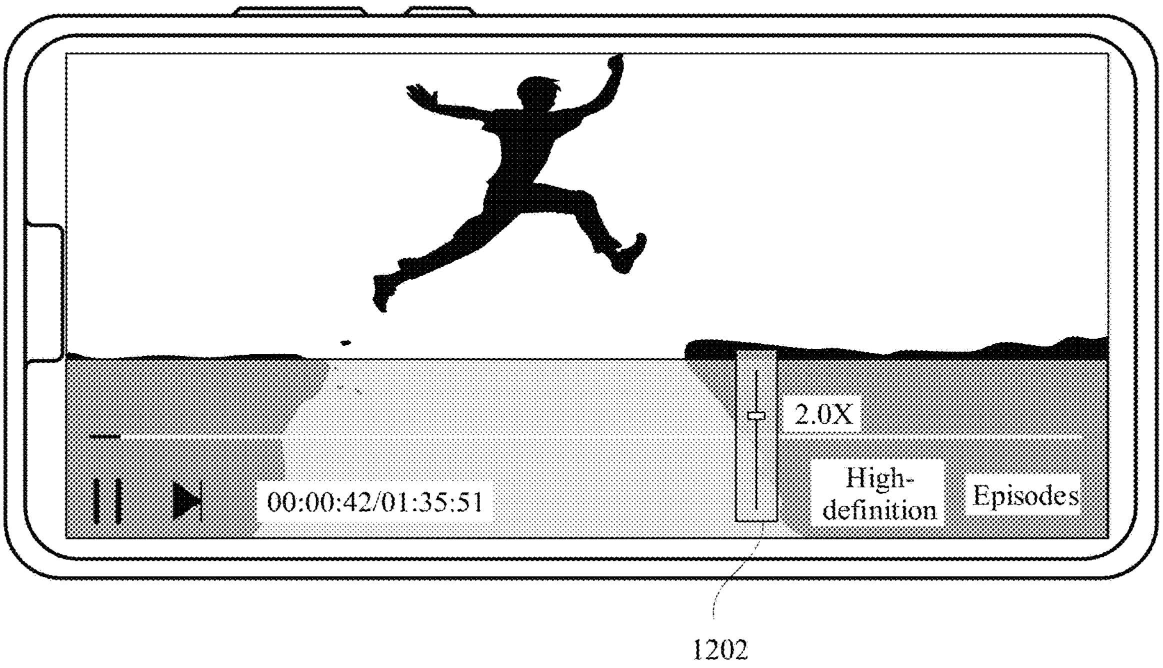

For example, on an interface that is of the electronic device and that is shown in (a) in FIG. 11, a video A is to be played or is being played based on an operation of the user. On the interface in (a) in FIG. 11, the user performs a tap operation (a first operation) on a variable-speed icon 1101, and the electronic device displays a first interface shown in (b) in FIG. 11. The first interface includes a plurality of options (e.g., 2.0× and 1.5× in (b) in FIG. 11, which may further include another option that is not shown in FIG. 11, for example, 1.75×, 2.25×, 2.5×, 2.75×, or 3.0×, and this is not limited in this application). On the first interface shown in (b) in FIG. 11, the user performs a tap operation (a second operation) on an option (e.g., 2.0×) corresponding to an expected playing speed, and the electronic device determines, based on the second operation information and the option "2.0×" selected on the first interface by using the second operation information, that the first playing speed is "2.0×".

In another possible implementation, the obtaining a first playing speed may be specifically implemented as: displaying a first interface based on obtained first operation information, where the first interface includes a first speed; displaying a second interface based on obtained second operation information, where the second interface includes a second speed; and determining the first playing speed based on the second speed. In this implementation, the second speed on the second interface triggered by the user by using the second operation information is determined as the first playing speed, so that the first playing speed is a playing speed selected by the user.

The first operation information in this implementation may be operation information for invoking a menu, and the first interface is an interface that presents the current first speed on a current playing interface of the video. The second operation information is operation information for adjusting a playing speed, and the second operation information may be selecting the second speed from a plurality of options, or the second operation information may be determining the second speed step by step.

For example, on an interface that is of the electronic device and that is shown in FIG. 12(*a*), the electronic device is playing a video A, and the interface does not include any operation item. On the interface in FIG. 12(*a*), the user performs a tap operation (a first operation) at any position on a screen to invoke an operation item, and the electronic device displays, based on the tap operation, a first interface shown in FIG. 12(*b*). The first interface includes a current playing speed 1201 (a first speed) at which the electronic device plays the video A. On the first interface shown in FIG. 12(*b*), the user performs a tap operation (a second operation) on the current playing speed 1201, and the electronic device displays, based on the second operation, a second interface shown in FIG. 12(*c*). The second interface is a playing speed selection interface. The second interface includes a plurality of options, one option corresponds to one playing speed, and the second interface includes a second speed (e.g., "2.0×") expected by the user. The user taps the expected "2.0×", and the electronic device determines, based on the tap operation, that the first playing speed is the second speed "2.0×".

For example, on the first interface shown in FIG. 12(*b*), the user performs a tap operation (a second operation) on the current playing speed 1201, and each tap represents one step in changing the playing speed. The electronic device displays, based on the second operation, a second interface shown in FIG. 12(*d*). The second interface includes a second speed (e.g., "2.0×") selected by the user by performing one or more tap operations, and the electronic device determines that the first playing speed is the second speed "2.0×".

It should be noted that, on the first interface shown in FIG. 12(*b*), the user performs a tap operation (a second operation) on the current playing speed 1201, and the electronic device presents, to the user based on the second operation, a second interface shown in FIG. 12(*e*). The second interface includes a progress bar 1202 used to select a playing speed. The user drags the progress bar 1202 to select a second speed, and the electronic device determines that the first playing speed is the second speed.

In another possible implementation, the obtaining a first playing speed may be specifically implemented as: stopping playing a previous video of the video based on obtained first operation information, and starting to play the video; and determining the first playing speed based on a playing speed of the previous video. In this implementation, when the user triggers, by using the first operation information, switching to play a target video, a playing speed of an originally played video is determined as the first playing speed, so that the first playing speed is a habitual playing speed of the user.

The playing speed of the originally played video may be a first playing speed of the original video, or may be a second playing speed of the original video.

Figure 13:
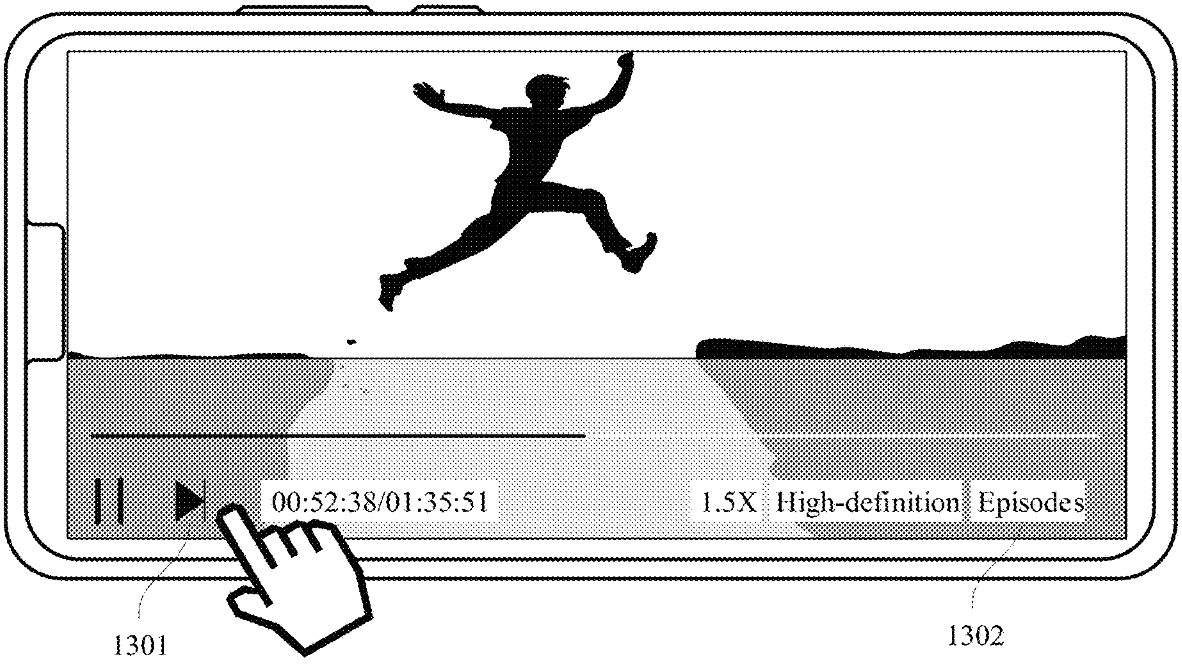
FIG. 13 is a schematic diagram of a playing interface according to an embodiment of this application.

For example, on an interface that is of the electronic device and that is shown in FIG. 13, the electronic device is playing a video A. On the interface in FIG. 13, the user performs a tap operation (a first operation) on a switching icon 1301 for switching to a next video or an episode selection icon 1302, and based on the tap operation, the electronic device stops playing the video A and starts to play a video B. The electronic device may determine a playing speed at which the video A is played as a first playing speed at which the video B is played.

Figure 14:
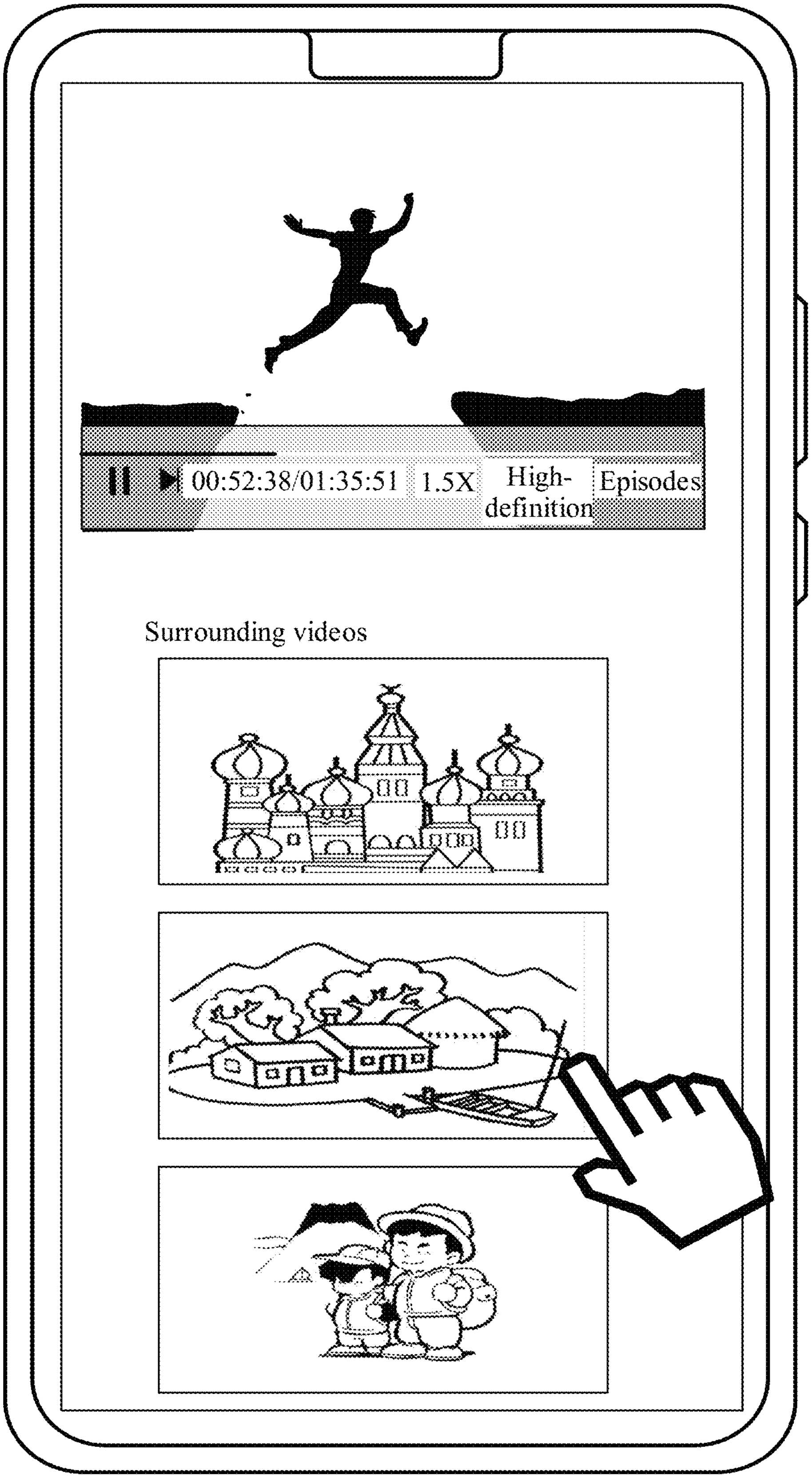
FIG. 14 is a schematic diagram of a playing interface according to an embodiment of this application.

For example, on an interface that is of the electronic device and that is shown in FIG. 14, the electronic device is playing a video A, and the interface further includes a plurality of surrounding videos. On the interface in FIG. 14(*a*) to FIG. 14(*e*), the user performs a tap operation (a first operation) on a surrounding video D, and based on the tap operation, the electronic device stops playing the video A and starts to play the video D. The electronic device may determine a playing speed at which the video C is played as a first playing speed at which the video D is played.

It should be noted that an adaptive acceleration function is enabled in the examples of selecting the first playing speed that are shown in FIG. 11 to FIG. 14. A specific manner of enabling the adaptive acceleration function is described in detail in the foregoing content, and details are not described herein.

In another possible implementation, when the user does not select the first playing speed, the first playing speed may be a default playing speed of the video.

It should be noted that the foregoing examples of obtaining the first playing speed are merely examples for description, and do not constitute a specific limitation.

S1002: The electronic device obtains first information.

The first information is first information of the to-be-played video. The first information may include image information of the video and/or voice information of the video. The image information may be an image frame sequence, and the voice information may be a voice frame sequence.

Specifically, the electronic device may extract an image frame and a voice frame from the to-be-played video, to obtain the picture information and the voice information of the to-be-played video.

In another possible implementation, the first information may further include content that the user is interested in. The content that the user is interested in includes at least one of the following information: character description information of the video, content description information of the video, and content structure information of the video.

The character description information of the video is used to indicate information about a character that is in the video and that the user is interested in, and the character may be an actor, a played role, or the like. The content description information of the video is used to indicate information about a plot or content that is in the video and that the user is interested in, for example, specific scenery or a specific action. The content structure information of the video is used to indicate information about a chapter or a position that is in the video and that the user is interested in, for example, a chapter sequence number or content related to a specific chapter in a long video organized by chapter.

Specifically, the electronic device may obtain, from the inside, the content that the user of the device is interested in, for example, determine, based on a historical viewing record or the like of the user, the content that the user is interested in. Alternatively, the electronic device may obtain, from the outside, the content that the user of the device is interested in. For example, the user logs in to a plurality of electronic devices by using a same account, and information such as historical viewing records of the plurality of electronic devices that use the same account is synchronized. Alternatively, the user may manually enter the content that the user is interested in. For example, the electronic device may display several pieces of content that the user may be interested in for the user to select, or the user may use a manner such as a text, voice, or an image to enter the content that the user is interested in. The foregoing specific manners of obtaining the content that the user is interested in are merely examples. No limitation is imposed in this application.

In another possible implementation, the first information may further include first playing mode information of the to-be-played video, and the first playing mode information is associated with playing size information corresponding to the video. The playing size information corresponding to the video may be used to indicate a display scale or a display size of the video, for example, full-screen display or small-window display.

In another possible implementation, the first information may further include second playing mode information of the to-be-played video, and the second playing mode information is associated with definition information of the video. The definition information of the video may be used to indicate video playing resolution, for example, a high-definition mode, a Blu-ray mode, or a low-traffic mode.

For example, the electronic device may read, from the inside, the content that the user is interested in, the first playing mode information, and the second playing mode information that are stored in the device.

In another possible implementation, the first information may further include motion status information of the electronic device. The motion status information may be used to indicate a moving speed or pose information of the electronic device.

For example, the electronic device may determine, by using a gyroscope, whether the device is moving or a moving speed, and determine an angle of the device by using a direction sensor.

In another possible implementation, the first information may further include noise intensity information of the electronic device. The noise intensity information of the electronic device may be used to indicate an environmental interference degree of the electronic device.

For example, the device may determine the noise intensity information of the electronic device by using a sound sensor.

In another possible implementation, the first information may further include user viewpoint information. The user viewpoint information may be used to indicate a point at which a line of sight of the user falls when the user watches the video, and reflect an interest of the user.

For example, the electronic device may determine, by using an image captured by a camera and by using a line-of-sight estimation/viewpoint estimation technology, whether human eyes gaze at the device. A specific solution is not limited in this embodiment of this application, and details are not described in this embodiment of this application.

In another possible implementation, the first information may further include connection status information of an audio playing device. The audio playing device may be a headset or a sound box. The connection status information of the audio playing device is used to indicate whether the audio playing device is connected. When the audio playing device is connected, the user is highly sensitive to video voice and is not likely to be interfered with by an external environment; and when the audio playing device is not connected, the user is less sensitive to the video voice and is likely to be interfered with by the external environment.

In another possible implementation, the first information may further include network status information. The network status information is used to indicate quality or a type of a network accessed by the electronic device. When the electronic device accesses a high-quality network, video playing is smooth; or otherwise, video playing is frozen.

It should be noted that the first information and the manner of obtaining each piece of first information that are described in S1002 in this embodiment of this application are merely examples for description, and do not constitute a specific limitation. During actual application, content of the first information and the manner of obtaining each piece of first information in S1002 may be configured based on an actual requirement. Details are not described in this embodiment of this application.

S1003: The electronic device plays the video at a second playing speed, where the second playing speed is obtained based on the first playing speed and the first information.

In a possible implementation, first duration of playing the video by using the first playing speed is different from second duration of playing the video by using the second playing speed.

In a possible implementation, that the second playing speed is obtained based on the first playing speed and the first information includes: determining a corresponding third playing speed based on each type of information in the first information; and determining the second playing speed based on the first playing speed and all third playing speeds.

In another possible implementation, that the second playing speed is obtained based on the first playing speed and the first information includes: determining a corresponding third playing speed based on each type of information in the first information; and determining the second playing speed based on the first playing speed and some third playing speeds. The some third playing speeds are obtained through filtering from all third playing speeds. Through the filtering, a third playing speed that obviously does not meet a condition may be filtered out, so that efficiency of determining the second playing speed may be improved. A filtering rule is not limited in this embodiment of this application.

A third playing speed corresponding to one piece of first information may include a theoretical playing rate value or a maximum allowed playing rate value that is of each frame in the to-be-played video and that is determined by the first information. A playing rate of a frame in the second playing speed is less than or equal to a playing rate of the same frame in any third playing speed that includes a maximum allowed playing rate value.

For example, different degrees to which the content that the user is interested in is met correspond to different theoretical playing rate values, or different ranges of a moving speed of a target correspond to different theoretical playing rate values. A higher degree to which the content that the user is interested in is met corresponds to a smaller theoretical playing rate value, and a higher moving speed of the target corresponds to a smaller theoretical playing rate value.

It should be noted that a solution for configuring the theoretical playing rate value may be configured based on an actual requirement. This is not limited in this embodiment of this application.

Specifically, when the content of the first information is different, content of the third playing speed corresponding to the first information is also different. The following separately provides examples for description.

Example 1

For the image information of the video, a third playing speed corresponding to the image information may include a theoretical playing rate value that is of each frame in the to-be-played video and that is determined by a motion speed of a target in an image.

For example, in the third playing speed corresponding to the image information in the example 1, a playing rate of an image in which a target quickly moves is low, and a playing rate of an image in which a target slowly moves is high. Specifically, playing rates corresponding to different moving speeds may be configured based on an actual requirement. This is not limited in this embodiment of this application.

Example 2

For the image information of the video, third playing speeds corresponding to the image information include third playing speeds that are corresponding to the image information at a plurality of different playing speeds and that include theoretical playing rate values.

In the example 2, a third playing speed that is corresponding to the image information at one playing speed and that includes a theoretical playing rate value is similar to the third playing speed in the example 1, and details are not described.

Specifically, in the example 2, image information at a plurality of different playing speeds may be obtained in an interpolation manner, and then, based on the description in the example 1, third playing speeds corresponding to the image information at the plurality of different playing speeds may be obtained as the third playing speeds corresponding to the image information. Specific implementation of the example 2 is described in an embodiment below, and details are not described herein.

It should be noted that a quantity and values of the plurality of different playing speeds are not specifically limited in this embodiment of this application.

Example 3

For the voice information of the video, a third playing speed corresponding to the voice information may include a maximum allowed playing rate value that is of each frame in the to-be-played video and that is determined by a voice speed.

The third playing speed corresponding to the voice information may be a set of maximum allowed playing rate values that ensure viewing experience of the user.

Specifically, the voice information of the video may be input into a voice understanding module, to obtain the third playing speed corresponding to the voice information of the video. The voice understanding module may be the video voice understanding network described in the foregoing embodiment, or certainly, may be another module. This is not limited in this embodiment of this application.

Specifically, in the example 3, a voice speed in a voice frame of each image in the video may be predicted first, and a maximum playable speed corresponding to each frame may be calculated based on a maximum comfortable voice speed tolerance value of human beings obtained through statistics collection.

For example, a maximum playable speed corresponding to a voice frame is obtained by dividing the maximum comfortable voice speed tolerance value of human beings by a voice speed in the voice frame and subtracting a preset margin. The preset margin may be configured based on an actual requirement. This is not limited in this embodiment of this application. For example, the preset margin may be 0.

Example 4

For first information of an external environment of the video, a third playing speed corresponding to the first information includes a maximum allowed playing rate value that is of each frame in the to-be-played video and that is determined by the external environment information.

Specifically, the first information of the external environment may include any one of the motion status information of the electronic device, the noise intensity information of the electronic device, the user viewpoint information, and the connection status information of the audio playing device. In the example 4, the electronic device may determine, based on a policy corresponding to the first information, the third playing speed corresponding to the first information in the external environment information. The policy may be a maximum allowed playing rate value that ensures viewing experience of the user.

For example, in the example 4, the configured policy may be as follows:

If the moving speed of the device is higher, a lower maximum allowed playing rate value is configured, to prevent the user from getting dizzy when watching the video. If the moving speed of the device is lower, a higher maximum allowed playing rate value may be configured, because the user can watch the video that is played at a high speed. When the angle of the device is tilted relative to the user, a lower maximum allowed playing rate value may be configured, so that the user can clearly watch the video.

If noise intensity of the device is higher, a lower maximum allowed playing rate value may be configured, to ensure viewing experience of the user. If the noise intensity of the device is lower, a higher maximum allowed playing rate value may be configured, because the user can watch the video that is played at a high speed.

When the user viewpoint information indicates that the user focuses on watching the device, a higher maximum allowed playing rate value may be configured, because the user can watch the video that is played at a high speed. When the user viewpoint information indicates that the user of the device does not focus on watching the device, a lower maximum allowed playing rate value may be configured, to prevent the user from missing video content.

Certainly, content of the policy configured when the third playing speed corresponding to the first information of the external environment is obtained may be configured based on an actual requirement. This embodiment of this application merely provides an example for description, and does not constitute a specific limitation. At a moment, the first information of the external environment is fixed information, and playing rates in the third playing speed corresponding to the first information of the external environment at the moment may be the same.

Example 5

For first information of an internal status of the video, a third playing speed corresponding to the first information may include a maximum allowed playing rate value that is of each frame in the to-be-played video and that is determined by the internal status information.

Specifically, the first information of the internal status of the video may include any one of the network status information, the first playing mode information, and the second playing mode information.

The internal status information may be input into an internal status understanding module, to obtain the third playing speed corresponding to the internal status information. In the example 5, the electronic device may determine, based on a policy corresponding to the first information, the third playing speed corresponding to the first information.

For example, in the example 5, the configured policy may be as follows:

If a screen of the device is larger, a higher maximum allowed playing rate value may be configured, because the user can watch the video that is played at a high speed. If the screen of the device is smaller, a lower maximum allowed playing rate value is configured, to prevent the user from getting dizzy when watching the video.

When the device is connected to a headset, a higher maximum allowed playing rate value may be configured, because the user can watch the video that is played at a high speed. When the device plays an external sound, a lower maximum allowed playing rate value is configured, to ensure that the user can hear clearly.

When playing volume of the device is higher, a higher maximum allowed playing rate value may be configured, because the user can watch the video that is played at a high speed. When the playing volume of the device is lower, a lower maximum allowed playing rate value is configured, to ensure that the user can hear clearly.

When playing definition of the device is higher, a higher maximum allowed playing rate value may be configured, because the user can watch the video that is played at a high speed. When the playing definition of the device is lower, a lower maximum allowed playing rate value is configured, to ensure that the user can see clearly.

When network quality of the device is higher, a higher maximum allowed playing rate value may be configured, because the user can watch the video that is played at a high speed. When the network quality of the device is lower, a lower maximum allowed playing rate value is configured, to ensure that the user can see clearly, and prevent frame freezing.

Certainly, content of the policy configured when the third playing speed corresponding to the first information of the internal status is obtained may be configured based on an actual requirement. This embodiment of this application merely provides an example for description, and does not constitute a specific limitation. At a moment, the first information of the internal status is fixed information, and playing rates in the third playing speed corresponding to the first information of the internal status at the moment may be the same.

Example 6

For personalized first information of the user, a third playing speed corresponding to the first information may include a theoretical playing rate value that is of each frame in the to-be-played video and that is determined by image content corresponding to the first information.

The personalized first information of the user may include content that the user is interested in.

For example, in the third playing speed corresponding to the personalized first information in the example 6, a higher degree to which a user interest is met corresponds to a lower playing rate. Specifically, playing rates corresponding to different degrees to which the user interest is met may be configured based on an actual requirement. This is not limited in this embodiment of this application.

A speed at which a frame that is in the video and that is related to the content that the user is interested in is played at the second playing speed is not greater than a speed at which the frame is played at the first playing speed, so that the content that the user is interested in is slowly played, thereby improving viewing experience of the user.

For example, the third playing speed corresponding to the personalized first information may implement an effect of slowly playing a part including a star that the user likes and quickly playing other plots.

Example 7

For personalized first information, a third playing speed corresponding to the first information may include a maximum allowed playing rate value that is of each frame in the to-be-played video and that is determined by the first information.

The personalized first information in the example 7 may include an age of the user and the like.

For example, in the example 7, if the age of the user is larger, a lower maximum allowed playing rate value is configured, to prevent the user from getting dizzy when watching the video.

Certainly, the foregoing examples are merely examples for describing third playing speeds corresponding to different first information, and do not constitute a specific limitation. It should be noted that the manners described in the foregoing examples may be combined into a plurality of solutions, or may be separately used. Details are not described in this embodiment of this application.

Optionally, the personalized first information of the user may further include whether the user accepts adjustment of a speed change rate based on information such as an internal status of the device and an external environment status. In S1003, it may be determined, based on the personalized first information of the user, whether to adjust the playing rate based on the information such as the internal status of the device and the external environment status.

It should be noted that, if a quantity of playing rates included in a third playing speed corresponding to a piece of first information is less than a quantity of frames of the to-be-played video, alignment may be performed in a manner such as sampling or interpolation, so that the quantity of playing rates included in the third playing speed is equal to the quantity of frames of the to-be-played video.

It should be noted that all playing rates included in the third playing speed are effective playing rates. An effective playing rate may be a non-zero playing rate, or an effective playing rate may be a playing rate greater than a threshold. If an obtained third playing speed corresponding to a piece of first information includes an ineffective playing rate, the ineffective playing rate needs to be processed and updated to an effective playing rate. The processing may be: obtaining an average value of two adjacent frames, obtaining a playing rate of a previous frame, obtaining a playing rate of a next frame, obtaining an average value of effective playing rates in the third playing speed, obtaining an effective playing rate at the position in another third playing speed, or using another processing manner. This is not limited in this embodiment of this application.

For example, if there is no voice in a voice frame in the voice information, a playing rate of the frame in the determined third playing speed corresponding to the voice information may be 0, and the playing rate is an ineffective playing rate and needs to be processed into an effective playing rate.

It should be noted that, in S1003, a unit deployed on a cloud may obtain the third playing speed corresponding to the image information and the third playing speed corresponding to the voice information, and store the third playing speeds in the cloud in a correspondence with the to-be-played video. When the electronic device plays the to-be-played video, the third playing speeds may be directly obtained and used. The cloud may be a source server or the like of the to-be-played video. This is not limited in this embodiment of this application.

Optionally, in S1003, a unit in the electronic device may obtain a third playing speed corresponding to first information other than the image information and the voice information, to meet a real-time requirement.

Figure 15:
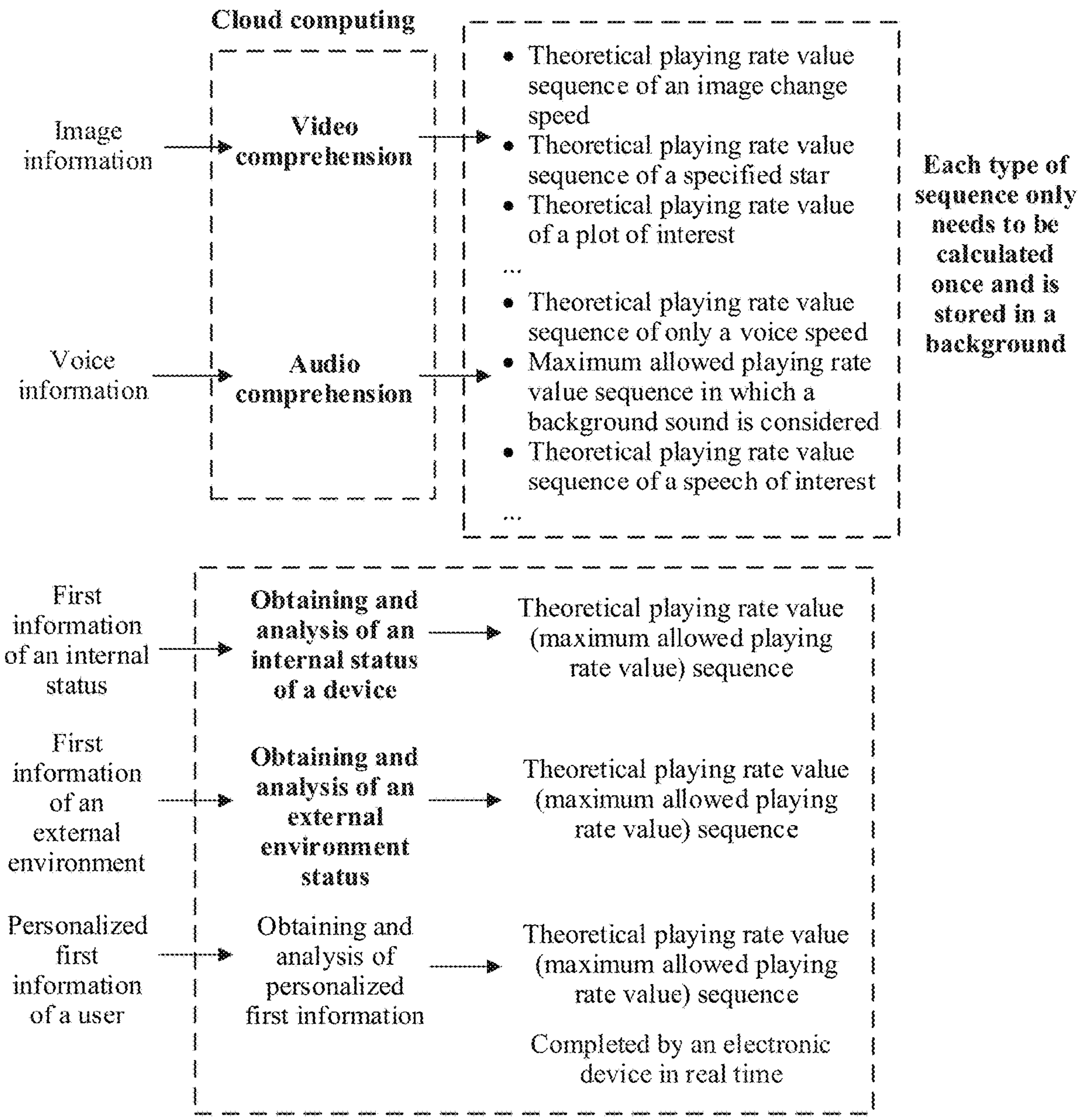
FIG. 15 is a schematic diagram of a manner of obtaining third playing speeds corresponding to different first information according to an embodiment of this application.

For example, FIG. 15 shows a manner of obtaining third playing speeds corresponding to different first information.

As shown in FIG. 15, the third playing speed corresponding to the image information of the to-be-played video may include a theoretical playing rate value sequence of a picture change speed, a theoretical playing rate value sequence of a specified star, a theoretical playing rate value of a plot of interest, or the like. The third playing speed corresponding to the voice information of the to-be-played video may include a theoretical playing rate value sequence of only a voice speed, a maximum allowed playing rate value sequence in which a background sound is considered, a theoretical playing rate value sequence of a speech of interest, or the like. The third playing speed corresponding to the image information and the third playing speed corresponding to the voice information may be completed through cloud computing.

The third playing speed corresponding to the first information of the internal status may be a theoretical playing rate value (maximum allowed playing rate value) sequence, the third playing speed corresponding to the first information of the external environment may be a theoretical playing rate value (maximum allowed playing rate value) sequence, and the third playing speed corresponding to the personalized first information of the user may be a theoretical playing rate value (maximum allowed playing rate value) sequence. The third playing speeds may be obtained by a video playing device in real time.

Specifically, in S1003, the electronic device may determine the second playing speed based on a third playing speed corresponding to each piece of first information and the first playing speed.

The second playing speed includes a playing rate of each frame in the to-be-played video, and a playing rate of a frame in the second playing speed is less than or equal to a playing rate of the same frame in a third playing speed that includes a maximum allowed playing rate value and that is corresponding to any piece of first information.

In a possible implementation, each piece of first information corresponds to one third playing speed, and a fusion operation is performed on all third playing speeds obtained in S1003, to obtain the second playing speed.

The fusion operation described in this application may include selecting a playing rate between a largest playing rate and a smallest playing rate of a same frame in different third playing speeds (third playing speeds participating in fusion).

In a possible implementation, the third playing speeds participating in the fusion operation include maximum allowed playing rate values, and the fusion operation may include: if a smallest playing rate of a same frame in different third playing speeds (third playing speeds participating in fusion) is a maximum allowed playing rate value, selecting a smallest maximum allowed playing rate value of the frame in the third playing speeds participating in fusion; or if a smallest playing rate of a same frame in different third playing speeds (third playing speeds participating in fusion) is a theoretical playing rate value, selecting a calculated value of a smallest maximum allowed playing rate value of the frame and a smallest theoretical playing rate value of the frame in the third playing speeds participating in fusion, where the calculated value may be an average value, a largest value, a smallest value, or the like.

In another possible implementation, the third playing speeds participating in the fusion operation do not include a maximum allowed playing rate value, and it may be understood that only theoretical playing rate values are included. The fusion operation may include: selecting a calculated value of a largest theoretical playing rate value and a smallest theoretical playing rate value of a same frame in different third playing speeds (third playing speeds participating in fusion), where the calculated value may be an average value, a largest value, a smallest value, or the like.

Figure 16:
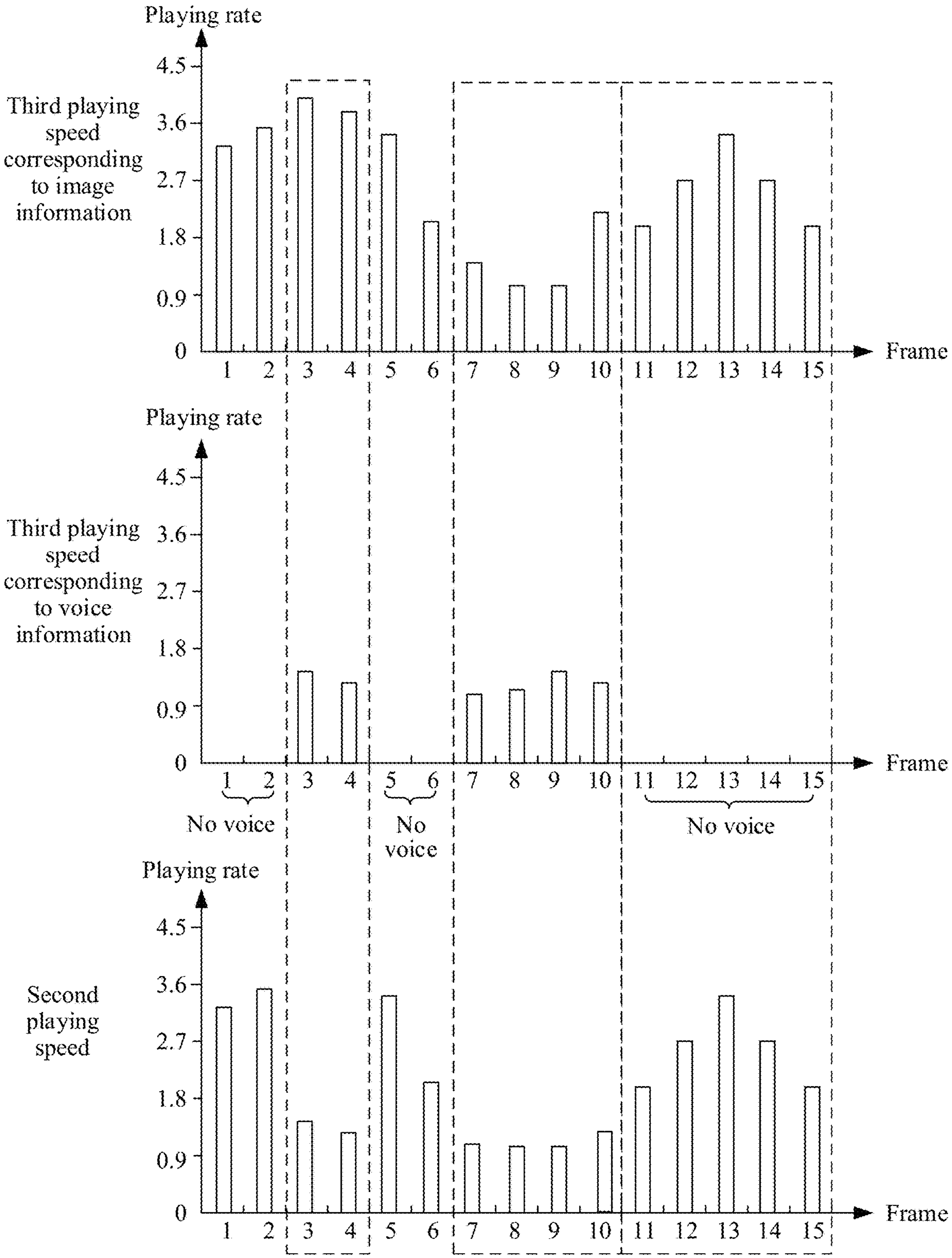
FIG. 16 is a schematic diagram of a scenario in which playing speeds are fused according to an embodiment of this application.

FIG. 16 shows a scenario in which a fusion operation is performed on the third playing speed corresponding to the image information of the video and the third playing speed corresponding to the voice information. As shown in FIG. 16, in the third playing speed corresponding to the voice information, a playing rate of a voice frame in a part in which there is no voice is an ineffective playing rate, a playing rate of a part in which there is voice is an effective playing rate, and a playing rate obtained through fusion at a position of the voice frame in the part in which there is no voice is a playing rate at the position in the third playing speed corresponding to the image information.

In another possible implementation, a difference between playing duration of playing the to-be-played video by using the second playing speed determined in S1003 and playing duration of playing the to-be-played video by using the first playing speed $R_0$ is less than or equal to a threshold, to ensure viewing experience of the user. The threshold may be configured based on an actual requirement. This is not limited in this application.

In a possible implementation, each piece of first information corresponds to one third playing speed, and the third playing speeds for determining the second playing speed are referred to as candidate third playing speeds (all third playing speeds or some third playing speeds). Determining the second playing speed based on the candidate third playing speeds and the first playing speed may be specifically implemented as: performing a fusion operation on all candidate third playing speeds, or performing a fusion operation on candidate third playing speeds that include theoretical playing rate values, to obtain a fourth playing speed; performing a fusion operation on candidate third playing speeds that include maximum allowed playing rate values, to obtain a fifth playing speed; and performing numerical optimization on the fourth playing speed and the fifth playing speed based on the first playing speed $R_0$, to obtain the second playing speed.

A numerical optimization manner such as stochastic gradient descent may be used to perform numerical optimization, to obtain the second playing speed.

For example, the performing numerical optimization on the fourth playing speed and the fifth playing speed based on $R_0$, to obtain the second playing speed may be specifically implemented as: inputting the fourth playing speed, the fifth playing speed, and $R_0$ into an objective function to perform numerical optimization, and using, as the second playing speed, a playing speed that minimizes the objective function.

The objective function is used to describe a degree to which a playing speed obtained based on the fourth playing speed and the fifth playing speed meets $R_0$. A smaller value of the objective function indicates that the playing speed obtained based on the fourth playing speed and the fifth playing speed is closer to $R_0$.

Specifically, the fourth playing speed and the fifth playing speed are input into the objective function, and different playing speeds may be obtained by adjusting a preset parameter in the objective function.

In another possible implementation, corresponding to the example 2 in S1003, third playing speeds corresponding to the image information of the video include third playing speeds that are corresponding to the image information of the video at a plurality of different playing speeds and that include theoretical playing rate values. In S1003, determining the second playing speed based on the third playing speeds and the first playing speed may be specifically implemented as: separately performing a fusion operation on third playing speeds corresponding to the image information of the video at a plurality of different playing speeds and third playing speeds corresponding to other first information, or separately performing a fusion operation on third playing speeds corresponding to the image information of the video at a plurality of different playing speeds and third playing speeds that are corresponding to other first information and that include theoretical playing rate values, to obtain a plurality of fourth playing speeds; performing a fusion operation on all third playing speeds that include maximum allowed playing rate values, to obtain a fifth playing speed; and inputting each of the fourth playing speeds, the fifth playing speed, and the first playing speed $R_0$ into the objective function, and using, as the second playing speed, a playing speed that minimizes the objective function. For example, the objective function may meet the following expression:

$$\operatorname{argmin}_s E_{speed}(S, V) + \beta E_{rate}(S, R_0) + \alpha E_{smooth}(S', n) + \delta E_A(S, A) \qquad \text{(Formula 2)}$$

$\operatorname{argmin}_s$ indicates that a second playing speed S is selected to minimize a function value, and α, β, and δ are preset parameters, may be configured based on an actual requirement, and are not limited in this embodiment of this application. α is a user-defined hyperparameter, and a larger value indicates that an optimization process focuses more on a consideration of an overall rate approaching $R_0$. β is a user-defined hyperparameter, and a larger value indicates that the optimization process focuses more on smoothness of a curve. δ is a user-defined hyperparameter, and a larger value indicates that a maximum allowed playing rate value imposes a stricter limitation on a final result.

In a process of performing numerical optimization by using the objective function, values of the preset parameters may be adjusted, to obtain different playing speeds based on the fourth playing speed and the fifth playing speed.

$E_{speed}(S,V)$ is used to control a low acceleration segment to be close to a minimum playing speed $R_{min}$ specified by the user, and $$E_{speed}(S, V) = \sum_t \left(1 - \hat{V}(t)\right)(S(t) - R_{min})^2 + \gamma \sum_t \hat{V}(t)(S(t) - R_0)^2.$$

$R_{min}$ may be provided by the user, or may be a default value, and the default value may be 1.

$\hat{V}(t)$ is a normalized playing rate of a $t^{th}$ frame in the fourth playing speed, and S(t) is a playing rate of the $t^{th}$ frame in the second playing speed.

γ is a preset parameter, and a smaller value indicates that a minimum playing rate of a final optimization result is closer to $R_{min}$.

$E_{rate}(S,R_0)$ is used to control an overall playing rate to be close to $R_0$, and $$E_{rate}(S, R_0) = \left(\frac{1}{T}\sum S(t) - R_0\right)^2.$$

T is a total quantity of picture frames in the to-be-played video.

$E_{smooth}(S',n)$ is used to control smoothness of the second playing speed, and $$E_{smooth}(S', n) = \sum_t (S(t) - S(t+n))^2.$$

n is a smooth width of the objective function.

$E_A(S,A)$ is used to control the second playing speed not to exceed a playing rate of a same frame in the fifth playing speed, and $$E_A(S, A) = \sum_t (S(t) - A(t))^2,$$

if $A(t)>0$ and $S(t)>A(t)$, where $A(t)$ is a playing rate of the $t^{th}$ frame in the fifth playing speed.

It should be noted that the foregoing objective function is merely an example for description, and does not constitute a specific limitation. During actual application, content of the objective function may be configured based on an actual requirement.

Figure 17A:
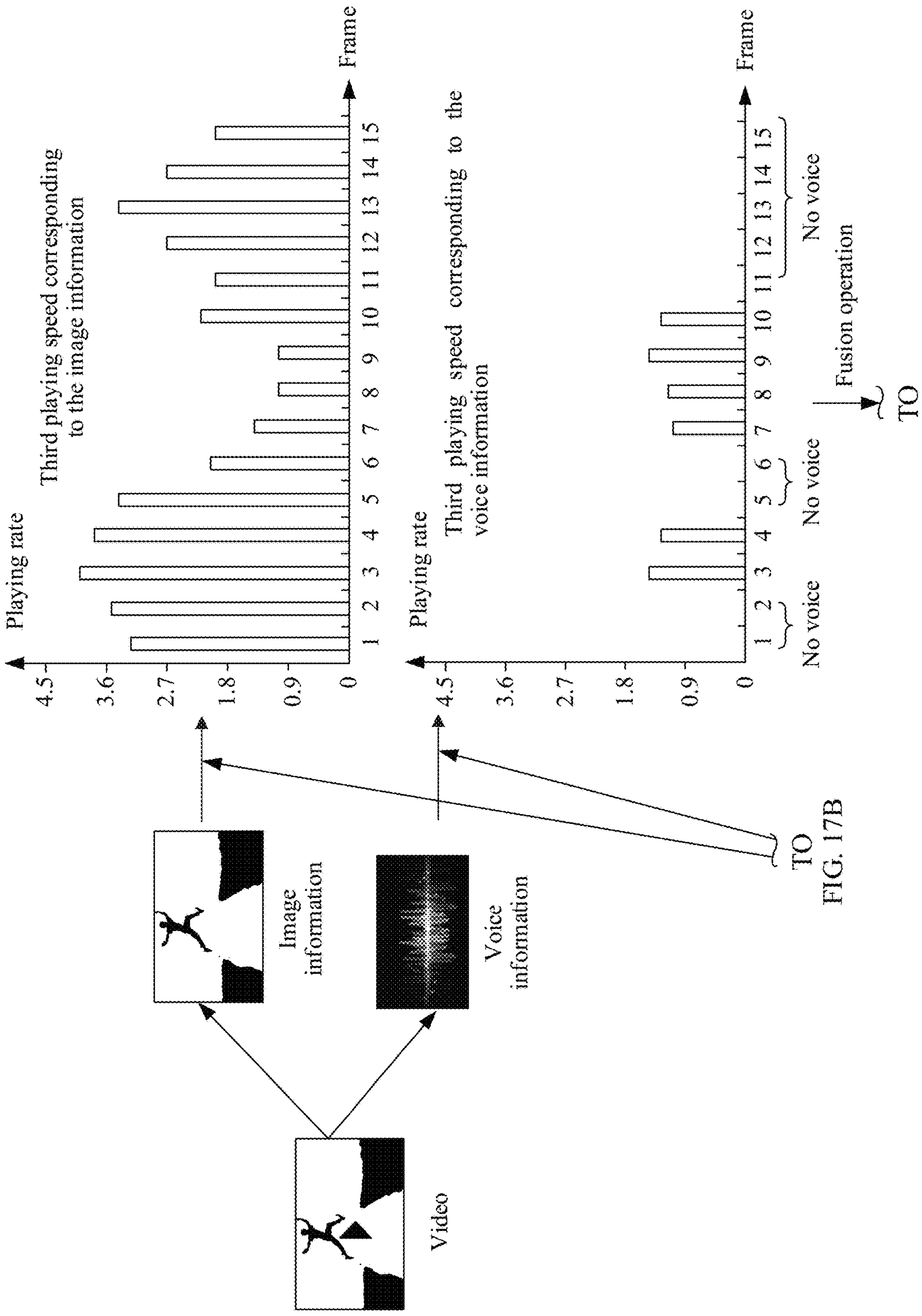
FIG. 17A to FIG. 17C are schematic diagrams of another scenario in which playing speeds are fused according to an embodiment of this application.
Figure 17B:
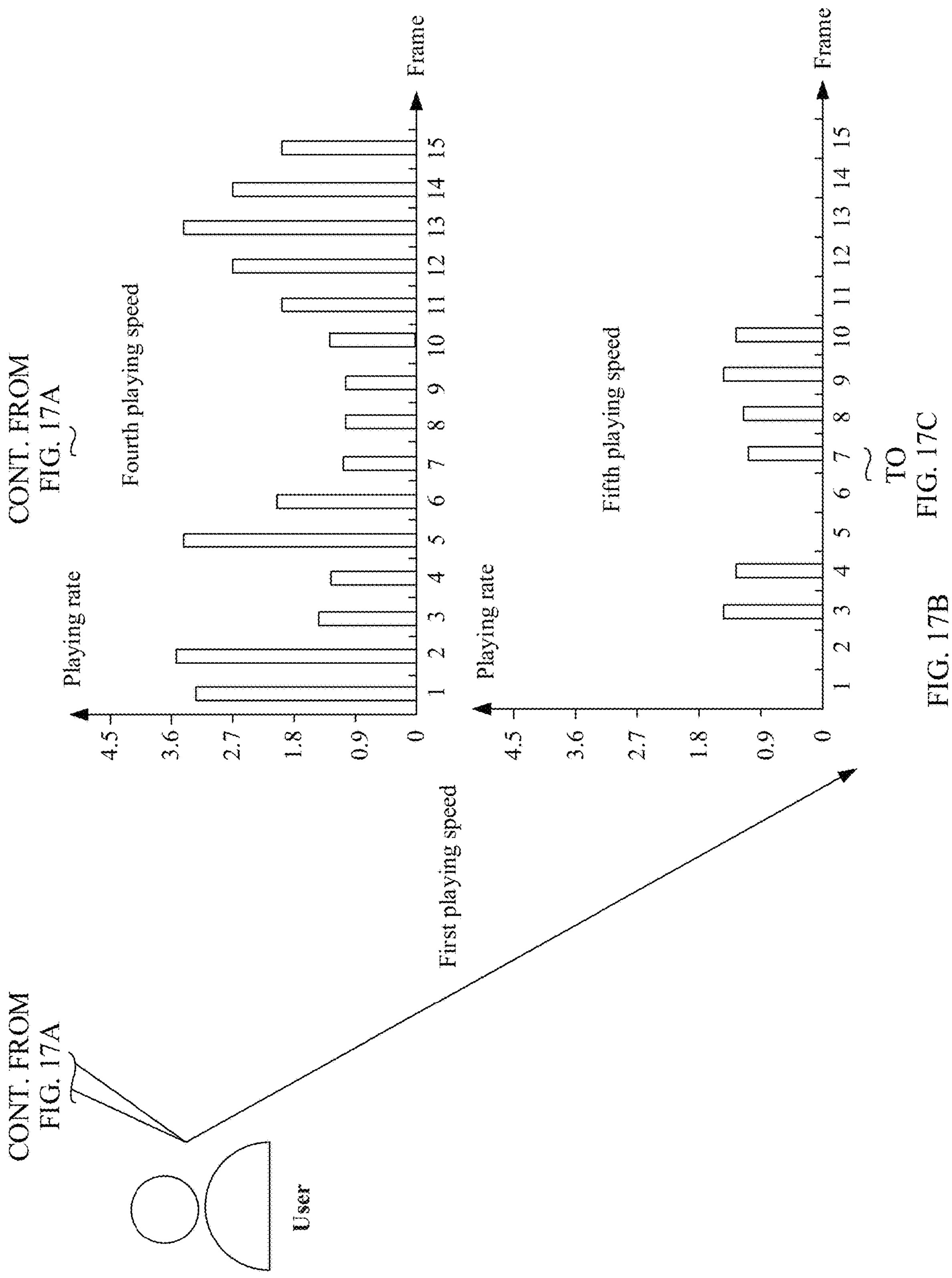
Figure 17C:
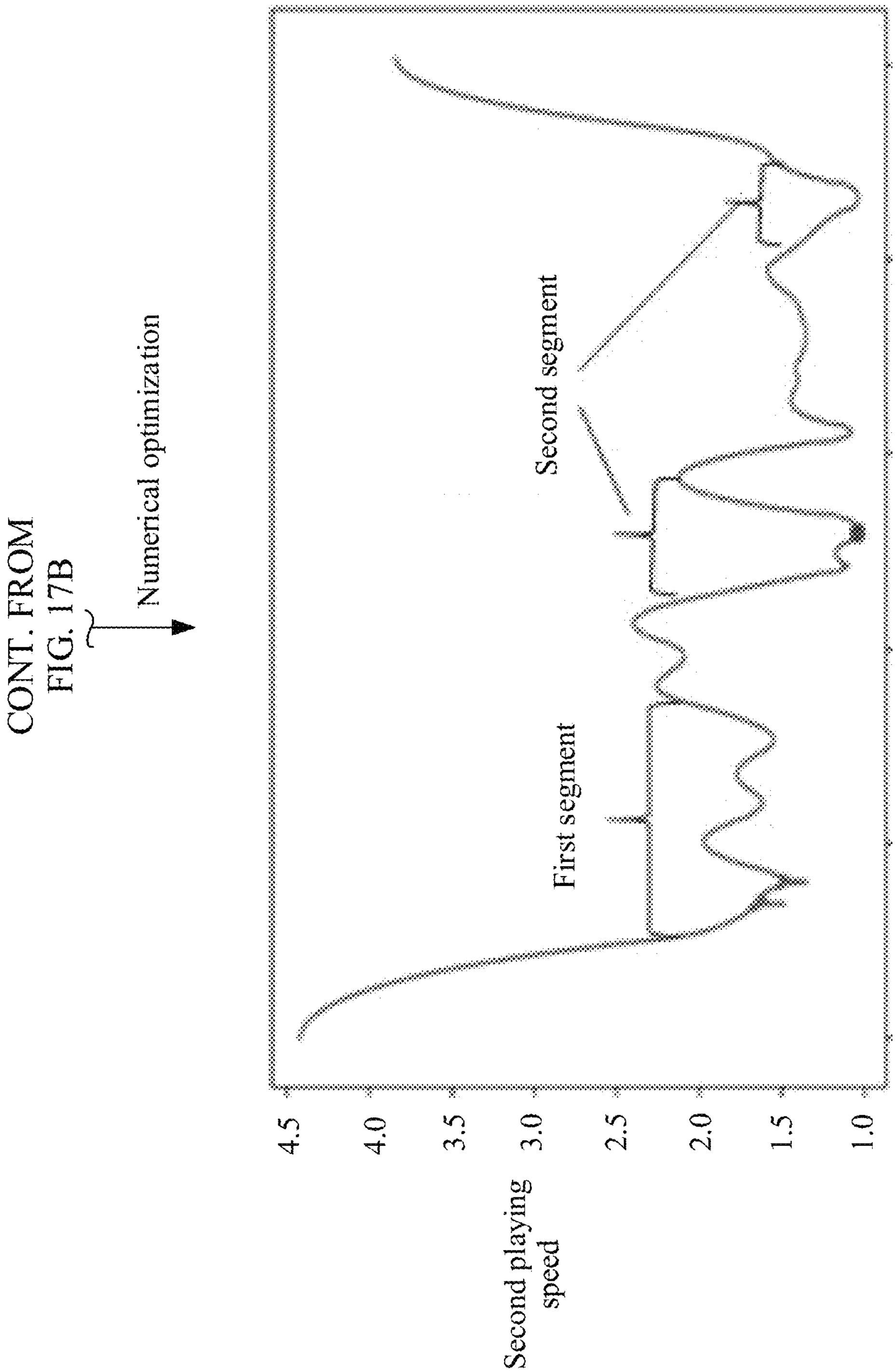

FIG. 17A to FIG. 17C show a scenario in which a fusion operation is performed on the third playing speed corresponding to the picture information of the video and the third playing speed corresponding to the voice information. In this scenario, the picture information of the video corresponds to one third playing speed. As shown in FIG. 17A to FIG. 17C, in the third playing speed corresponding to the voice information, a playing rate of a voice frame in a part in which there is no voice is an ineffective playing rate, and a playing rate of a part in which there is voice is an effective playing rate. A fusion operation is performed on the third playing speed corresponding to the picture information of the video and the third playing speed corresponding to the voice information, to obtain a fused relative playing speed V (the fourth playing speed). A third playing speed including a theoretical playing rate value includes only a third playing speed corresponding to a voice sequence, and is used as a fused absolute playing speed A (the fifth playing speed). V, A, and $R_0$ are input into the objective function shown in the formula 2, and the second playing speed obtained through optimization may be shown in FIG. 17A to FIG. 17C. In the second playing speed shown in FIG. 17A to FIG. 17C, a picture at a position of a first segment is relatively fast, and a low rate in the second playing speed prevents dizziness; and in a second segment and a third segment, a low rate is used to ensure that the user clearly hears voice.

According to the video playing method provided in this application, the second playing speed for finally playing the video is determined based on the first playing speed related to the playing setting of the user and the first information of the video. In this way, adaptive speed changing is implemented by considering both video content and a user requirement, so that overall playing duration of the video is close to the user requirement. However, factors highly related to viewing experience, such as a clear picture and a moderate voice speed of the video, are also considered during playing, thereby improving viewing experience of the user in the video played at an adaptively varied speed.

For example, it is assumed that the user is interested in a war plot, and the user watches two videos X and Y that have same total duration on the electronic device, and selects a same first playing speed. The video X includes a plurality of war plots, and the video Y is a documentary related to humanities. After adaptive acceleration is performed based on the solution provided in this application, because the video X includes content that the user is interested in, a second playing speed at which the video X is played is less than a second playing speed at which the video Y is played, and duration of watching the video X by the user is greater than duration of watching the video Y by the user.

Figure 18A:
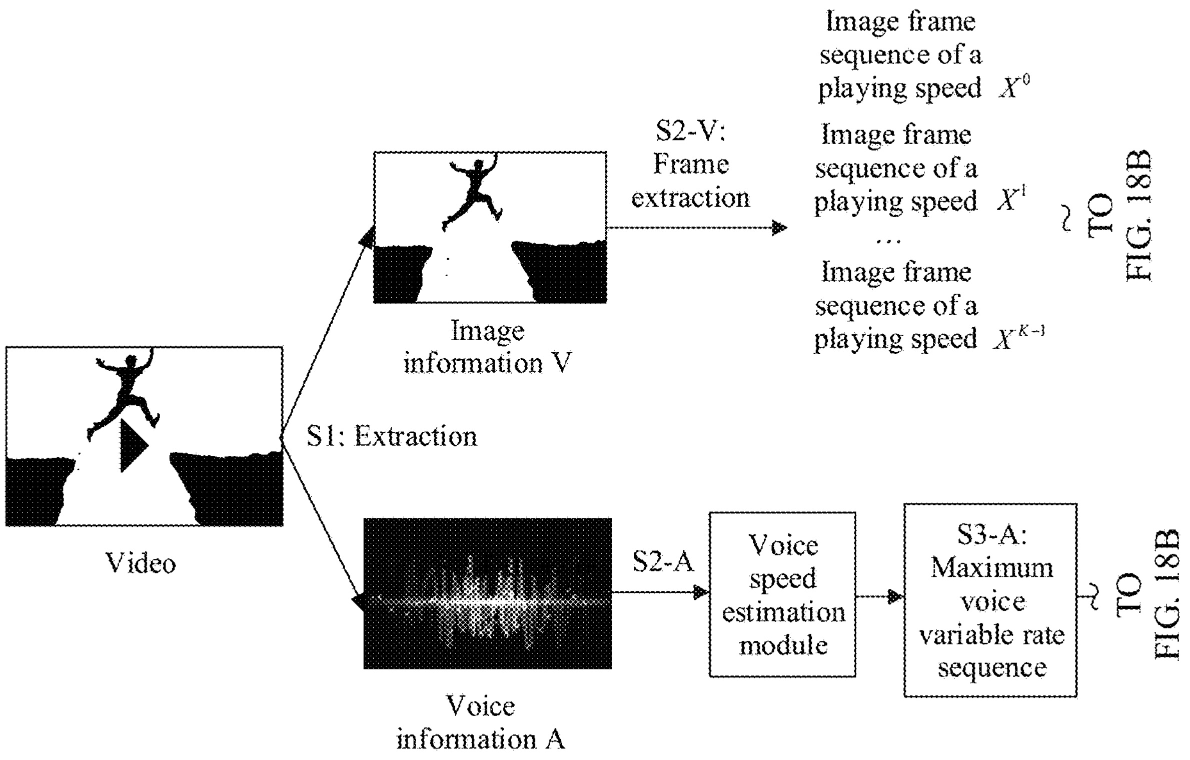
FIG. 18A and FIG. 18B are a schematic flowchart of a video playing method according to an embodiment of this application.
Figure 18B:
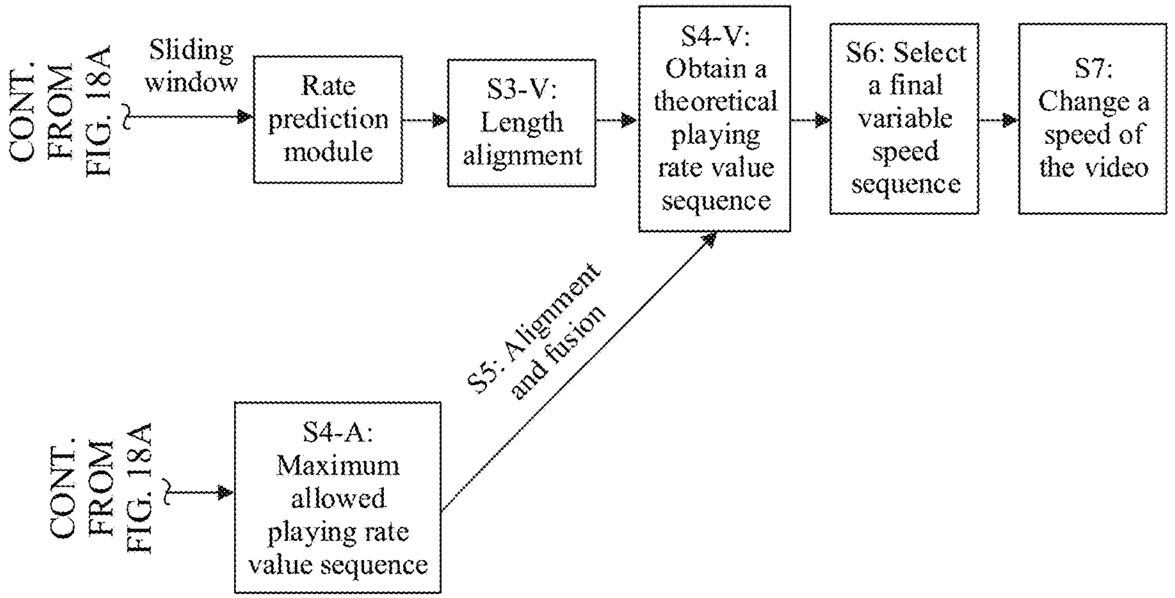

For example, FIG. 18A and FIG. 18B show a video playing method. In the method, a second playing speed is determined by using image information and voice information in a video, to play the video. In the video playing method shown in FIG. 18A and FIG. 18B, a third playing speed corresponding to the image information is determined by using a moving speed of a target in the image information, and third playing speeds corresponding to the image information include third playing speeds that are corresponding to the image information at a plurality of different playing speeds and that include theoretical playing rate values. The video playing method may specifically include the following steps.

S1: Extract image information V and voice information A from a to-be-played video.

S2-V: Generate, in a frame extraction manner, K image frame sequences of different playing speeds from the image information V, and sequentially send segments of continuous W frames in each image frame sequence to a rate prediction module speednet in a sliding window manner, to obtain image speed prediction sequences of the K image frame sequences.

The playing speeds of the K image frame sequences are respectively $X^0$ to $X^{K-1}$, and $X^0$ to $X^{K-1}$ maybe configured based on an actual requirement. Values of $X^0$ to $X^{K-1}$ are not limited in this application.

Specifically, the rate prediction module speednet is configured to predict a moving speed of a target in each image, and the rate prediction module speednet may be a neural network.

The image speed prediction sequences are an output result of the rate prediction module speednet, and the K image frame sequences are input into the rate prediction module speednet, to generate K image speed prediction sequences. The image speed prediction sequence includes a scalar predicted value between 0 and 1, and the value indicates a speed prediction of a target in an image frame. For example, 1 indicates that a target in an image is considered to be in a normal motion state by an algorithm, and a value other than 1 indicates that a target in an image is considered to be in a fast motion state by the algorithm.

S3-V: Align lengths of the K image speed prediction sequences.

Specifically, a quantity F of frames of the to-be-played video is used as a length reference, and interpolation is performed, by using an interpolation method, on the K image speed prediction sequences to obtain sequences whose lengths are all F, to implement sequence length alignment.

S4-V: Obtain a theoretical playing rate value sequence based on a threshold.

For example, in S4-V, a plurality of thresholds are sequentially selected from a threshold set between 0 and 1 (e.g., the threshold set may be {0.1, . . . , and 0.9}). The threshold is used to determine whether motion is fast. If a value is greater than the threshold, it is considered that motion is fast; and if a value is less than the threshold, it is considered that motion is normal.

The following operations are performed on each selected threshold:

The K image speed prediction sequences are compared with the threshold, to obtain K binary sequences (a value greater than the threshold is 1, and a value less than the threshold is 0), and each binary sequence is multiplied by a corresponding playing speed (a value in $X^0$ to $X^{K-1}$). In K sequences obtained after the K binary sequences are multiplied by corresponding playing speeds, a corresponding largest value is selected at a same frame position, so that the K sequences become one sequence, which is referred to as a theoretical playing rate value sequence. Each value in the theoretical playing rate value sequence represents a maximum possible playing rate at which a classification network (the rate prediction module speednet) determines that a corresponding image frame is in a non-accelerated state (an output value of the rate prediction module speednet is 1).

The foregoing operations are separately performed on a plurality of (e.g., nine) different thresholds selected from {0.1, . . . , and 0.9}, to form a plurality of (e.g., nine) theoretical playing rate value sequences in total. The theoretical playing rate value sequence may be understood as the third playing speed corresponding to the image information in the foregoing embodiment.

S2-A: Input the voice information into a voice speed estimation module, and estimate a voice speed of a voice segment of a character in the video, to form a voice speed sequence.

The voice speed estimation module may be configured to collect statistics on a subtitle speed.

S3-A: Obtain a maximum comfortable voice speed of human beings through statistics collection, and obtain a maximum voice variable rate sequence through calculation based on the voice speed sequence.

Specifically, in S3-A, the maximum comfortable voice speed of human beings is divided by a voice speed in each voice frame in the voice speed sequence, to obtain a maximum variable playing rate of each voice frame, and obtain the maximum voice variable rate sequence. A final variable speed cannot exceed the maximum variable playing rate.

S4-A: Align a length of the maximum voice variable rate sequence with the quantity F of frames of the video, to obtain a maximum allowed playing rate value sequence.

The maximum allowed playing rate value sequence obtained in S4-A may be understood as the third playing speed corresponding to the voice information in the foregoing embodiment.

S5: Align the theoretical playing rate value sequences with the maximum allowed playing rate value sequence.

In S5, except the theoretical playing rate value sequences corresponding to the picture information, there is no theoretical playing rate value sequence corresponding to other first information, and there is only the maximum allowed playing rate value sequence that is corresponding to the voice information and that is obtained in S4-A. The plurality of theoretical playing rate value sequences obtained in S4-V may be separately fused with the maximum allowed playing rate value sequence obtained in S4-A, to obtain a plurality of fused relative variable speed sequences. The plurality of fused relative variable speed sequences are understood as the plurality of fourth playing speeds described in the foregoing embodiment. In a process of fusing the theoretical playing rate value sequence with the maximum allowed playing rate value sequence, for a part in which there is voice, a smallest effective value of the two sequences is used as a playing rate of the part, to form a fused relative variable speed sequence.

In S5, there is only the maximum allowed playing rate value sequence that is corresponding to the voice information and that is obtained in S4-A, and the maximum allowed playing rate value sequence obtained in S4-A may be understood as the fifth playing speed described in the foregoing embodiment.

For example, nine theoretical playing rate value sequences are separately aligned and fused with the maximum allowed playing rate value sequence, to obtain nine fused relative variable speed sequences. The fused relative variable speed sequences are rate sequences that can achieve collaborative playing of voice and pictures.

S6: Select a final variable speed sequence based on the nine fused relative variable speed sequences and the maximum allowed playing rate value sequence.

Specifically, in S6, values in the nine fused relative variable speed sequences may be separately normalized to values between 0 and 1. Then, each of nine normalized fused relative variable speed sequences, the maximum allowed playing rate value sequence, and a playing rate $R_0$ specified by a user are substituted into an objective function for numerical optimization, and an optimization result that minimizes the objective function is selected as the final variable speed sequence, that is, the second playing speed described in the foregoing embodiment. The objective function may be the objective function shown in the foregoing formula 2 or another objective function. This is not limited in this embodiment of this application.

A normalized value used in a normalization process may be configured based on an actual requirement. This is not limited in this embodiment of this application.

For example, a largest value in the fused relative variable speed sequences may be selected to normalize the fused relative variable speed sequences.

S7: Play the video based on the final variable speed sequence, to achieve an adaptive speed change effect.

Figure 19:
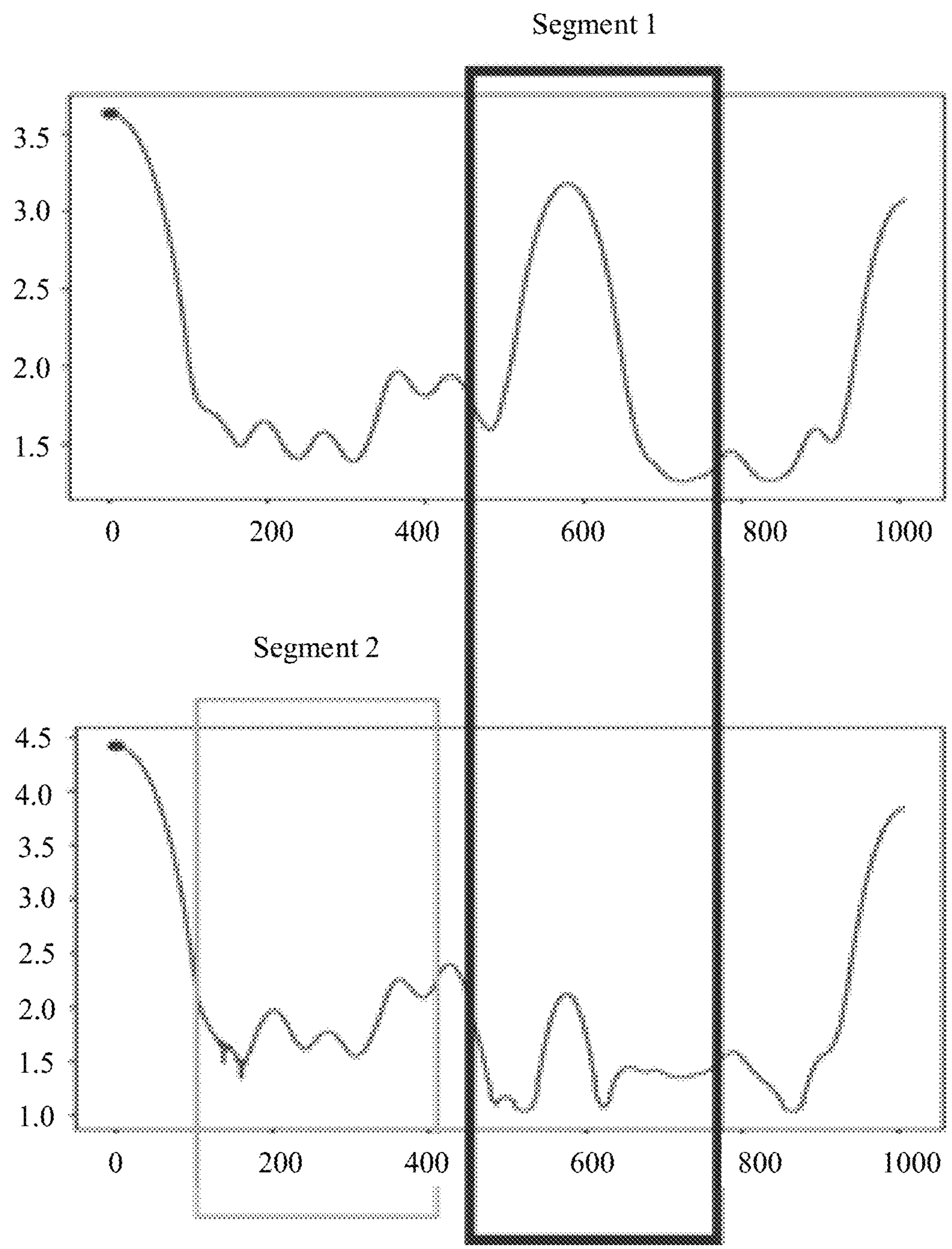
FIG. 19 is a schematic diagram of comparison between speed change curves according to an embodiment of this application.

FIG. 19 shows comparison between a speed change curve of an adaptive speed change solution that is only based on an image and an adaptive speed change curve of a solution of this application. As shown in FIG. 19, in a segment 1 in which an image is relatively slow but there is voice, the speed change curve of the adaptive speed change solution that is only based on an image has a high playing rate, and voice information is almost lost. However, the speed change curve in this application has a lower playing rate, so that a user can clearly hear a speech, and voice clarity is ensured. In a segment 2 with relatively fast picture jitter, all playing rates in this application are lower than 2×, and overall perception is more comfortable and natural than that in constant 2×.

Figure 20:
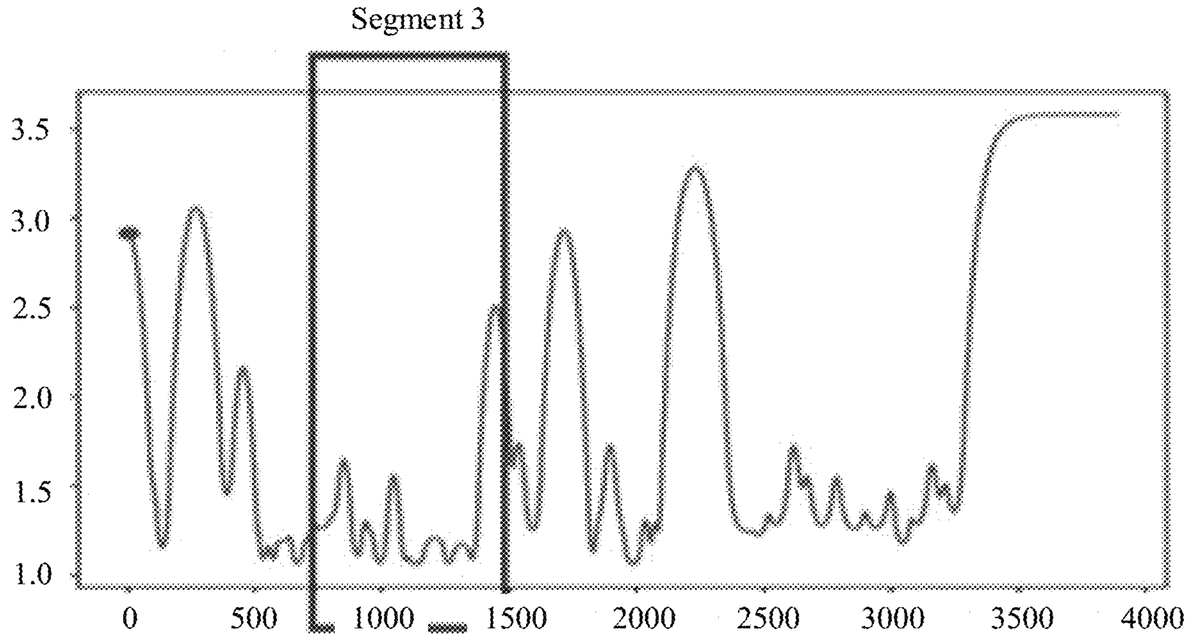
FIG. 20 is a schematic diagram of an adaptive speed change curve according to an embodiment of this application.

FIG. 20 shows an adaptive speed change curve of a solution of this application. For a segment 3 in which an image is almost unchanged but a voice speed is very fast, a playing rate of the segment 3 is close to 1.0× in the adaptive speed change curve provided in this application, and a speech in the segment is unclear (information is lost) when being played at constant 2×.

Figure 21:
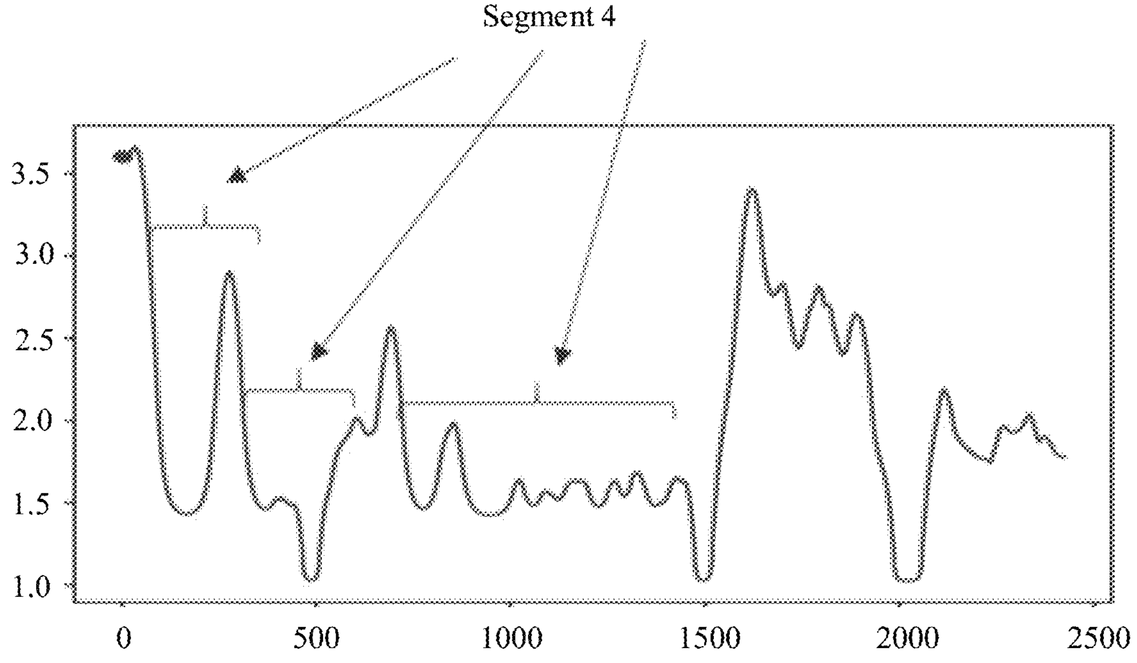
FIG. 21 is a schematic diagram of another adaptive speed change curve according to an embodiment of this application.

FIG. 21 shows an adaptive speed change curve of a solution of this application. For a segment in which a picture violently shakes in a war film with an intense plot, visual dizziness and discomfort are generated when the segment is viewed at a constant 2× rate, and a tense speech is also unclear. As shown in a segment 4 in FIG. 21, a playing rate of each segment included in the segment 4 is far lower than 2× in this application, thereby greatly alleviating dizziness and discomfort.

The foregoing mainly describes the solutions provided in embodiments of this application from a perspective of a working principle of an electronic device. It may be understood that, to implement the foregoing functions, the electronic device includes a corresponding hardware structure and/or software module for performing each of the functions. A person skilled in the art should easily be aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the video playing apparatus provided in this application may be divided into functional modules based on the foregoing method examples. For example, functional modules may be obtained through division based on corresponding functions, or two or more functions may be integrated into one processing module. The integrated module may be implemented in a form of hardware, or may be implemented in a form of a software functional module. It should be noted that, in embodiments of this application, division into the modules is an example, is merely logical function division, and may be other division in actual implementation.

Figure 22:
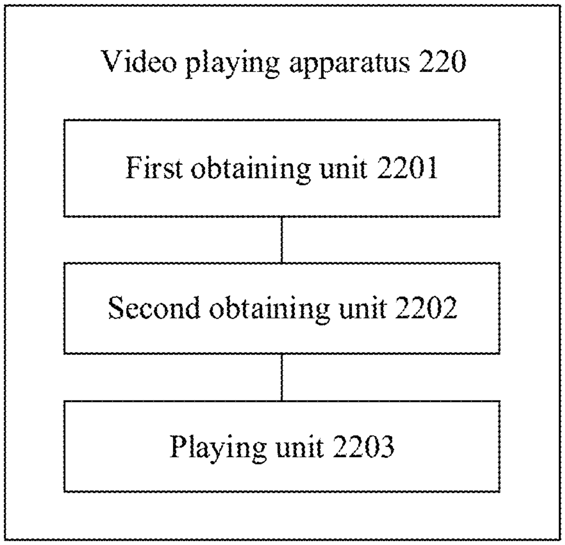
FIG. 22 is a schematic diagram of a structure of a video playing apparatus according to an embodiment of this application.

When functional modules are obtained through division based on corresponding functions, FIG. 22 shows a possible schematic diagram of a structure of a video playing apparatus 220 related to the foregoing embodiments. The video playing apparatus 220 may be a functional module or a chip. As shown in FIG. 22, the video playing apparatus 220 may include a first obtaining unit 2201, a second obtaining unit 2202, and a playing unit 2203. The first obtaining unit 2201 is configured to perform the process S1001 in FIG. 10, the second obtaining unit 2202 is configured to perform the process S1002 in FIG. 10, and the playing unit 2203 is configured to perform the process S1003 in FIG. 10. All related content of the steps in the foregoing method embodiments may be cited in function descriptions of the corresponding functional modules. Details are not described herein.

Figure 23:
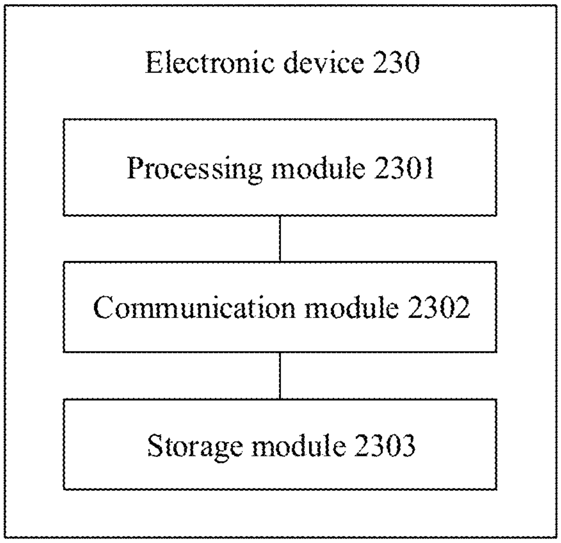
FIG. 23 is a schematic diagram of a structure of an electronic device according to an embodiment of this application.

When an integrated unit is used, FIG. 23 shows a possible schematic diagram of a structure of an electronic device 230 related to the foregoing embodiments. The electronic device 230 may include a processing module 2301 and a communication module 2302. The processing module 2301 is configured to control and manage an action of the electronic device 230, and the communication module 2302 is configured to communicate with another device. For example, the processing module 2301 is configured to perform any one of the processes S1001 to S1003 in FIG. 10. The electronic device 230 may further include a storage module 2303, configured to store program code and data of the electronic device 230.

The processing module 2301 may be the processor 110 in an entity structure of the electronic device 100 shown in FIG. 2, and may be a processor or a controller. For example, the processing module 2301 may be a CPU, a general-purpose processor, a DSP, an ASIC, an FPGA or another programmable logic device, a transistor logic device, a hardware component, or any combination thereof. The processing module 2301 may implement or perform various examples of logic blocks, modules, and circuits described with reference to content disclosed in this application. The processing module 2301 may alternatively be a combination implementing a computing function, for example, a combination of one or more microprocessors, or a combination of a DSP and a microprocessor. The communication module 2302 may be the mobile communication module 150 or the wireless communication module 160 in the entity structure of the electronic device 100 shown in FIG. 2. The communication module 2302 may be a communication port, or may be a transceiver, a transceiver circuit, a communications interface, or the like. Alternatively, the communications interface may communicate with another device by using the foregoing element that has receiving and sending functions. The foregoing element that has receiving and sending functions may be implemented by using an antenna and/or a radio frequency apparatus. The storage module 2303 may be the internal memory 121 in the entity structure of the electronic device 100 shown in FIG. 2.

As described above, the video playing apparatus 220 or the electronic device 230 provided in this embodiment of this application may be configured to implement corresponding functions in the methods implemented in the foregoing embodiments of this application. For ease of description, only a part related to this embodiment of this application is shown. For specific technical details that are not disclosed, refer to embodiments of this application.

In another form of this embodiment, a computer-readable storage medium is provided. The computer-readable storage medium stores instructions. When the instructions are executed, the video playing method in the foregoing method embodiments is performed.

In another form of this embodiment, a computer program product including instructions is provided. When the computer program product is run on a computer, the computer is enabled to perform the video playing method in the foregoing method embodiments.

An embodiment of this application further provides a chip system. The chip system includes a processor, configured to implement the technical method according to embodiments of the present disclosure. In a possible design, the chip system further includes a memory, configured to store program instructions and/or data that are/is necessary for embodiments of the present disclosure. In a possible design, the chip system further includes a memory, configured to enable the processor to invoke application program code stored in the memory. The chip system may include one or more chips, or may include a chip and another discrete component. This is not specifically limited in this embodiment of this application.

Method or algorithm steps described in combination with the content disclosed in this application may be implemented by hardware, or may be implemented by a processor by executing software instructions. The software instructions may include a corresponding software module. The software module may be stored in a RAM, a flash memory, a ROM, an erasable programmable read-only memory (EPROM), an electrically erasable programmable read-only memory (EEPROM), a register, a hard disk, a removable hard disk, a compact disc read-only memory (CD-ROM), or a storage medium in any other form well-known in the art. For example, a storage medium is coupled to a processor, so that the processor can read information from the storage medium and write information into the storage medium. Certainly, the storage medium may be a component of the processor. The processor and the storage medium may be located in an ASIC. In addition, the ASIC may be located in a core network interface device. Certainly, the processor and the storage medium may alternatively exist in the core network interface device as discrete components. Alternatively, the memory may be coupled to the processor. For example, the memory may exist independently, and is connected to the processor through a bus. Alternatively, the memory may be integrated with the processor. The memory may be configured to store application program code for executing the technical solutions provided in embodiments of this application, and the processor controls the execution. The processor is configured to execute the application program code stored in the memory, to implement the technical solutions provided in embodiments of this application.

The foregoing descriptions about the implementations allow a person skilled in the art to clearly understand that, for the purpose of convenient and brief description, division into only the foregoing functional modules is used as an example for description. During actual application, the foregoing functions can be allocated to different functional modules for implementation as required. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions in embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A video playing method implemented by an electronic device, comprising:
- obtaining a first playing speed associated with a playing setting of a user of the electronic device;
- obtaining first information of a video to be played, wherein the first information comprises image information of the video to be played and voice information of the video to be played;
- determining a corresponding third playing speed based on each type of information in the first information;
- performing a fusion operation on all corresponding third playing speeds to obtain a fourth playing speed;
- performing a fusion operation on corresponding third playing speeds that include maximum allowed playing rate values to obtain a fifth playing speed;
- performing numerical optimization on the fourth playing speed and the fifth playing speed based on the first playing speed to obtain a second playing speed; and
- playing the video at the second playing speed.

2. The method according to claim 1, wherein a first duration of playing the video by using the first playing speed is different from a second duration of playing the video by using the second playing speed.

3. The method according to claim 1, wherein the obtaining a first playing speed comprises:
- displaying a first interface based on obtained first operation information comprising at least two options, wherein one option indicates one playing speed;
- obtaining second operation information; and
- determining the first playing speed based on the second operation information and the at least two options.

4. The method according to claim 1, wherein the obtaining a first playing speed comprises:
- displaying a first interface based on obtained first operation information, wherein the first interface comprises a first speed;
- displaying a second interface based on obtained second operation information, wherein the second interface comprises a second speed; and
- determining the first playing speed based on the second speed.

5. The method according to claim 1, wherein the obtaining a first playing speed comprises:
- stopping playing a previous video of the video based on obtained first operation information;
- starting, after the stopping, to play the video; and
- determining the first playing speed based on a playing speed of the previous video.

6. The method according to claim 1, wherein the first information further comprises content that a user is interested in that comprises at least one piece of information taken from the group consisting of: character description information of the video, content description information of the video, and content structure information of the video.

7. The method according to claim 6, wherein a speed at which a frame that is in the video and that is related to the content that the user is interested in is played at the second playing speed is not greater than a speed at which the related frame is played at the first playing speed.

8. The method according to claim 1, wherein the first information further comprises playing mode information of the video, and wherein the playing mode information is associated with playing size information corresponding to the video.

9. The method according to claim 1, wherein the first information further comprises playing mode information of the video, and wherein the playing mode information is associated with definition information of the video.

10. An electronic device, comprising:

one or more processors; and a memory coupled to the one or more processors, wherein the memory is configured to store computer instructions that, when executed by the one or more processors, cause the electronic device to perform a video playing method of:

obtaining a first playing speed associated with a playing setting of a user of the electronic device;

obtaining first information of a video to be played, wherein the first information comprises image information of the video to be played and voice information of the video to be played;

determining a corresponding third playing speed based on each type of information in the first information;

performing a fusion operation on all corresponding third playing speeds to obtain a fourth playing speed;

performing a fusion operation on corresponding third playing speeds that include maximum allowed playing rate values to obtain a fifth playing speed;

performing numerical optimization on the fourth playing speed and the fifth playing speed based on the first playing speed to obtain a second playing speed; and playing the video at the second playing speed.

11. The electronic device according to claim 10, wherein a first duration of playing the video by using the first playing speed is different from a second duration of playing the video by using the second playing speed.

12. The electronic device according to claim 10, wherein the obtaining a first playing speed comprises:

displaying a first interface based on obtained first operation information comprising at least two options, wherein one option indicates one playing speed;

obtaining second operation information; and determining the first playing speed based on the second operation information and the at least two options.

13. The electronic device according to claim 10, wherein the obtaining a first playing speed comprises:

displaying a first interface based on obtained first operation information, wherein the first interface comprises a first speed;

displaying a second interface based on obtained second operation information, wherein the second interface comprises a second speed; and determining the first playing speed based on the second speed.

14. The electronic device according to claim 10, wherein the obtaining a first playing speed comprises:

stopping playing a previous video of the video based on obtained first operation information;

starting, after the stopping, to play the video; and determining the first playing speed based on a playing speed of the previous video.

15. A non-transitory computer-readable storage medium storing computer instructions, that when executed by one or more processors, cause the one or more processors to perform the steps of:

obtaining a first playing speed associated with a playing setting of a user of the electronic device;

obtaining first information of a video to be played, wherein the first information comprises image information of the video to be played and voice information of the video to be played;

determining a corresponding third playing speed based on each type of information in the first information;

performing a fusion operation on all corresponding third playing speeds to obtain a fourth playing speed;

performing a fusion operation on corresponding third playing speeds that include maximum allowed playing rate values to obtain a fifth playing speed;

performing numerical optimization on the fourth playing speed and the fifth playing speed based on the first playing speed to obtain a second playing speed; and playing the video at the second playing speed.

16. The non-transitory computer-readable medium of claim 15, wherein a first duration of playing the video by using the first playing speed is different from a second duration of playing the video by using the second playing speed.

* * * * *